US007850778B2

(12) United States Patent
Lemaire

(10) Patent No.: US 7,850,778 B2
(45) Date of Patent: Dec. 14, 2010

(54) APPARATUS AND METHOD FOR GROWING FULLERENE NANOTUBE FORESTS, AND FORMING NANOTUBE FILMS, THREADS AND COMPOSITE STRUCTURES THEREFROM

(76) Inventor: Charles A. Lemaire, 13195 Flamingo Ct., Apple Valley, MN (US) 55124-7941

( * ) Notice: Subject to any disclaimer, the term of this patent is extended or adjusted under 35 U.S.C. 154(b) by 533 days.

(21) Appl. No.: 11/220,454

(22) Filed: Sep. 6, 2005

(65) Prior Publication Data
US 2007/0237959 A1 Oct. 11, 2007

(51) Int. Cl.
*C23C 16/00* (2006.01)
*C23C 16/455* (2006.01)
*C23C 16/54* (2006.01)
*C23C 16/26* (2006.01)

(52) U.S. Cl. ...................................... 118/715; 118/718
(58) Field of Classification Search .................. 118/715, 118/718
See application file for complete search history.

(56) References Cited

U.S. PATENT DOCUMENTS

| 169 | A |  | 4/1837 | Bigelow |  |
|---|---|---|---|---|---|
| RE24,906 | E |  | 12/1960 | Ulrich |  |
| 4,515,871 | A | * | 5/1985 | Shirogami et al. | ............ 429/34 |
| 5,068,203 | A |  | 11/1991 | Logsdon et al. |  |
| 5,571,617 | A |  | 11/1996 | Cooprider et al. |  |
| 5,637,950 | A |  | 6/1997 | Jin et al. |  |
| 5,726,524 | A |  | 3/1998 | Debe |  |
| 5,773,834 | A |  | 6/1998 | Yamamoto et al. |  |
| 6,074,704 | A |  | 6/2000 | Le Riche et al. |  |
| 6,127,273 | A |  | 10/2000 | Laermer et al. |  |
| 6,129,901 | A |  | 10/2000 | Moskovits et al. |  |
| 6,203,814 | B1 |  | 3/2001 | Fisher et al. |  |
| 6,232,706 | B1 |  | 5/2001 | Dai et al. |  |
| 6,257,062 | B1 |  | 7/2001 | Rich |  |
| 6,346,189 | B1 |  | 2/2002 | Dai et al. |  |

(Continued)

FOREIGN PATENT DOCUMENTS

JP 61-263118 A * 11/1986

(Continued)

OTHER PUBLICATIONS

Ajayan et al., "Nanotubes in a Flash—Ignition and Reconstruction", "Science", Apr. 26, 2002, p. 705, vol. 296.

(Continued)

*Primary Examiner*—Jeffrie R Lund
(74) *Attorney, Agent, or Firm*—Charles A. Lemaire; Lemaire Patent Law Firm, P.L.L.C.

(57) ABSTRACT

The present invention provides apparatus and methods for growing fullerene nanotube forests, and forming nanotube films, threads and composite structures therefrom. In some embodiments, an interior-flow substrate includes a porous surface and one or more interior passages that provide reactant gas to an interior portion of a densely packed nanotube forest as it is growing. In some embodiments, a continuous-growth furnace is provided that includes an access port for removing nanotube forests without cooling the furnace substantially. In other embodiments, a nanotube film can be pulled from the nanotube forest without removing the forest from the furnace. A nanotube film loom is described. An apparatus for building layers of nanotube films on a continuous web is described.

33 Claims, 47 Drawing Sheets

U.S. PATENT DOCUMENTS

| | | | |
|---|---|---|---|
| 6,394,281 | B2 | 5/2002 | Ritland et al. |
| 6,414,351 | B2 | 7/2002 | Clampitt et al. |
| 6,428,713 | B1 | 8/2002 | Christenson et al. |
| 6,479,073 | B1 | 11/2002 | Lucast et al. |
| 6,510,275 | B1 | 1/2003 | Tran et al. |
| 6,534,329 | B2 | 3/2003 | Heeger et al. |
| 6,683,783 | B1 | 1/2004 | Smalley et al. |
| 6,685,844 | B2 | 2/2004 | Rich et al. |
| 6,710,366 | B1 | 3/2004 | Lee et al. |
| 6,749,827 | B2 | 6/2004 | Smalley et al. |
| 6,756,120 | B2 | 6/2004 | Smith et al. |
| 6,764,628 | B2 | 7/2004 | Lobovsky et al. |
| 6,770,506 | B2 | 8/2004 | Gogoi |
| 6,781,094 | B2 | 8/2004 | Harper |
| 6,783,880 | B2 * | 8/2004 | Christiansen ............... 429/33 |
| 6,803,840 | B2 | 10/2004 | Hunt et al. |
| 6,808,746 | B1 | 10/2004 | Dai et al. |
| 6,819,845 | B2 | 11/2004 | Lee et al. |
| 6,835,591 | B2 | 12/2004 | Rueckes et al. |
| 6,836,424 | B2 | 12/2004 | Segal et al. |
| 6,837,928 | B1 | 1/2005 | Zhang et al. |
| 6,866,891 | B2 | 3/2005 | Lieubau et al. |
| 6,878,974 | B2 | 4/2005 | Heeger et al. |
| 6,887,450 | B2 | 5/2005 | Chen et al. |
| 6,900,580 | B2 | 5/2005 | Dai et al. |
| 6,911,682 | B2 | 6/2005 | Rueckes et al. |
| 6,913,789 | B2 | 7/2005 | Smalley et al. |
| 6,914,711 | B2 | 7/2005 | Novotny et al. |
| 6,919,592 | B2 | 7/2005 | Segal et al. |
| 6,924,538 | B2 | 8/2005 | Jaiprakash et al. |
| 7,097,820 | B2 | 8/2006 | Colbert et al. |
| 7,189,430 | B2 | 3/2007 | Ajayan et al. |
| 7,335,247 | B2 * | 2/2008 | Stein et al. ...................... 96/7 |
| 7,473,873 | B2 * | 1/2009 | Biris et al. .................. 219/634 |
| 7,611,579 | B2 * | 11/2009 | Lashmore et al. ............. 117/84 |
| 2001/0012576 | A1 * | 8/2001 | Christiansen ............... 429/33 |
| 2002/0090468 | A1 | 7/2002 | Goto et al. |
| 2002/0178846 | A1 | 12/2002 | Dai et al. |
| 2004/0062708 | A1 | 4/2004 | Remskar et al. |
| 2004/0096389 | A1 | 5/2004 | Lobovsky et al. |
| 2004/0109814 | A1 | 6/2004 | Simard et al. |
| 2004/0160726 | A1 | 8/2004 | Lerche et al. |
| 2005/0074569 | A1 | 4/2005 | Lobovsky et al. |
| 2005/0074613 | A1 | 4/2005 | Tour et al. |
| 2005/0081788 | A1 * | 4/2005 | Jurgensen et al. ........... 118/718 |
| 2005/0095938 | A1 | 5/2005 | Rosenberger et al. |
| 2005/0100497 | A1 | 5/2005 | Smalley et al. |
| 2005/0133258 | A1 | 6/2005 | Veneruso |
| 2005/0170089 | A1 * | 8/2005 | Lashmore et al. ......... 427/248.1 |
| 2005/0249656 | A1 | 11/2005 | Smalley et al. |
| 2005/0260120 | A1 | 11/2005 | Smalley et al. |
| 2005/0285121 | A1 | 12/2005 | Kim, II |
| 2006/0008407 | A1 | 1/2006 | Smalley et al. |
| 2006/0017191 | A1 | 1/2006 | Liang et al. |
| 2006/0067939 | A1 | 3/2006 | Buzatu et al. |
| 2006/0073089 | A1 | 4/2006 | Ajayan et al. |
| 2006/0121185 | A1 | 6/2006 | Xu et al. |
| 2006/0142466 | A1 | 6/2006 | Tour et al. |
| 2006/0166003 | A1 | 7/2006 | Khabashesku et al. |
| 2006/0239891 | A1 * | 10/2006 | Niu et al. ................ 423/445 R |
| 2007/0092431 | A1 * | 4/2007 | Resasco et al. .......... 423/447.3 |
| 2007/0190880 | A1 * | 8/2007 | Dubrow et al. .............. 442/181 |
| 2007/0237959 | A1 * | 10/2007 | Lemaire ..................... 428/408 |
| 2008/0014431 | A1 * | 1/2008 | Lashmore et al. ........ 428/315.5 |
| 2008/0018012 | A1 * | 1/2008 | Lemaire et al. ............... 264/82 |
| 2008/0223851 | A1 * | 9/2008 | Biris et al. .................. 219/634 |
| 2008/0274280 | A1 * | 11/2008 | Biris et al. ............... 427/255.4 |
| 2009/0257945 | A1 * | 10/2009 | Biris et al. ............... 423/447.3 |
| 2010/0099319 | A1 * | 4/2010 | Lashmore et al. ........... 442/332 |

FOREIGN PATENT DOCUMENTS

| | | |
|---|---|---|
| WO | WO 9842620 A1 | 10/1998 |
| WO | WO 0017101 | 3/2000 |
| WO | WO 0017102 A1 | 3/2000 |
| WO | WO 0073718 A1 | 12/2000 |
| WO | WO 0130694 A1 | 5/2001 |
| WO | WO 0230814 A1 | 4/2002 |
| WO | WO 02060812 A2 | 8/2002 |
| WO | WO 02076887 A2 | 10/2002 |
| WO | WO 03004740 A1 | 1/2003 |
| WO | WO 03021621 A1 | 3/2003 |
| WO | WO 03076703 A1 | 9/2003 |
| WO | WO 2004065657 A1 | 8/2004 |
| WO | WO 2006022800 A2 | 3/2006 |
| WO | WO 2006088322 A1 | 8/2006 |
| WO | WO 2006107144 A1 | 10/2006 |

OTHER PUBLICATIONS

Chisholm et al., "Comment on 'Single Crystals of Single-Walled Carbon Nanotubes Formed by Self-Assembly'", "Science", May 23, 2003, p. 1236b, vol. 300.

Derycke et al., "Catalyst-Free Growth of Ordered Single-Walled Carbon Nanotube Networks", "Nano Letters", Aug. 21, 2002, pp. A-D, vol. 0, No. 0.

Ericson et al., "Macroscopic, Neat, Single-Walled Carbon Nanotube Fibers", "Science", Sep. 3, 2004, pp. 1447-1420, vol. 305.

Fan, Shoushan, et al., "Self-Oriented Regular Arrays of Carbon Nanotubes and Their Field Emission Properties", "Science", Jan. 22, 1999, pp. 512-514, vol. 283.

Li et al., "Large-Scale Synthesis of Aligned Carbon Nanotubes", "Science", Dec. 6, 1996, pp. 1701-1703, vol. 274.

Liu et al., "Fullerene Pipes", "Science", May 22, 1998, pp. 1253-1256, vol. 280.

Mickelson et al., "Packing C60 in Boron Nitride Nanotubes", Apr. 18, 2003, pp. 467-469, vol. 300.

Remskar et al., "Self-Assembly of Subnanometer-Diameter Single-Wall MoS2 Nanotubes", "Science", Apr. 20, 2001, pp. 479-481, vol. 292.

Ren et al., "Synthesis of Large Arrays of Well-Aligned Carbon Nanotubes on Glass", "Science", Nov. 6, 1998, pp. 1105-1107, vol. 282.

Sirbuly et al., "Optical routing and sensing with nanowire assemblies", "Proceedings of the National Academy of Sciences", May 31, 2005, pp. 7800-7805, vol. 102, No. 22.

Strano et al., "Electronic Structure Control of Single-Walled Carbon Nanotube Functionalization", "Science", Sep. 12, 2003, pp. 1519-1522, vol. 301.

Terrones et al., "Coalescence of Single-Walled Carbon Nanotubes", "Science", May 19, 2000, pp. 1226-1229, vol. 288.

Tseng et al., "Toward Nanocomputers", "Science", Nov. 9, 2001, pp. 1293-1294, vol. 294.

Zhang et al., "Multifunctional Carbon Nanotube Yarns by Downsizing an Ancient Technology", "Science", Nov. 19, 2004, pp. 306-1358, vol. 306.

Fan, Shoushan, et al., "Self-Oriented Regular Arrays of Carbon Nanotubes and Their Field Emission Properties", *Science*. vol. 283, 512-514 (1999).

Ren, Z. F., et al., "Synthesis of Large Arrays of Well-Aligned Carbon Nanotubes on Glass", *Science*, vol. 282, 1105-1107 (1998).

Zhang, Mei, et al., "Multifunctional Carbon Nanotube Yarns by Downsizing an Ancient Technology", *Science*, vol. 306, 1358-1361 (Nov. 19, 2004).

Zhang, Mei, et al., "Strong, Transparent, Multifunctional, Carbon Nanotube Sheet", *Science*, vol. 309, 1215-1219 (Aug. 19, 2005).

Bai, Junfeng, et al., Synthesis of Inorganic Fullerene-Like Molecules, Science, May 2, 2003, p. 781-783, vol. 300.

Ericson, Lars M., et al., Macroscopic, Neat, Single-Walled Carbon Nanotube Fibers, Science, Sep. 3, 2004, pp. 1447-1450, vol. 305.

Glotzer, Sharon C., Some Assembly Required, Science, Oct. 15, 2004, pp. 419-420, vol. 306.

Ouyang, Min, et al., Energy Gaps in 'Metallic' Single-Walled Carbon Nanotubes, Science, Apr. 27, 2001, pp. 702-705, vol. 292.

Service, Robert F., Key to Cheaper, Better Nanotubes Comes Out in the Wash, Science, Nov. 19, 2004, p. 1275 vol. 306.

Tang, Z. K., et al., Superconductivity in 4 Angstrom Single-Walled Carbon Nanotubes, Science, Jun. 29, 2001, pp. 6462-6465, vol. 292.

* cited by examiner

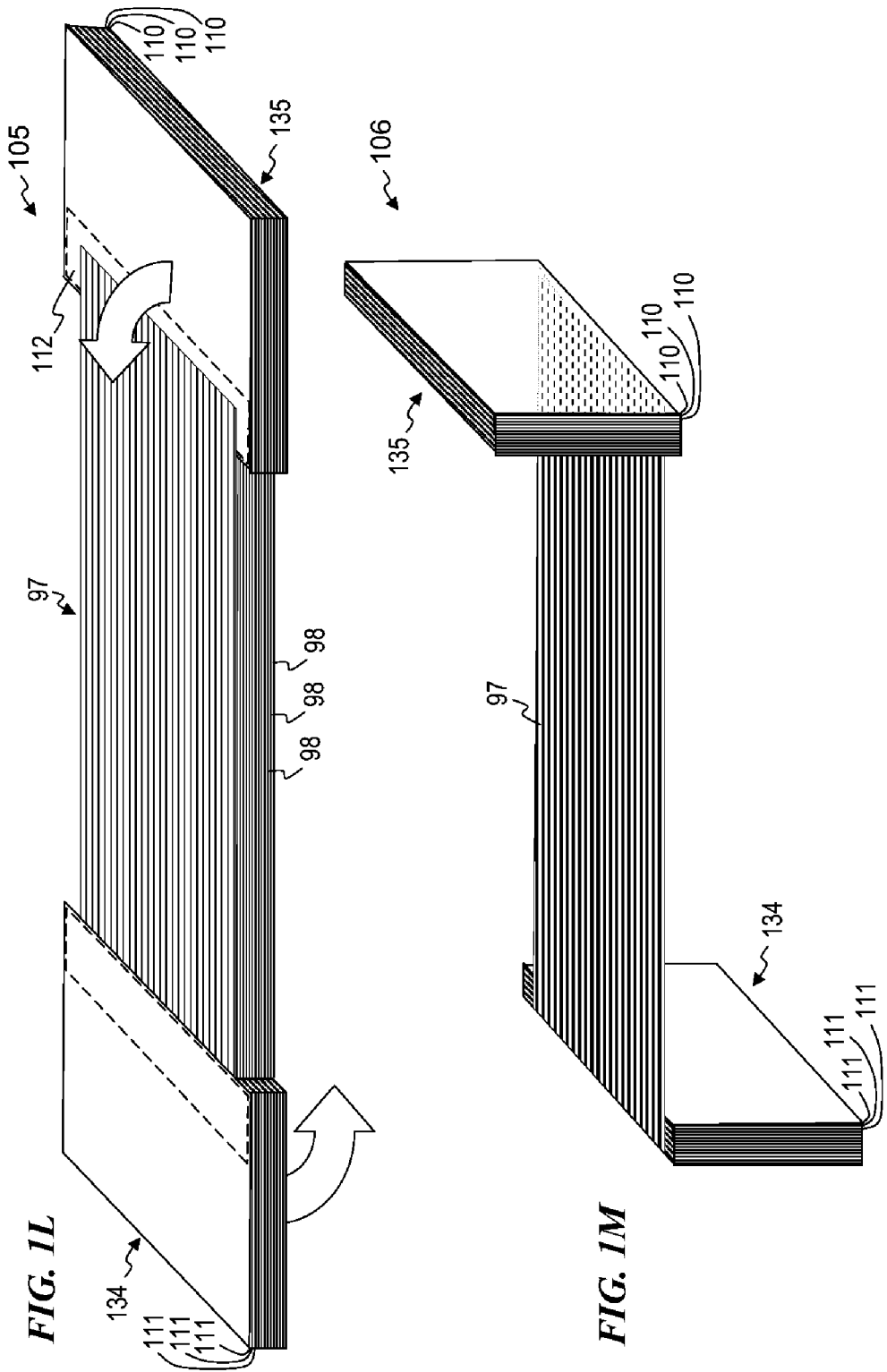

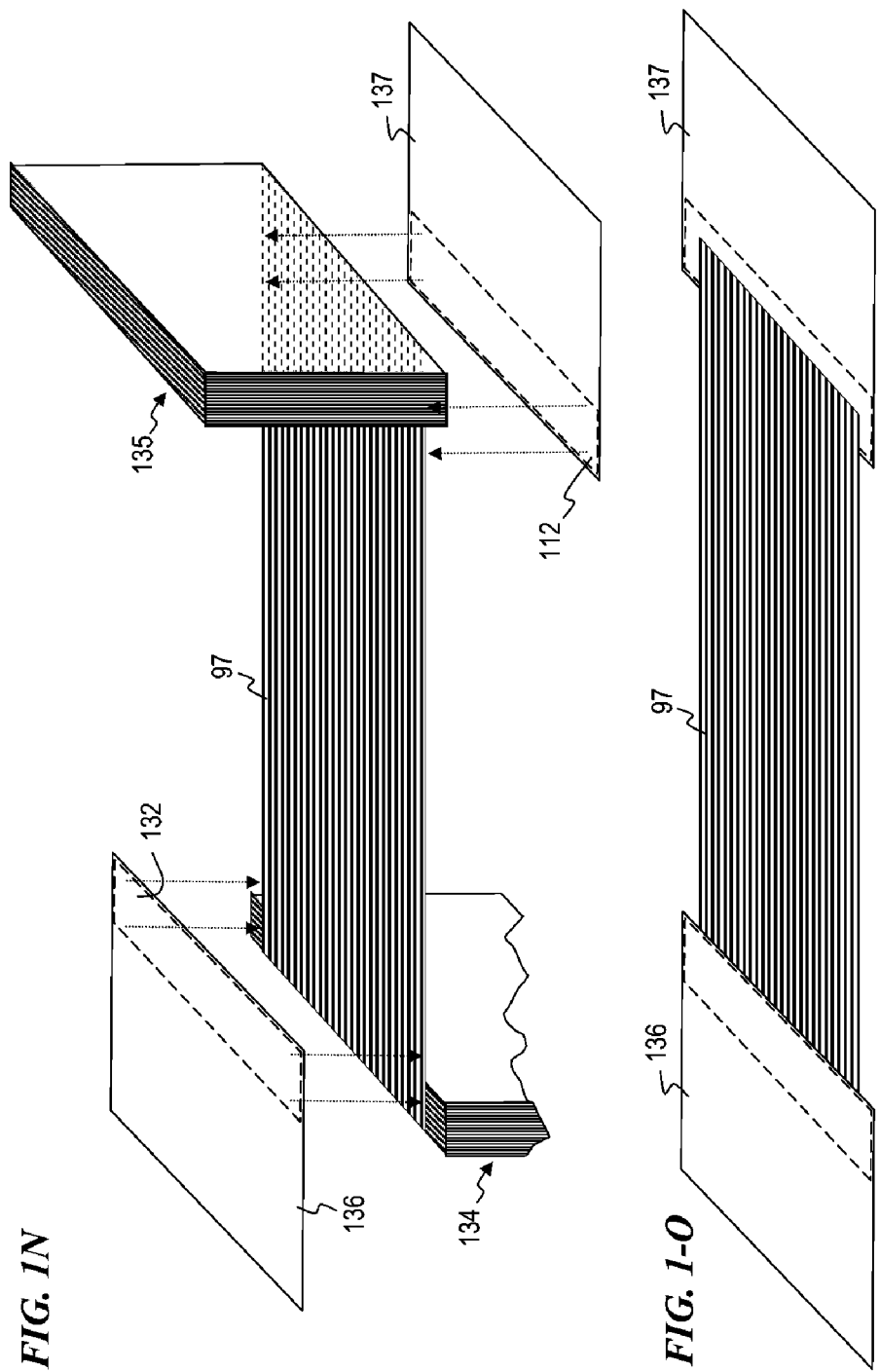

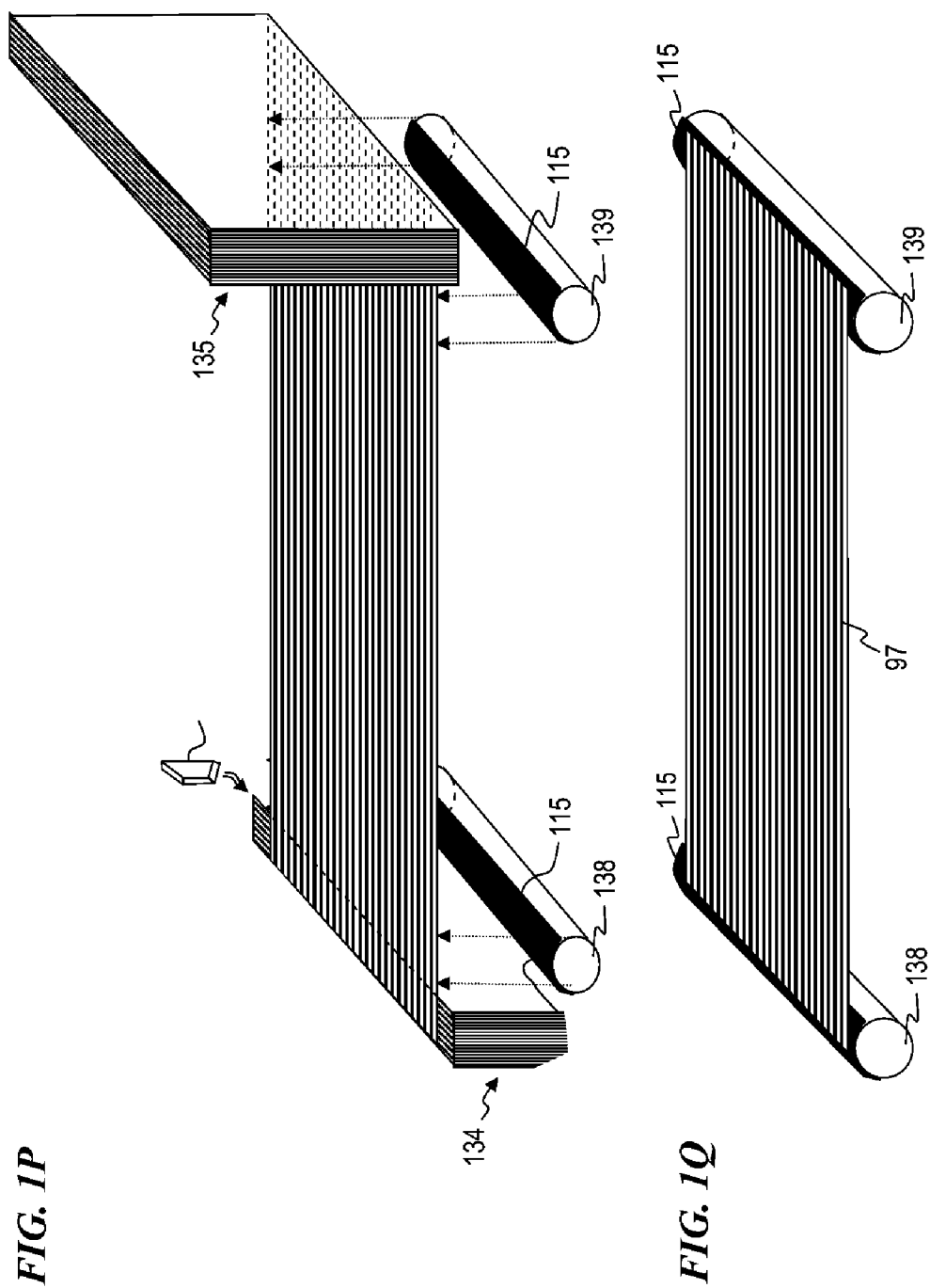

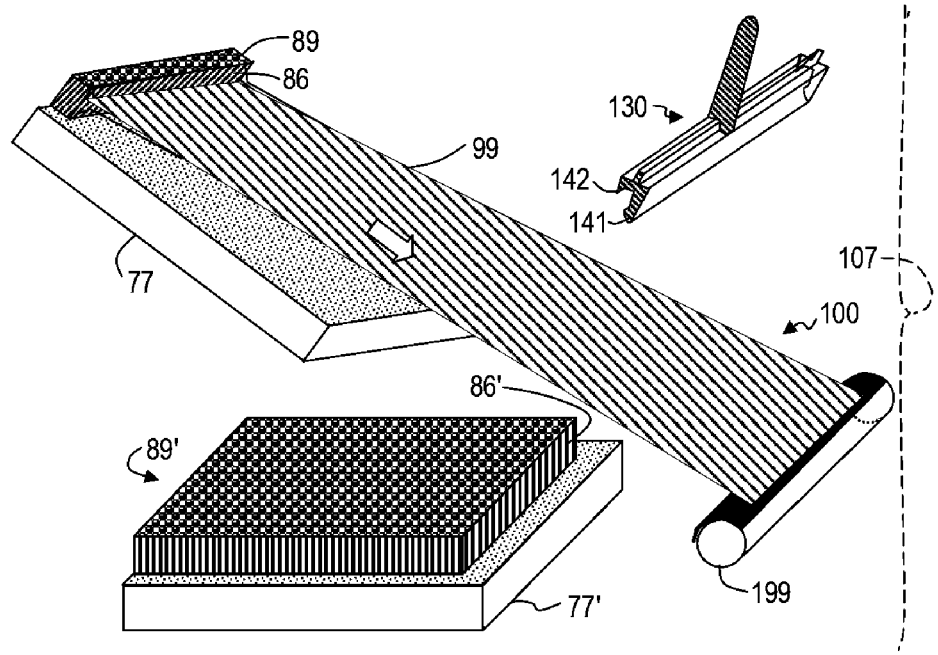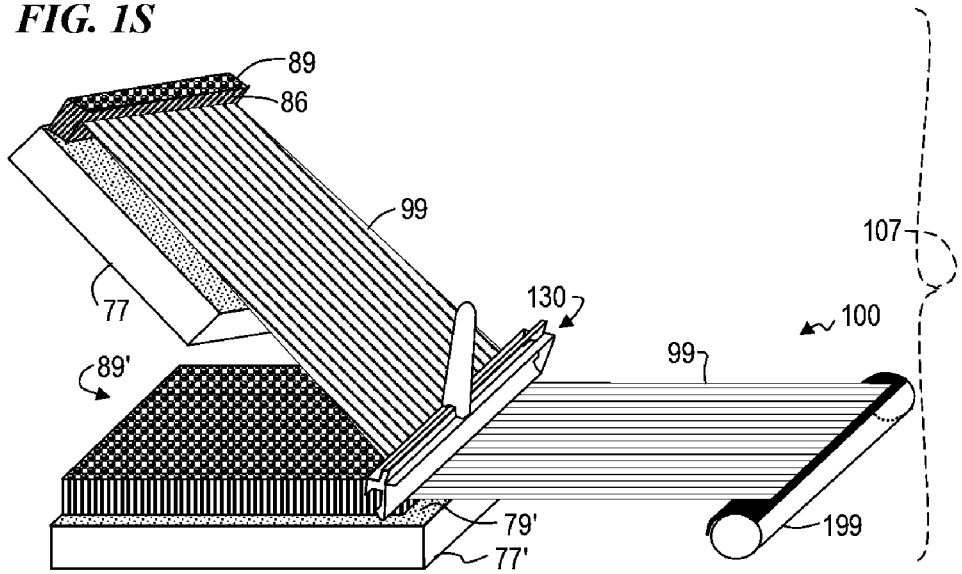

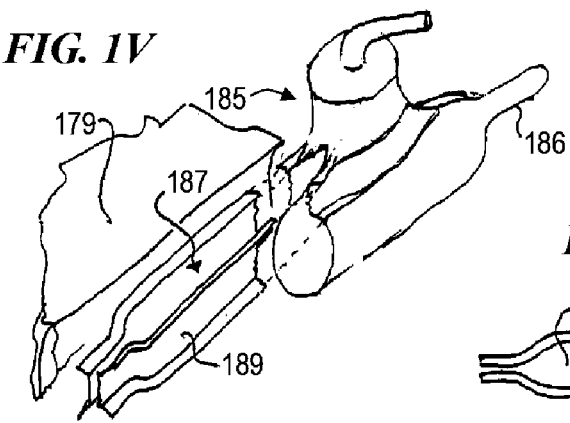
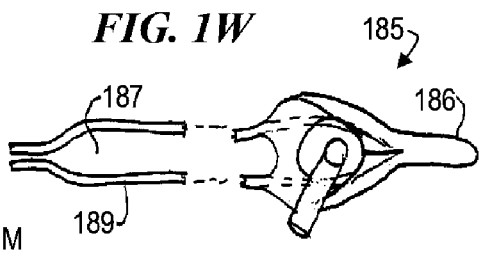
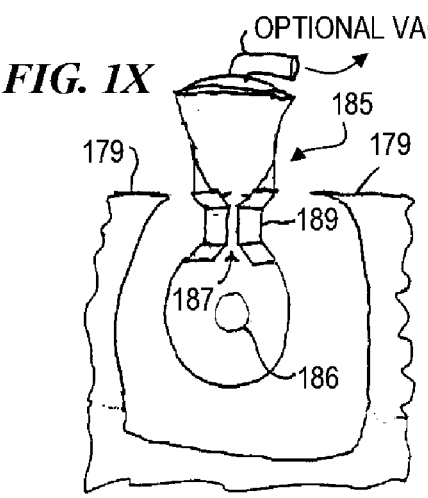
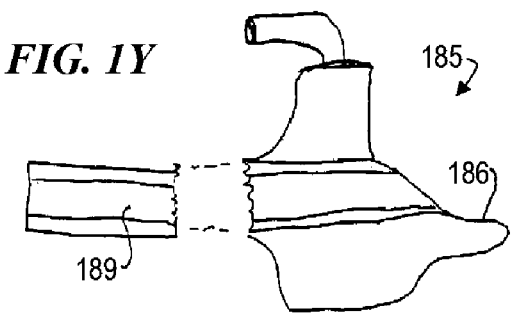
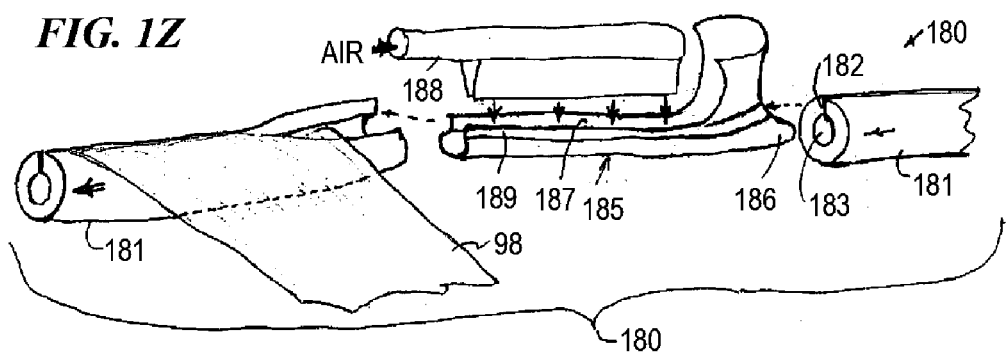

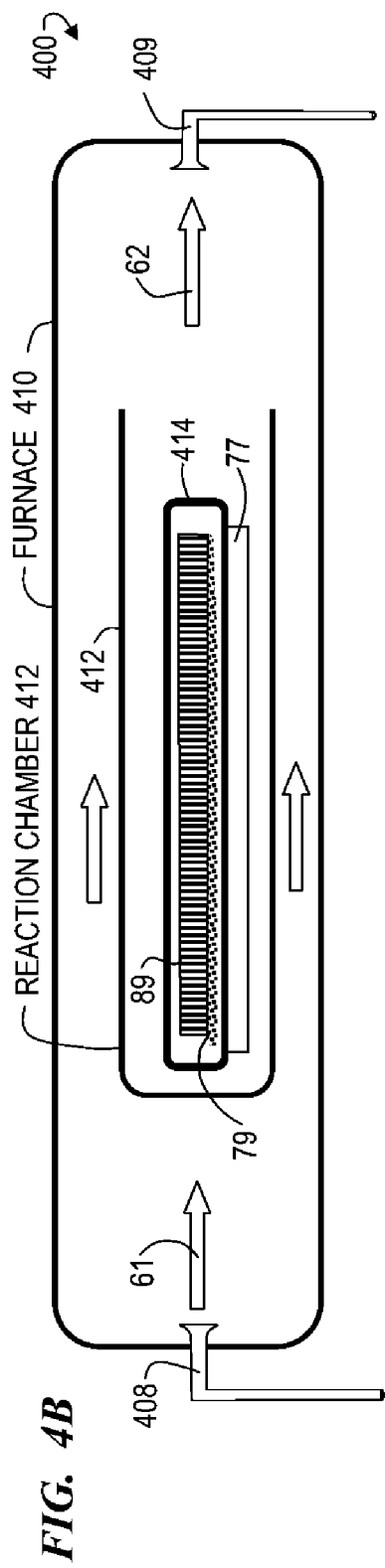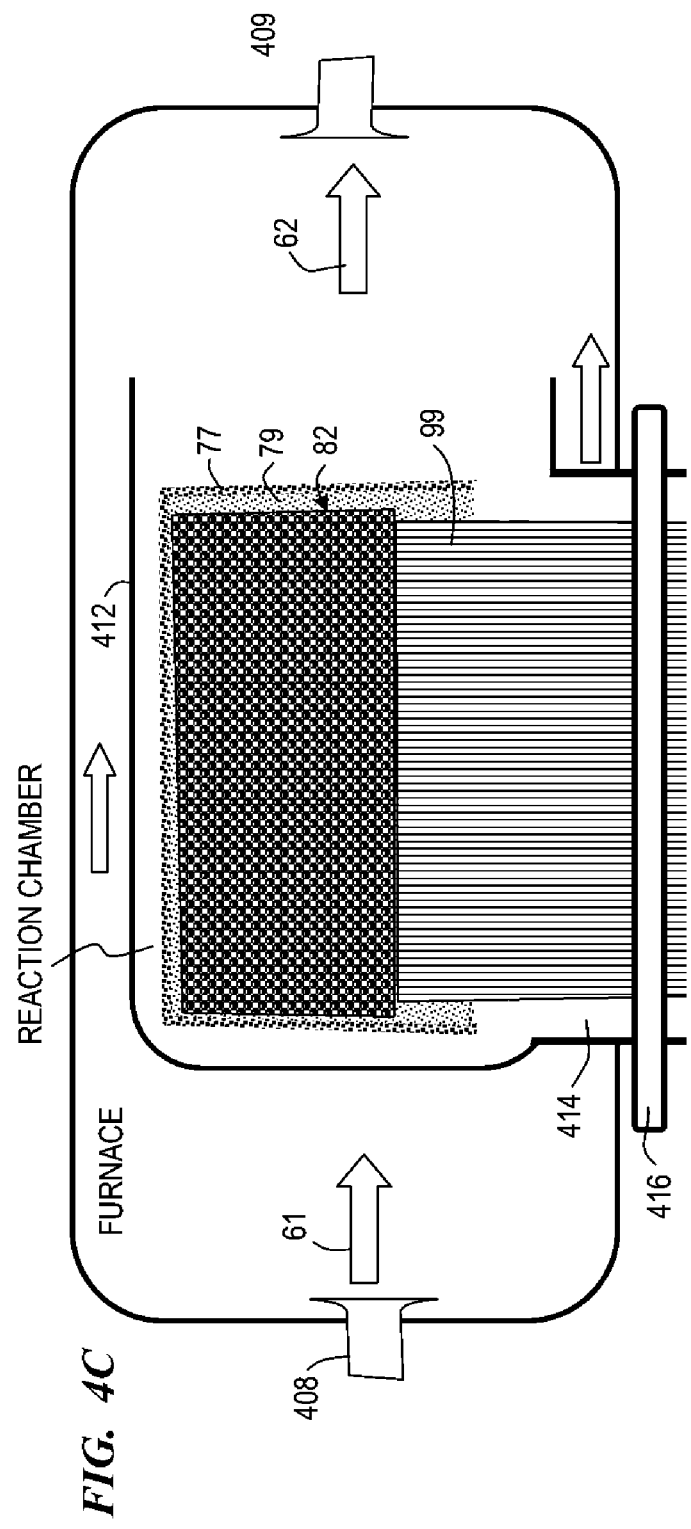
FIG. 4B
FIG. 4C

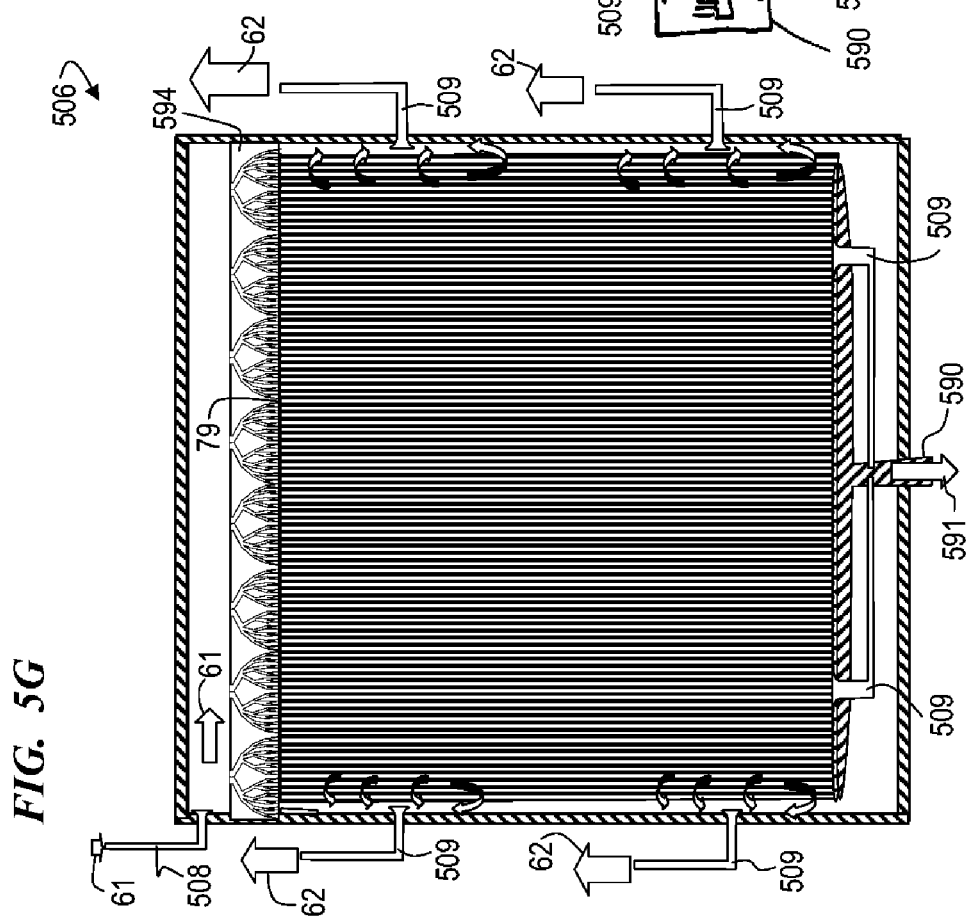
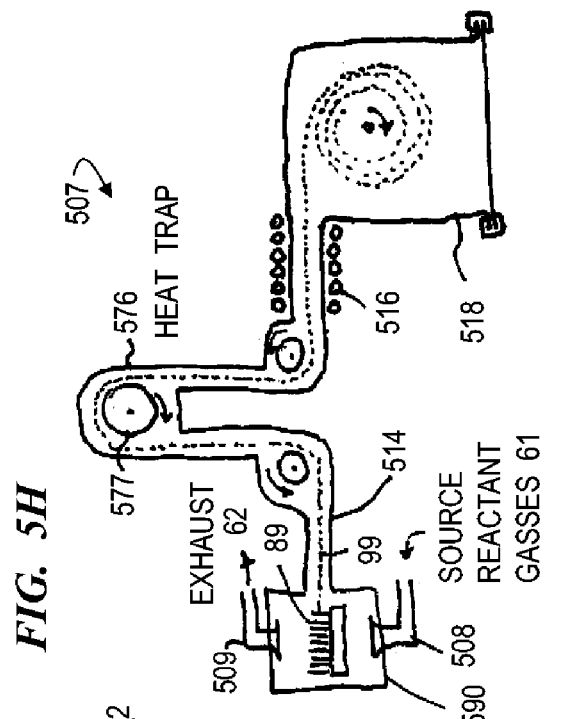
FIG. 5G
FIG. 5H

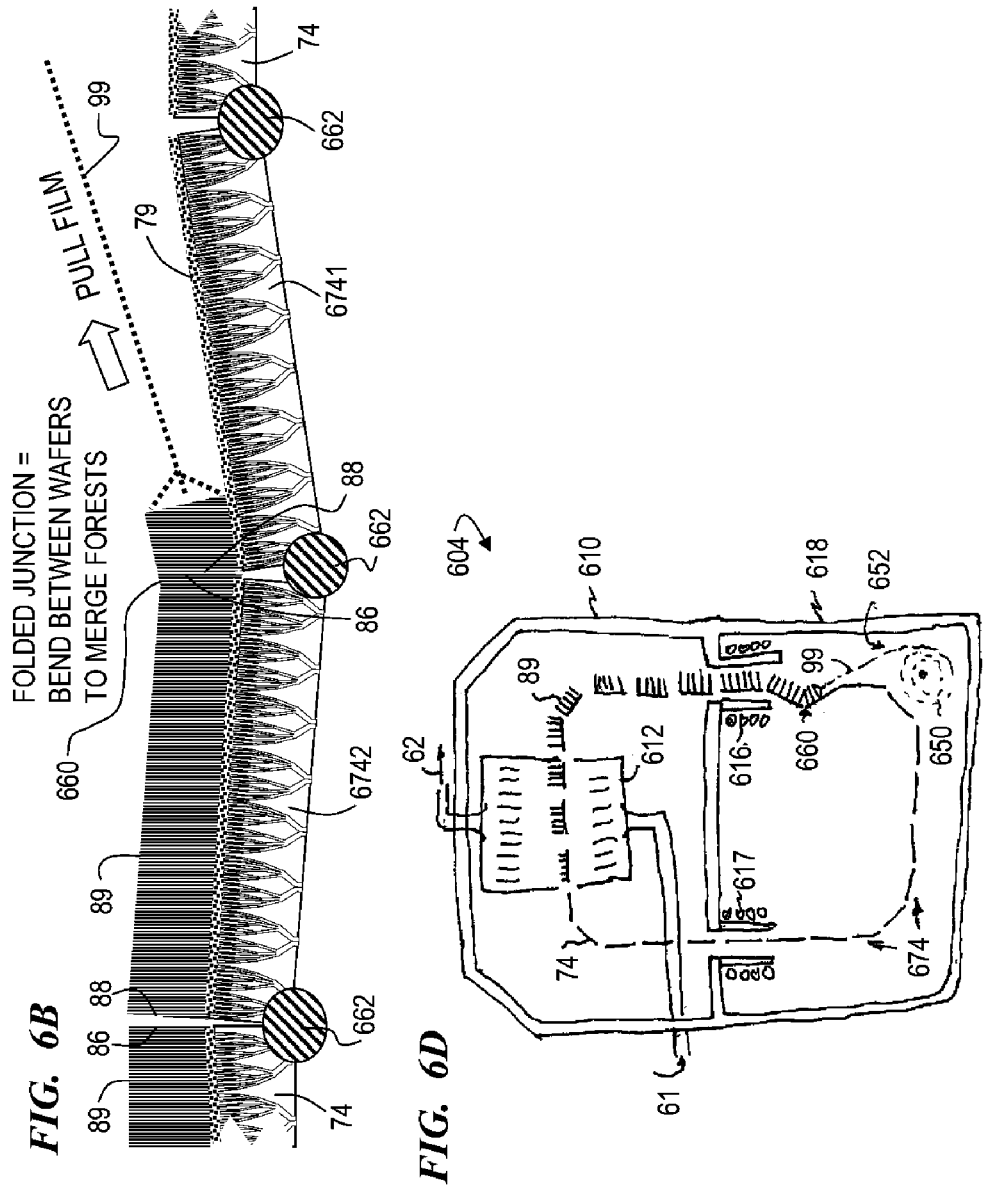

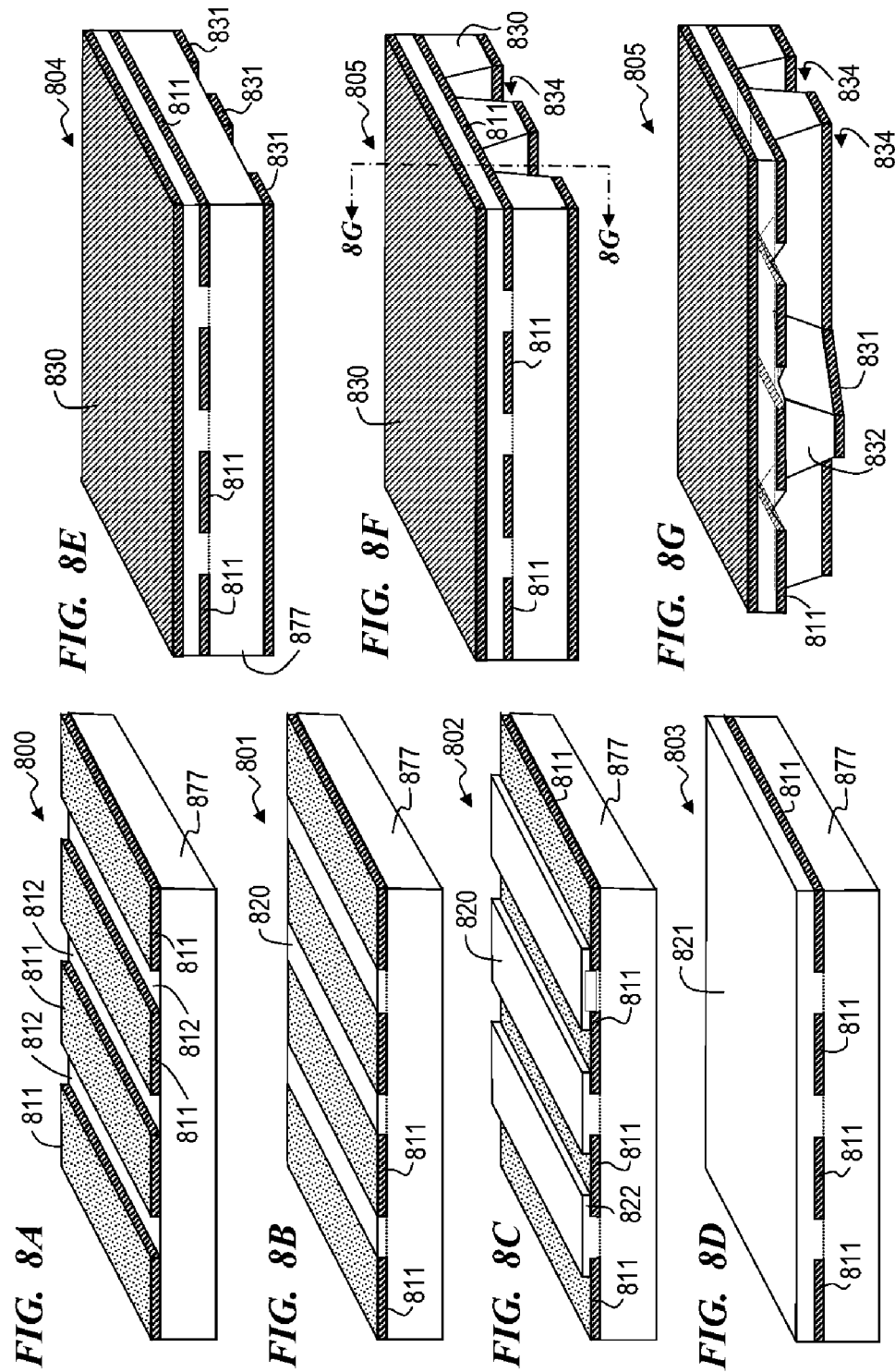

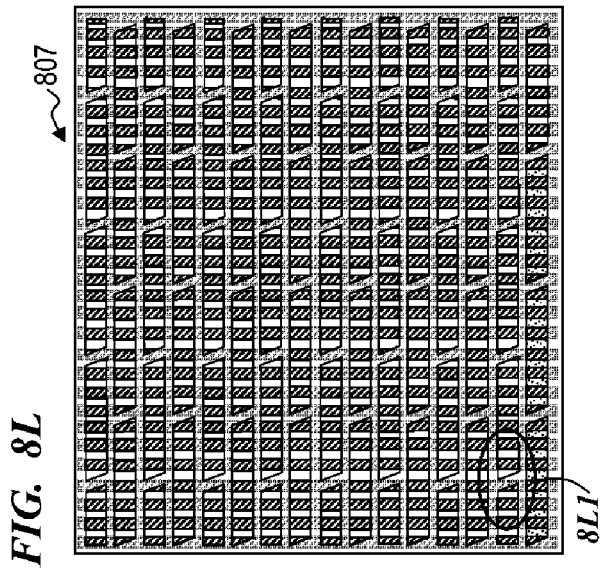
FIG. 8L
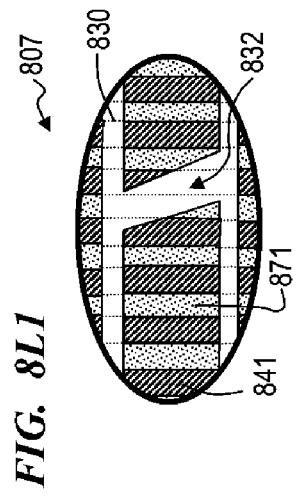
FIG. 8L1
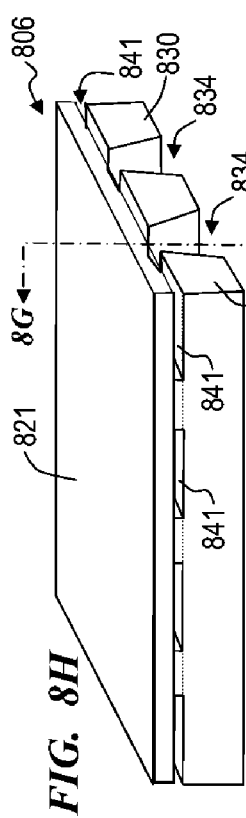
FIG. 8H
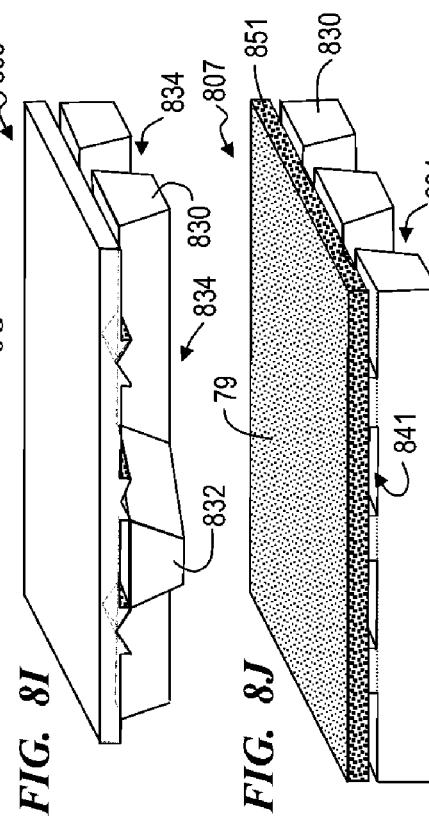
FIG. 8I
FIG. 8J
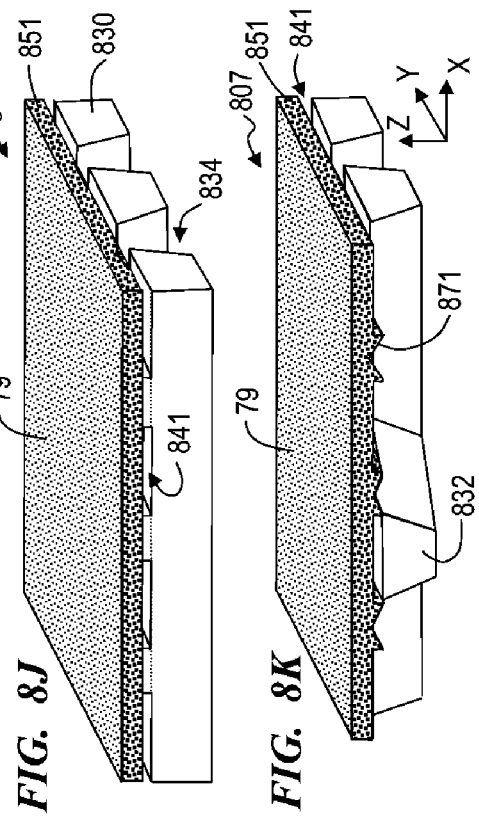
FIG. 8K

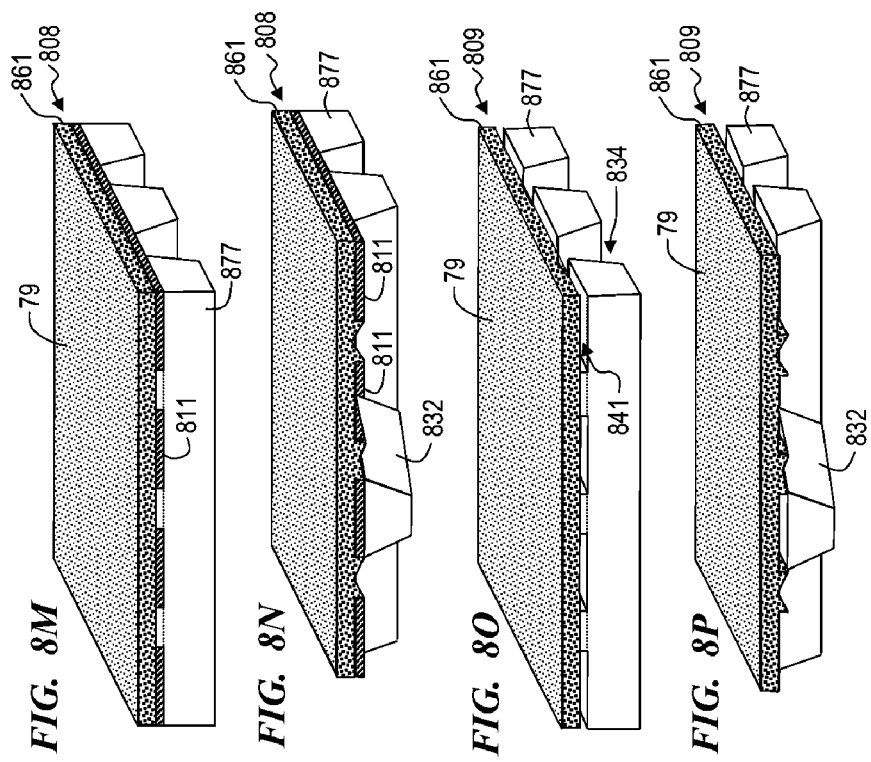

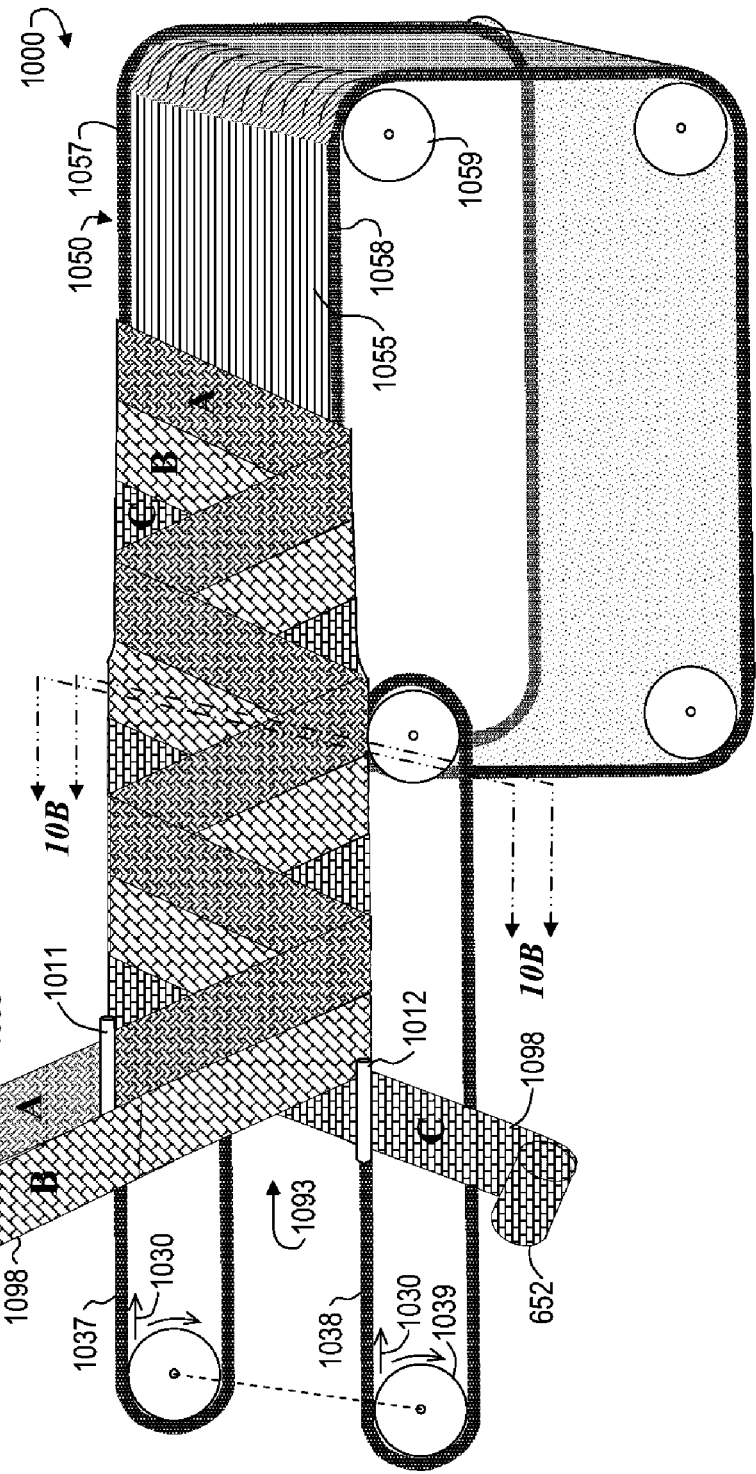

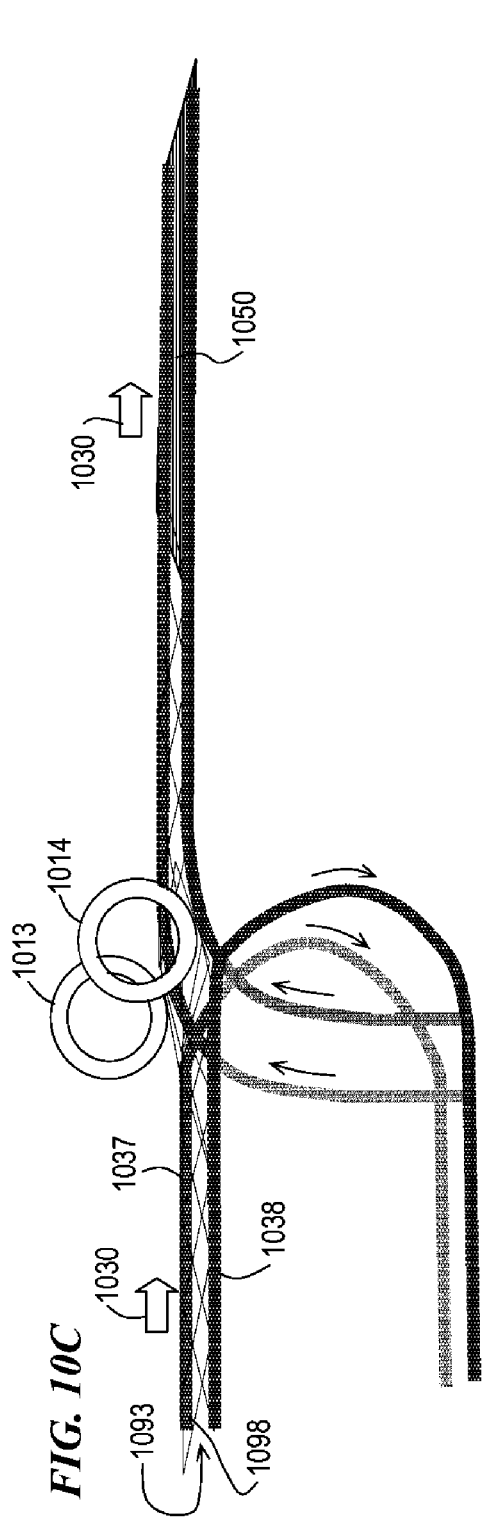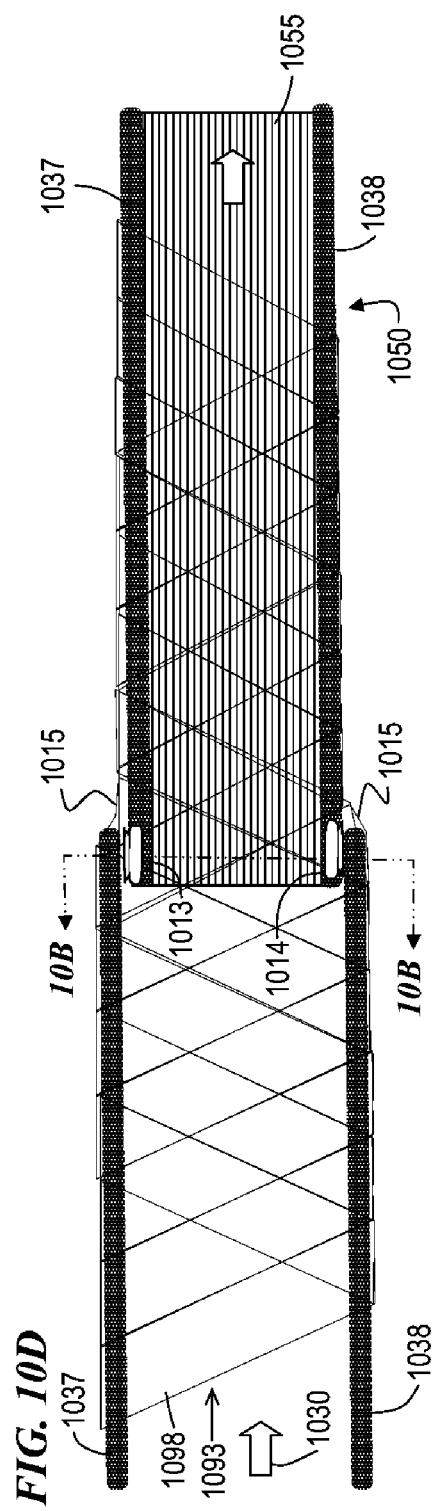

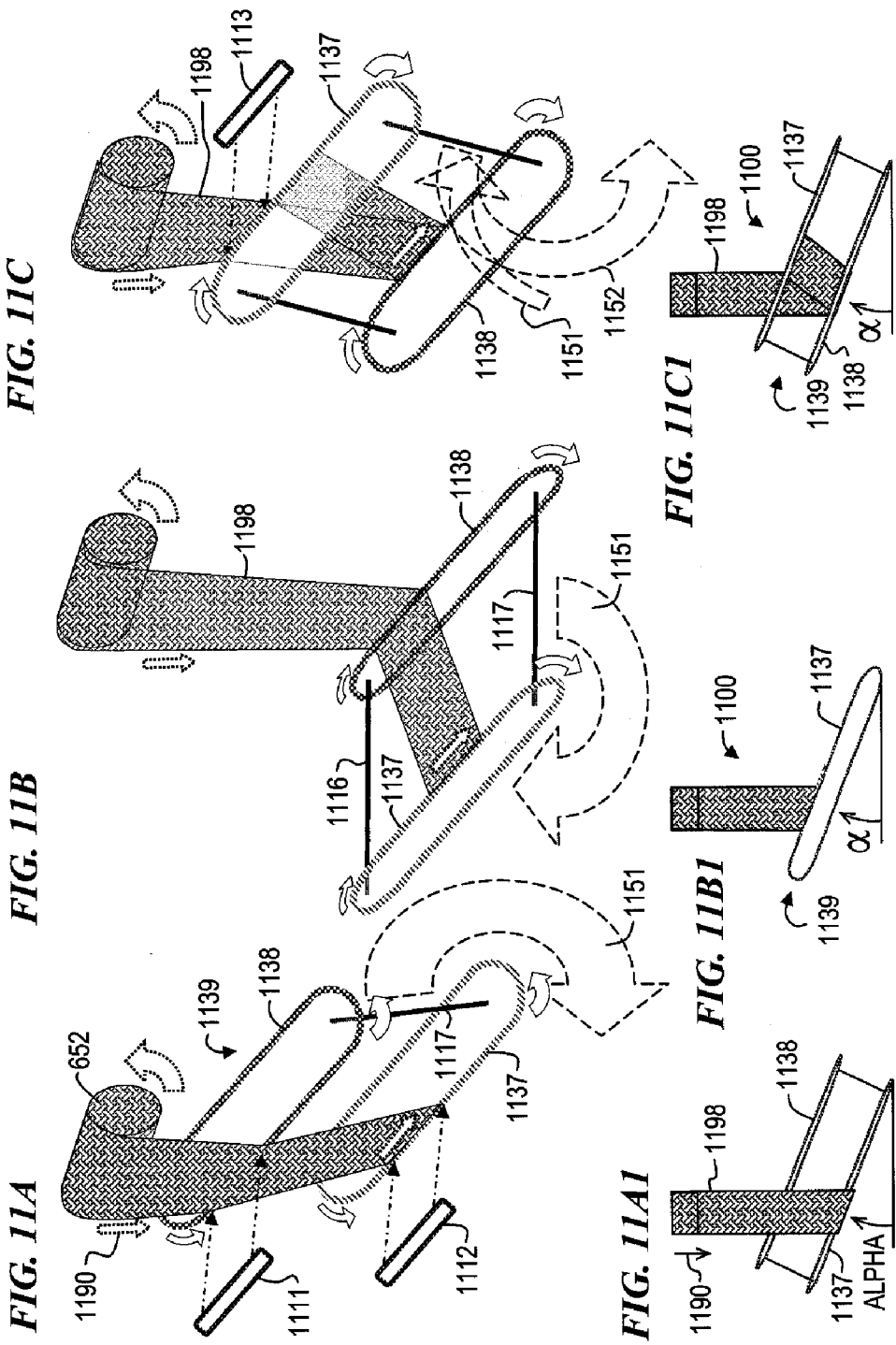

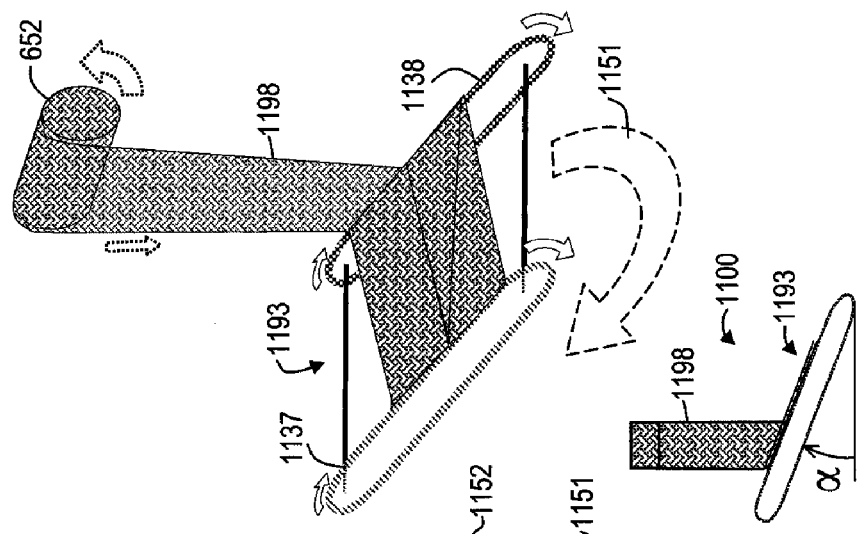
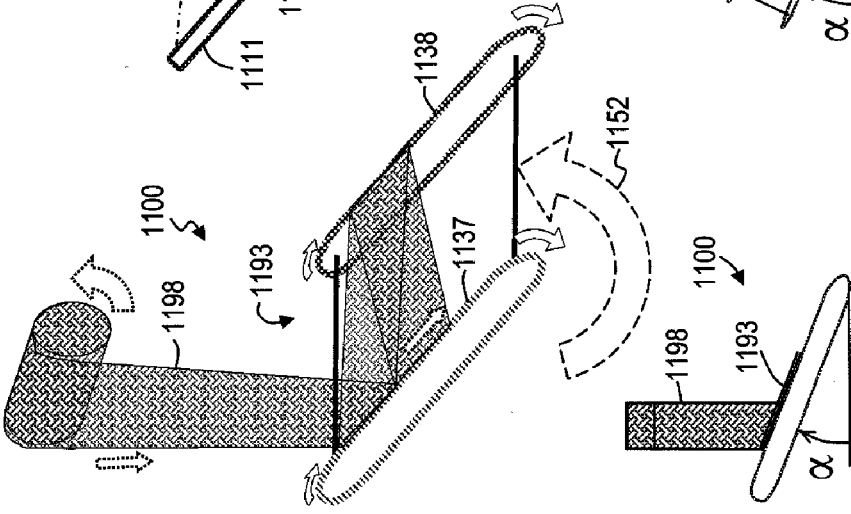

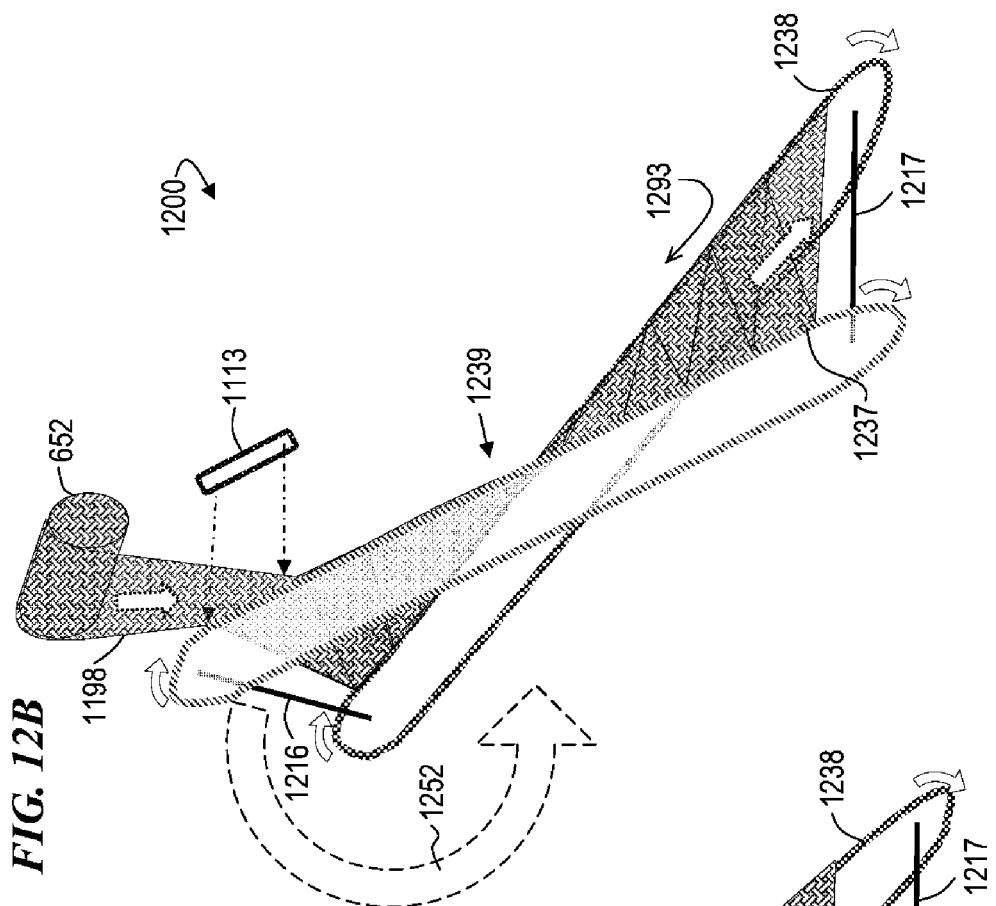
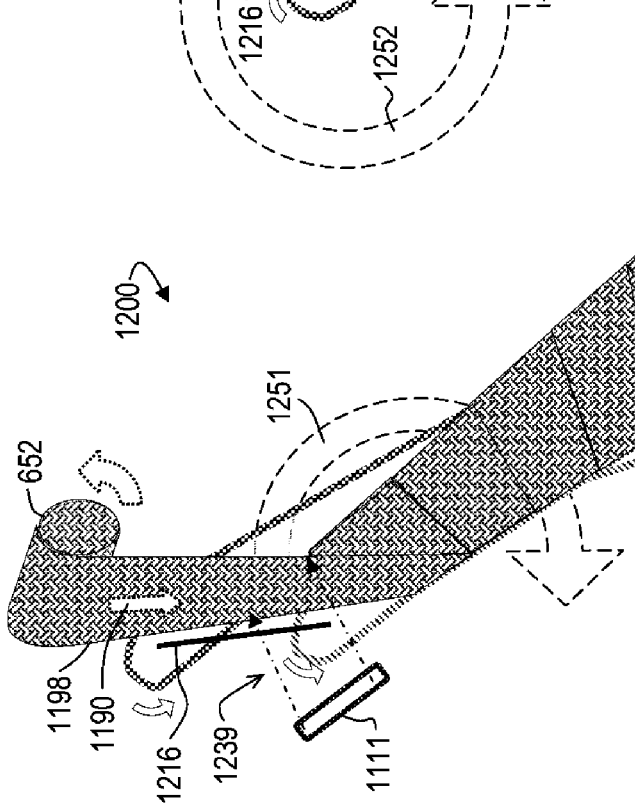
FIG. 12A
FIG. 12B

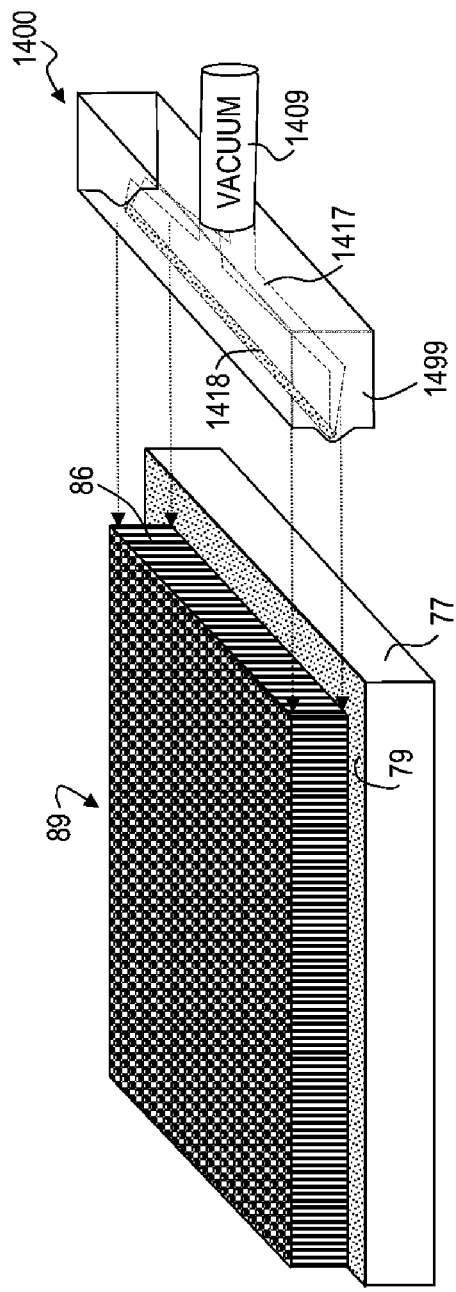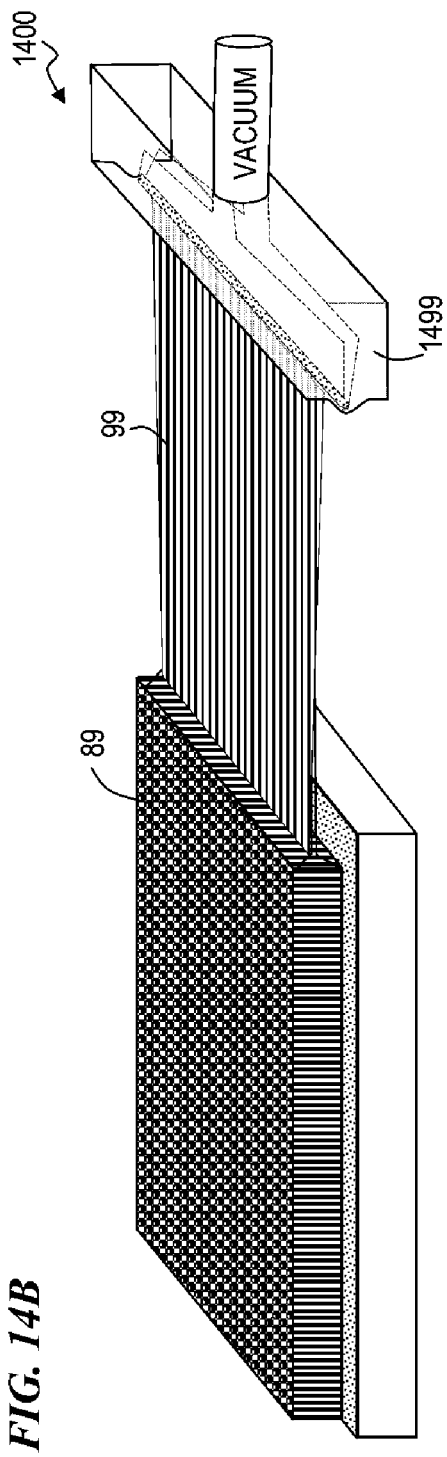
FIG. 14A
FIG. 14B

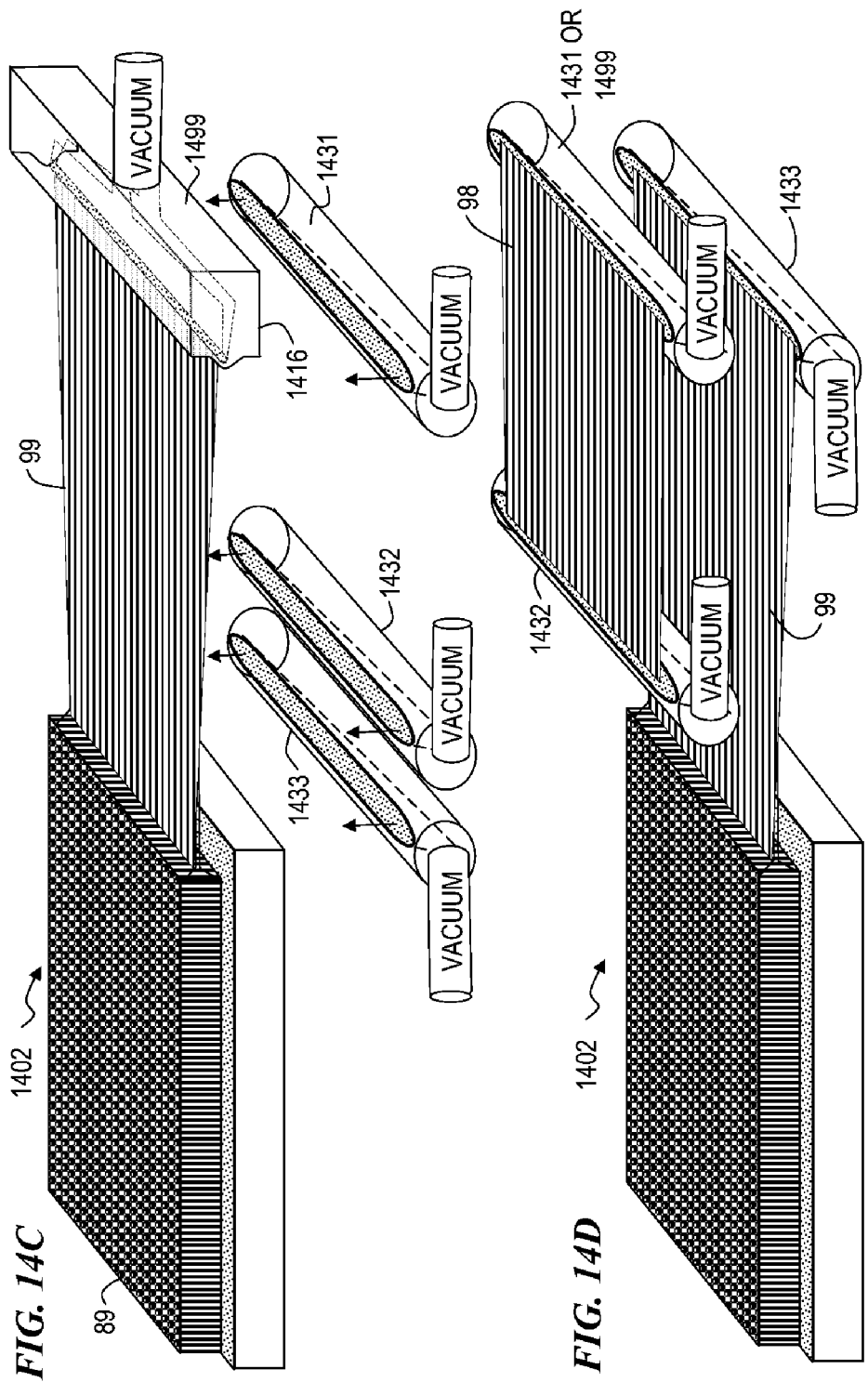

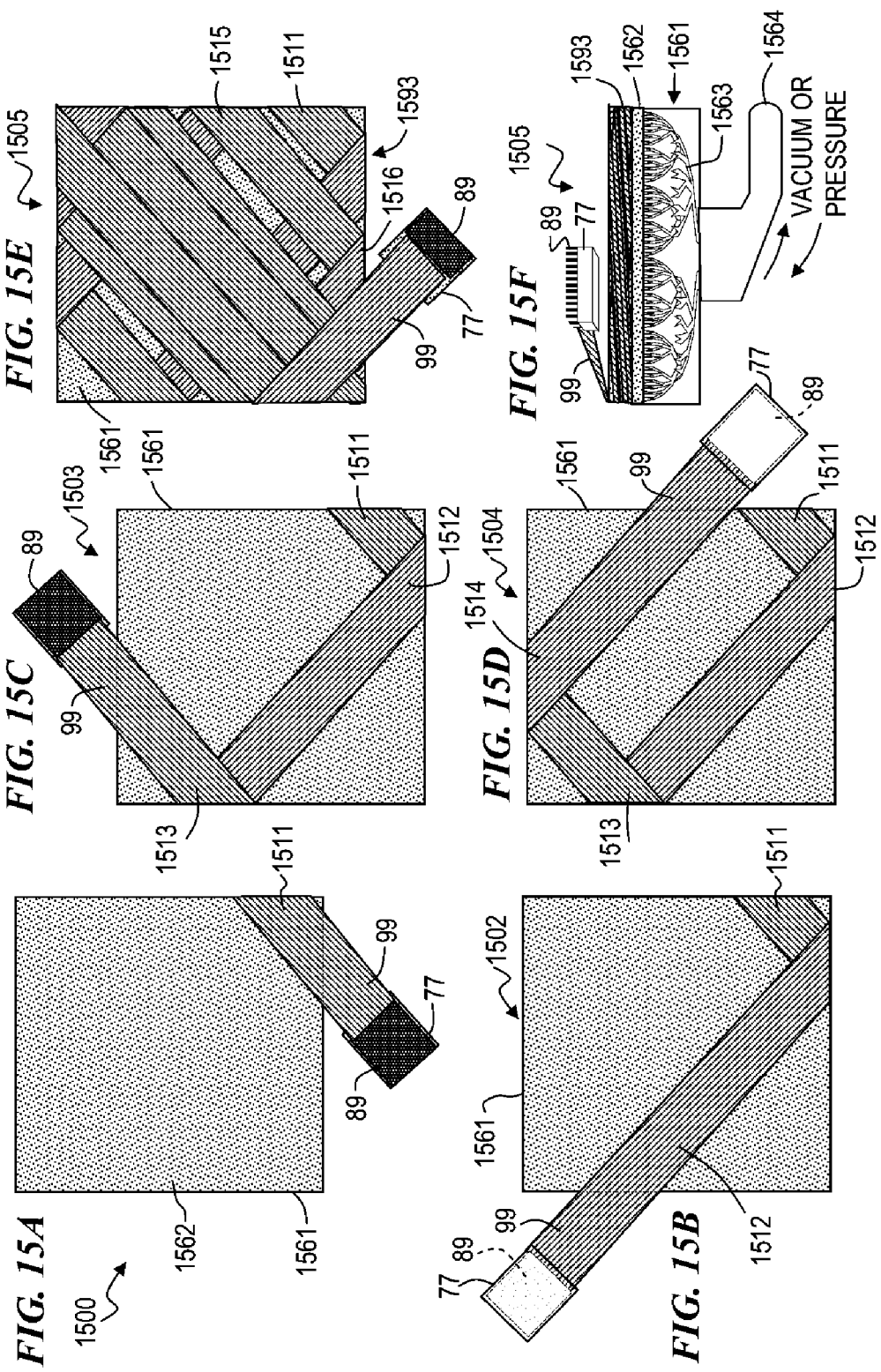

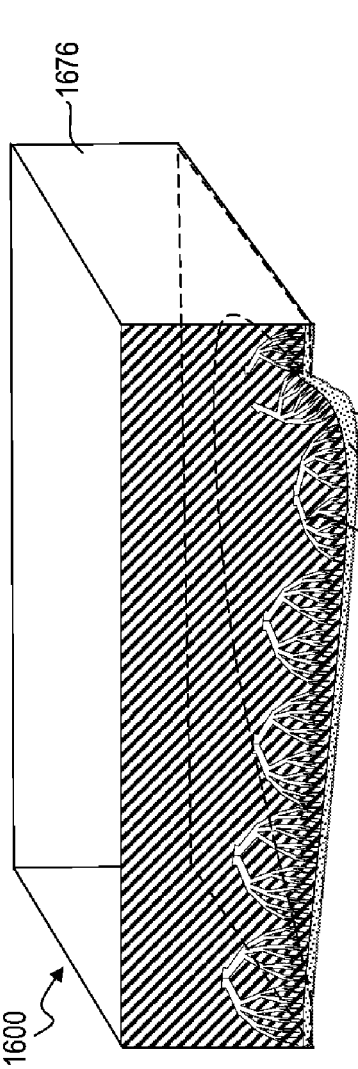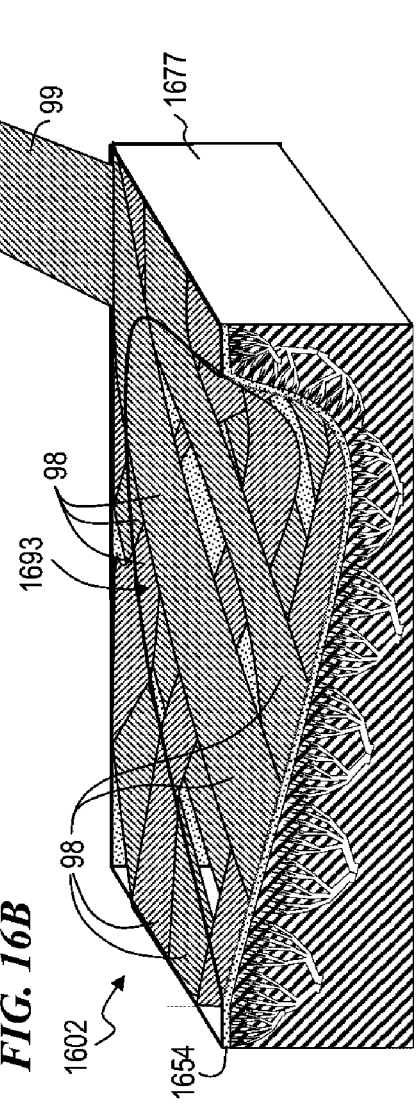

APPARATUS AND METHOD FOR GROWING FULLERENE NANOTUBE FORESTS, AND FORMING NANOTUBE FILMS, THREADS AND COMPOSITE STRUCTURES THEREFROM

RELATED APPLICATION

This application is related to U.S. patent application Ser. No. 11/220,455 (to issue as U.S. Pat. No. 7,744,793 on Jun. 29, 2010) titled "APPARATUS AND METHOD FOR GROWING FULLERENE NANOTUBE FORESTS, AND FORMING NANOTUBE FILMS, THREADS AND COMPOSITE STRUCTURES THEREFROM" filed Sep. 6, 2005, which is incorporated in its entirety herein by reference.

FIELD OF THE INVENTIONS

This invention relates to the field of nanotechnology and specifically to an apparatus and method for generating multi-wall carbon fullerene nanotube "forests," and drawing therefrom sheets, threads, yarns, and/or films using, e.g., various types of adhesion, vacuum holding, surface tension, transport, transfer, weaving, bending, densifying and related techniques.

BACKGROUND OF THE INVENTION

Carbon-based materials, in general, enjoy wide utility due to their unique physical and chemical properties. Recent attention has turned to the use of elongated carbon-based structures, such as carbon fullerene filaments, carbon tubes, and in particular nanosized carbon structures. It has been shown that these new structures impart high strength, low weight, stability, flexibility, good heat and electrical conductance, and a large surface area relative to volume for a variety of applications, such as high-strength fibers, threads, yarns, fabrics, and reinforcement for composites, e.g., nanotube-reinforced epoxy structures.

Of growing commercial interest is the use of single-wall carbon nanotubes to store hydrogen gas, especially for hydrogen-powered fuel cells. Other applications for carbon fibers and/or nanotube materials include catalyst supports, materials for manufacturing devices, such as a tip for scanning electron microscopes, electron field emitters, capacitors, membranes for filtration devices as well as materials for batteries. In short, interest in nanotube technology arises from the very high strength, and electrical and thermo-conductive properties of individual nanotubes.

Finer than carbon fibers, the material with one micron or smaller of diameter is generally called carbon nanotubes and distinguished from the carbon fibers, although no clear line can be run between the both types of carbon fibers. By a narrow definition, the material, of which carbon faces with hexagon meshes are almost parallel to the axis of the tube, is called a carbon nanotube and even a variant of the carbon nanotube, around which amorphous carbon and metal or its catalyst surrounds, is included in the carbon nanotube. (Note that with respect to the present invention, this narrow definition is applied to the carbon nanotube).

Usually, the narrowly-defined carbon nanotubes are further classified into two types: carbon nanotubes having a structure with a single hexagon-connected carbon-mesh in a tube form are called single-wall nanotubes (hereafter, simply referred to as "SWNT"); the carbon nanotubes made of multi-layer hexagon-connected carbon tubes are called multi-wall nanotubes (hereafter, simply referred to as "MWNT"). When grown from a substantially flat substantially planar surface (e.g., a nanoporous surface coated with an iron-oxide catalyst), the typical result is MWNTs. When grown in a dense aligned structure, the parallel nanotubes somewhat resemble a forest, and are referred to generally as a nanotube forest or more specifically as an MWNT forest. The type of carbon nanotubes may be determined by how they are synthesized and the parameters used to some degree, but production of purely one type of the carbon nanotubes has not yet been achieved.

U.S. Pat. No. 6,232,706 entitled "Self-oriented bundles of carbon nanotubes and method of making same" issued May 15, 2001 to Hongjai Dai et al. is incorporated herein by reference. Dai et al. describe a method of making bundles of aligned carbon nanotubes (e.g., for a field-emission device, such as a plasma TV screen) on a porous surface of a substrate, the method comprising the steps of: a) depositing a catalyst material on the porous surface of the substrate and patterning the catalyst material such that one or more patterned regions are produced; and b) exposing the catalyst material to a carbon-containing gas at an elevated temperature such that one or more bundles of parallel carbon nanotubes grow from the one or more patterned regions in a direction substantially perpendicular to the substrate.

Nanotube forests can be combined together to form structures possessing extreme strength characteristics. These strength characteristics, however, are limited by impurities in the structures themselves arising during the manufacturing process, and/or from the design of the structures such that the maximum possible surface-to-volume ratio is not used by the structure. The present invention addresses these and related issues.

SUMMARY OF THE INVENTION

In some embodiments, the present invention provides improved apparatus and methods for growing nanotube forests (such as carbon fullerene nanotubes arranged in a densely packed aligned configuration synthesized from a catalyst-covered substrate). Some embodiments provide apparatus and methods for making and using improved nanotube-growth substrates. Some embodiments provide apparatus and methods for making and using reaction chambers having access ports for removing nanotubes during the growth cycle on a continuous or repeated basis. Some embodiments provide apparatus and methods for making and using composite structures from the nanotube films.

BRIEF DESCRIPTION OF THE DRAWINGS

FIG. 1L is a perspective schematic diagram of a stack of carbon nanotube films, each film in the stack being held at its ends by a first and second adhesive sheet, the films stacked one upon another, in order to obtain a plurality of carbon-nanotube films stacked to form a single thicker film structure.

FIG. 1M is a perspective schematic diagram of a flattened or densified stack of carbon nanotube films, the stack held at its ends by the respective stacks of adhesive sheets.

FIG. 1N is a perspective schematic diagram of a flattened or densified stack of carbon nanotube films being removed from the respective stacks of adhesive sheets by other adhesive-sheet members.

FIG. 1-O is a perspective schematic diagram of a flattened or densified stack of carbon nanotube films being held only by the other adhesive-sheet members.

FIG. 1P is a perspective schematic diagram of a flattened or densified stack of carbon nanotube films being removed from the respective stacks of adhesive sheets by other adhesive-bar members.

FIG. 1Q is a perspective schematic diagram of a flattened or densified stack of carbon nanotube films being held only by the other adhesive-bar members.

FIG. 1R is a perspective schematic diagram of a first carbon nanotube film being pulled from a first carbon nanotube forest about to be spliced to a second carbon nanotube forest.

FIG. 1S is a perspective schematic diagram of a first carbon nanotube film being pulled from a first carbon nanotube forest being spliced to a second carbon nanotube forest.

FIG. 1V is a perspective view of a film-holder opener for a clamping holder.

FIG. 1W is a top view of the film-holder opener.

FIG. 1X is an end view of the film-holder opener.

FIG. 1Y is a side view of the film-holder opener.

FIG. 1Z is a perspective schematic diagram of a carbon nanotube film being inserted into a clamping film-holding-bar such as a split rubber tube.

FIG. 4B is a cross-section side view of an apparatus for the continuous synthesis and collection of carbon nanotubes.

FIG. 4C is a top-view of an apparatus for the continuous synthesis and collection of carbon nanotubes.

FIG. 5G is a cross-section side view of a system for growing densely packed carbon nanotube forests continuously to very long lengths.

FIG. 5H is a cross-section side view schematic of a carbon-nanotube-synthesis apparatus having a heat trap.

FIG. 6B is a close-up side view of flow-through linked substrates used for the continuous synthesis of carbon nanotubes that illustrates the continuous collection of carbon nanotubes from the flow-through linked substrates.

FIG. 6D is a cross-section side view of an over/under furnace and cool-box apparatus.

FIGS. 8A-8K are perspective schematic diagrams of steps in making a flow-through substrate for growing carbon nanotube forests.

FIG. 8L is a bottom-view schematic diagram of a flow-through substrate for growing a carbon nanotube forest.

FIG. 8L1 is a close-up bottom-view schematic diagram of a flow-through substrate for growing a carbon nanotube forest.

FIGS. 8M-8P are perspective schematic diagrams of alternative steps in making a flow-through substrate for growing carbon nanotube forests.

FIGS. 10A, 10B, 10C, and 10D are schematic perspective-view, cross-section view, close-up perspective view and top view diagrams, respectively, of making a continuous-web carbon nanotube film structure.

FIGS. 11A, 11B, 11C, 11D, 11E, and 11F are perspective-view schematic diagrams of system 1100 making a continuous web of crossed films, where each film in the assembly is being held at its ends by a first and second adhesive member of a conveying mechanism, in order to obtain a crossed-film structure of a plurality of carbon-nanotube films in a continuous web.

FIGS. 11A1, 11B1, 11C1, 11D1, 11E1, and 11F1 are side-view diagrams of system 1100 as shown in FIGS. 11A-11F.

FIGS. 12A and 12B are perspective-view schematic diagrams of making a continuous web of crossed films, where each film in the assembly is being held at its ends by a first and second adhesive member of a conveying mechanism, in order to obtain a crossed-film structure of a plurality of carbon-nanotube films in a continuous web.

FIGS. 14A and 14B are perspective-view schematic diagrams of initiating and pulling a continuous film from a carbon-nanotube forest using vacuum film-holding bars.

FIGS. 14C and 14D are perspective schematic diagrams of transferring films pulling a continuous film from a carbon-nanotube forest using vacuum film-holding bars.

FIGS. 15A, 15B, 15C, 15D, 15E, and 15F are top-view schematic diagrams of system 1500 building a cross-woven nanotube cloth on a vacuum table.

FIGS. 16A and 16B are perspective schematic diagrams of system 1600 building a cross-woven nanotube airfoil using a continuous web of crossed films, where each film in the assembly is being held across its entire length and width by a curved vacuum table.

DESCRIPTION OF EMBODIMENTS

Figure 1A:
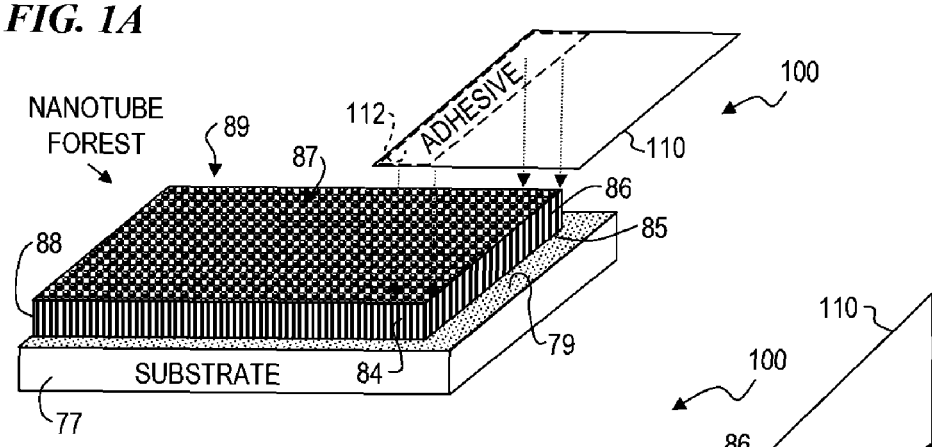
FIG. 1A is a perspective schematic diagram of a film-holding-sheet pull initiation using an adhesive sheet to pull a film starting from the top of a carbon-nanotube forest grown on a substrate.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

The Formation of Nanotube Fibers

The generation of carbon nanotube fibers is an aspect of some embodiments of the present invention and can be achieved using known techniques, such as those described in U.S. Pat. No. 6,232,706 (the Dai et al. Patent), incorporated by reference herein in its entirety. The Dai et al. U.S. Pat. No. 6,232,706 discloses a method of making carbon nanotube bundles attached to substrates.

Some embodiments apply a modification of a method disclosed in U.S. Pat. No. 6,232,706 in order to make large areas of aligned and closely packed carbon nanotubes across substantially the entire top surface of a solid silicon substrate: in a first step A, in some embodiments, a highly P-doped $n^+$ type silicon substrate (100-oriented-crystal top surface, resistivity 0.008-0.018 Ohm-cm) is electrochemically etched in 1:1 HF (49% in water) ethanol with an anodization current density of 10 mA/$cm^2$ (typical etching time is 5 minutes). This forms a thin nanoporous layer (pore size about 3 nanometers) on top of a microporous layer (pore size about 100 nanometers). Next, in a step B, in some embodiments, the top of the porous layer is covered substantially in its entirety (unlike Dai et al.) with a five-nanometer thick iron (Fe) film by e-beam evaporation. In some embodiments, after deposition of iron, the substrate is annealed in air at 300 degrees C. overnight. This annealing step oxidizes the surface of the silicon as well as the iron, converting the iron patterns into catalytically active iron-oxide. The resulting silicon dioxide layer formed on the underlying porous silicon prevents the porous structure of layers from collapsing during the following high-temperature chemical vapor deposition (CVD) step.

Next, in a step C, in some embodiments, the substrate is placed in a tube reactor housed in a tube furnace. The furnace is preheated to 700 degrees C. (or 680 degrees C.) in a flowing inert gas such as argon (or helium). Then, at 700 degrees C. (or 680 degrees C.), the argon (or helium) supply is turned off, and ethylene is flown through the tube reactor at a rate of 1000 sccm/min for 15-60 minutes, (or a mixture of 5 mol % acetylene in a Helium carrier is flown through the tube reactor at a rate of 850 sccm/min for about 10 minutes). The boat for the substrate(s) is sealed at one end, and the sealed end is placed downstream in the furnace. While ethylene is flowing, the iron-oxide surface catalyzes the growth of carbon nanotubes, which grow perpendicular to the substrate. In some embodiments, the iron film is patterned (e.g., by deposition through a shadow mask). If the iron is patterned (e.g., into islands or strips), the width of the bundles is the same as the width of the iron-oxide patterns. Accordingly, the width of the bundles can be tailored to a specific width depending upon the iron oxide patterns used in forming the bundles.

Other embodiments use methods to generate carbon nanotube fibers such as those described in an article by Zhang, Atkinson & Baughman titled "Multifunctional Carbon Nanotube Yarns by Downsizing an Ancient Technology," *Science*; Vol. 306 Nov. 19, 2004 at 1358-1361 (the Zhang et al. 2004 article, which is incorporated herein by reference). Zhang et al. 2004 give credit to, and build on, important advances of the Dai group (S. Fan et al., "Self-Oriented Regular Arrays of Carbon Nanotubes and Their Field Emission Properties," *Science* 283, 512 (1999)) and the Ren group (Z. F. Ren et al., *Synthesis of Large Arrays of Well-Aligned Carbon Nanotubes on Glass*, Science 282, 1105 (1998)). Zhang et al. 2004 disclose a method of manufacturing an aligned nanotube forest, whereby MWNTs (for example) are synthesized in a quartz tube 45 mm in diameter by atmospheric-pressure CVD of 5 mol % $C_2H_2$ in He at 680 degrees C., at a flow rate of 580 sccm for 10 minutes. In some embodiments, the nanotube forest is grown on an iron (Fe) film, 5 nm thick, which, in turn, is deposited on a silicon (Si) wafer substrate by electron beam evaporator. Using this method, various yarns composed of carbon nanotube fibers were generated by Zhang et al. 2004, with a purity of between 96 to 98% and 2 to 4% Fe and amorphous carbon.

Additionally discussed in Zhang et al. 2004 is a method by which various yarns are generated using the fibers created from a MWNT forest, wherein these fibers are twisted together to approximately 80,000 turns/meter such that once the ends of the twisted fibers are released the twisted structure is retained. According to Zhang et al. 2004, this twisted structure is retained, in part, because of the very high surface-to-volume ratio between the MWNTs.

The generation of carbon nanotube forests is a component of some embodiments of the present invention and can be achieved either using the new techniques described herein, or by known techniques, such as those described in an article titled "Strong, Transparent, Multifunctional, Carbon Nanotube Sheet," *Science*, Vol. 309 Aug. 19, 2005 at 1215-1219 (the Zhang et al. 2005 article, which is incorporated herein by reference).

Zhang et al. 2005 mention a method of manufacturing a MWNT forest based upon the techniques as described above by Zhang et al. 2004 and apply these techniques to the manufacture of MWNT sheets. In manufacturing such sheets, a MWNT forest is generated applying the techniques of Zhang et al. 2004. The techniques of Dai et al. could also be applied to generate such forests. Zhang et al. 2005 draw MWNT sheets from the MWNT forest using an adhesive strip (e.g., a 3M Post-It Note™) to contact the MWNTs and draw a sheet therefrom. In some embodiments, a 1-cm length of 245-micron-high (i.e., about 0.25 mm) forest converts to about a 3-m long (a 300:1 ratio) strip of freestanding MWNT sheet. Once drawn, these sheets can be stacked one on top of another for increased strength, set in an overlay or crossed-film pattern.

Moreover, Zhang et al. 2005 describe a process of densifying these MWNT sheets whereby the sheets are placed/attached onto a planar substrate composed of glass, gold, silicon, aluminum, steel, plastic or some other substrate known in the art. The process includes immersing the substrate and attached MWNT sheet vertically into a bath of a liquid, such as ethanol, and then retracting the substrate vertically from the liquid and drying. The thinning and surface tension of the liquid evaporating shrinks the thickness of the MWNT sheet, thus making the carbon nanotube sheets themselves denser. Some embodiments of the invention use improved methods for applying and evaporating a densifying liquid on a continuous basis to a web moving in a continuous or roll-to-roll manner.

Some embodiments of the present invention use improved MWNT-forest-growing techniques to make carbon nanotubes, the methods modified from those described in the above-mentioned published articles and U.S. Pat. No. 6,232,706. Other embodiments of the present invention use improvements of methods such as described in U.S. Patent Application US 2004/0062708A1 published Apr. 1, 2004 by Remskar et al, in order to make nanotubes from materials other than carbon, for example synthesis and self-assembly of single-wall subnanometer-diameter molybdenum disulfide tubes. In some embodiments, the nanotubes contain interstitial iodine, which is removed as the molybdenum-disulfide-nanotube forest is pulled into molybdenum-disulphide nanotube films. In some embodiments, synthesis is performed using a catalyzed transport reaction similar to that described by Remskar including C60 as a growth promoter. In contrast to Remskar et al., the present invention, in some embodiments, uses modifications and new techniques similar to those described below, but using a quartz substrate for the molybdenum-disulfide-nanotube growth surface.

FIG. 1A is a perspective schematic diagram of system 100 in which a film-holding-sheet pull initiation uses an adhesive sheet 110 (such as a Post-It®-brand sticky note, Scotch®-brand transparent sticky tape or other suitable substrate having an adhesive area 112) from the top 87 of a carbon-nanotube forest 89 grown on a substrate 77. In some embodiments, substrate 77 has a nanoporous top surface 79 having a catalyst (such as iron oxide, for example—in some embodiments, a 5-nm iron film is oxidized to form the catalyst; in other embodiments, one or more other transition metals are substituted for, or added to, the iron, such as nickel, cobalt, or other suitable composition) suitable for growing tubular fullerene structures (e.g., multi-walled carbon nanotubes, or MWNTs). In some embodiments, nanotube forest 89 includes a large plurality of substantially aligned, densely packed MWNTs. In other embodiments, forest 89 includes a large plurality of substantially aligned, densely packed single-walled nanotubes, or SWNTs. In other embodiments, nanotubes made of other materials such as Forest 89 includes a nanotube forest front wall 86 that exposes the left-hand sides (relative to the drawing) of an outer row of nanotubes and from which a film will be drawn, nanotube forest base 85 where the nanotubes are connected to the catalyst surface of substrate 77 (where it is believed that growth takes place), nanotube forest top 87, nanotube forest back wall 88, and nanotube forest side walls 84. In some embodiments, a nanotube film 99 is started by pressing adhesive sheet 110 onto forest top 87 where it meets forest front 86, and then pulling adhesive sheet 110 towards the right. Other embodiments substitute a film-holding sheet 110 having a liquid such as alcohol, water, and/or oil to hold nanotube film 99 in place, rather than (or in addition to) adhesive 112 (this optionally applies to all embodiments described herein).

Figure 1B:
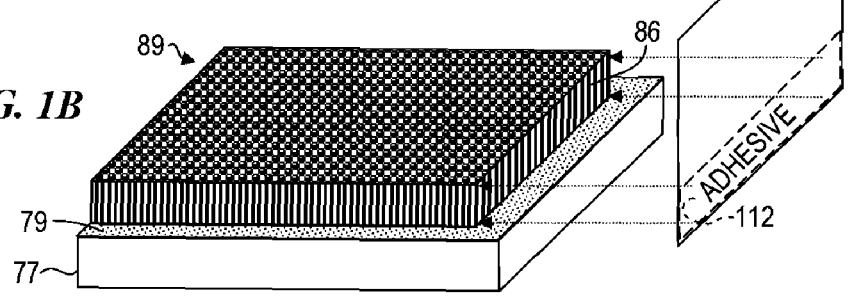
FIG. 1B is a perspective schematic diagram of a film-holding-sheet pull initiation using an adhesive sheet to pull a film starting from the front face of a carbon-nanotube forest.

FIG. 1B is a perspective schematic diagram of system 100 in which a film-holding-sheet pull initiation uses an adhesive sheet 110 where adhesive area 112 is initially pressed against front face 86 of carbon-nanotube forest 89, and then adhesive sheet 110 is withdrawn towards the right.

Figure 1C:
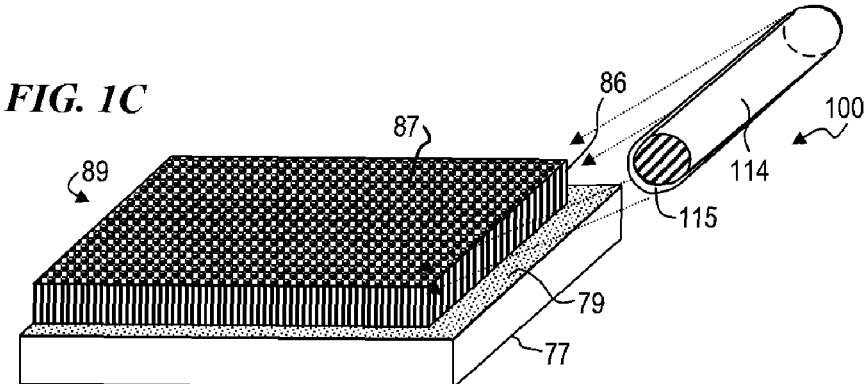
FIG. 1C is a perspective schematic diagram of a film-holding-bar pull initiation using a cylindrical adhesive-coated bar to initiate a pull at the top and/or front face of a nanotube forest.

FIG. 1C is a perspective schematic diagram of system 100 in which a film-holding-bar pull initiation uses an adhesive bar 114 having an adhesive surface 116 from the top 87 and/or front face 86 of carbon-nanotube forest 89. In some embodiments, adhesive surface 116 (and/or the other adhesive surfaces described herein) includes an adhesive such as found on a Post-It®-brand sticky note, Scotch®-brand transparent sticky tape, such as described in U.S. Pat. No. 6,479,073 entitled "Pressure sensitive adhesive articles and methods for preparing same" or U.S. Pat. No. RE24,906 entitled "Pressure-sensitive adhesive sheet material" by inventor Erwin W. Ulrich (both of which patents are incorporated herein by reference) or other suitable adhesive.

Other embodiments substitute a film-holding bar 114 (and/or similar structures for the other adhesive surfaces described herein) having a liquid such as ethanol or other alcohol (such as poly(vinyl alcohol)), water, and/or oil selected for its ability to hold nanotube film 99 in place, rather than (or in addition to) adhesive 116 (this optionally applies to all embodiments described herein). Still other embodiments substitute a vacuum film-holding bar 1410, as described below in FIG. 14E, to hold nanotube film 99 in place, rather than (or in addition to) adhesive 116 (this optionally applies to all embodiments described herein).

Figure 1D:
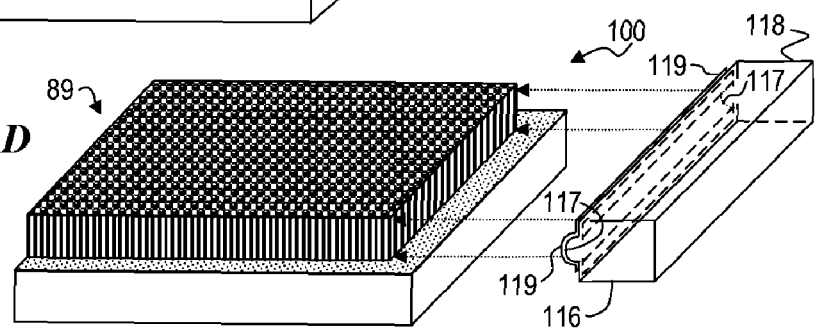
FIG. 1D is a perspective schematic diagram of a film-holding-bar pull initiation using an adhesive bar to pull a film starting from the front face of a carbon-nanotube forest.

FIG. 1D is a perspective schematic diagram of system 100 in which a film-holding-bar pull initiation uses an adhesive bar 118 having an adhesive surface 119 from front face 86 of carbon-nanotube forest 89. In some embodiments, bar 118 has a bottom surface 116 that rests on substrate surface 79 as the adhesive-coated rounded front nose 117 of bar 118 is moved into engagement with forest front face 86, wherein the spacing between, bottom 116 and nose 117 is selected such that nose 117 first contacts approximately the midpoints of nanotubes 80. In other embodiments, the spacing between bottom 116 and nose 117 is selected such that nose 117 first contacts below the midpoints of nanotubes 80, and bar 118 is first moved upward slightly while adhesive 119 is in contact with the front face 86 and then bar 118 is pulled to the right or in a general direction to the right relative to the orientation in FIG. 1D.

Figure 1E:
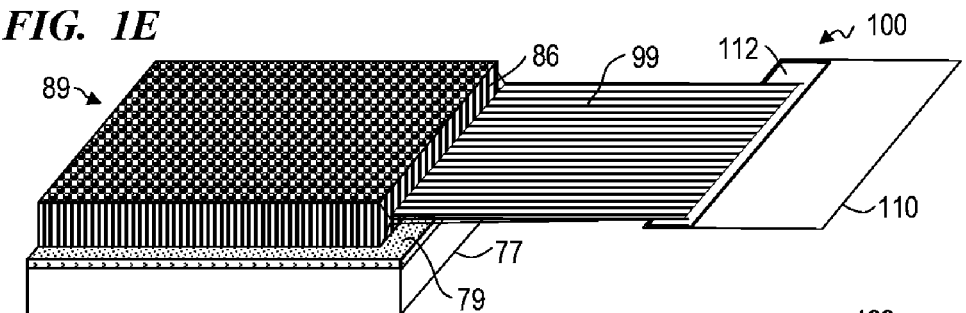
FIG. 1E is a perspective schematic diagram of a film-holding-sheet pull from the face of a carbon-nanotube forest using an adhesive sheet.

FIG. 1E is a perspective schematic diagram of a film-holding-sheet pull or draw from the face 86 of a carbon-nanotube forest 89 using an adhesive sheet 110.

Figure 1F:
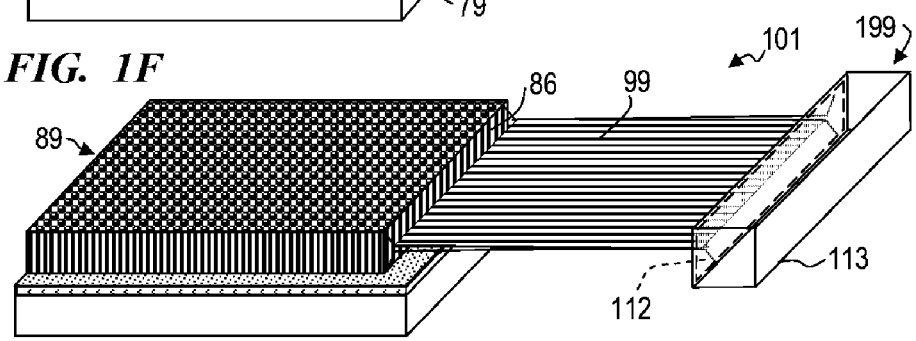
FIG. 1F is a perspective schematic diagram of a film-holding-bar pull from the face of a carbon-nanotube forest using an adhesive bat.

FIG. 1F is a perspective schematic diagram of a film-holding-bar pull from the face 86 of a carbon-nanotube forest 89 using an adhesive bar 113 having an adhesive face 112.

Figure 1G:
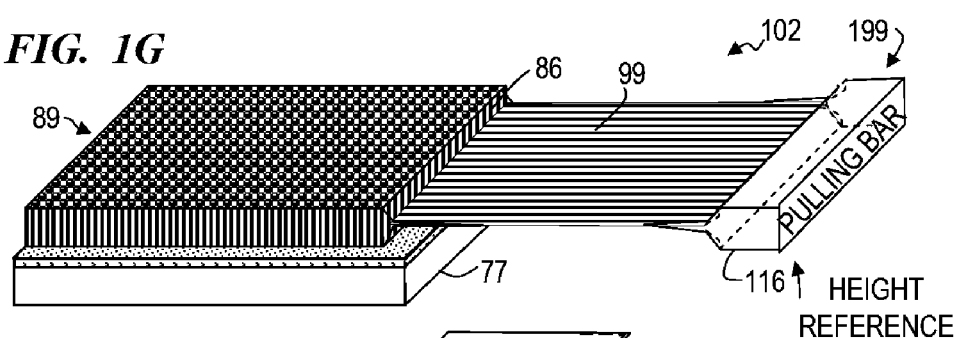
FIG. 1G is a perspective schematic diagram of a film-holding-bar pull from the face of a carbon-nanotube forest using a rounded-front adhesive bar.

FIG. 1G is a perspective schematic diagram of a film-holding-bar pull from the face 86 of a carbon-nanotube forest 89 using a rounded-front adhesive bar 118. Generically, all of the film-holding bars (including the vacuum bars of FIG. 14) herein can be used for pulling or holding film 99, and are referred to simply as film-holding puller bar 199 when being used to pull a carbon nanotube film 99 from a forest 89.

Figure 1H:
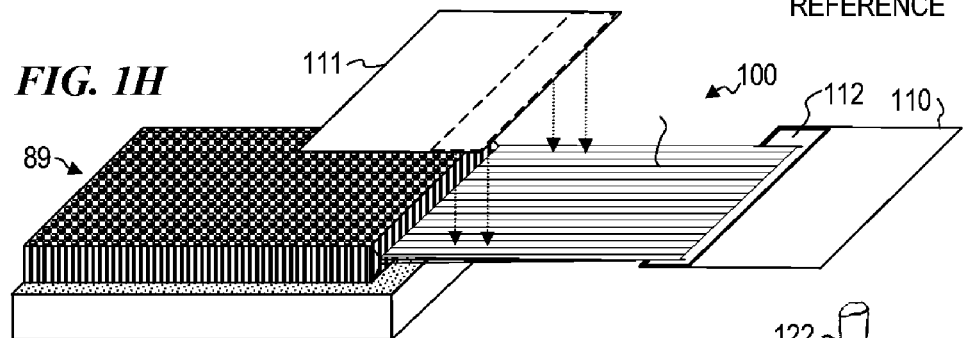
FIG. 1H is a perspective schematic diagram of a second adhesive-sheet attachment to the second end of a film already pulled from a face of a carbon-nanotube forest using an adhesive sheet in order to remove the film from the carbon-nanotube forest.

FIG. 1H is a perspective schematic diagram showing attachment of a second adhesive sheet 111 to the second end of a film 99 pulled to a desired length from a face of a carbon-nanotube forest 89 using an adhesive sheet 110. In some embodiments, a third adhesive sheet is simultaneously attached to the bottom of film 99 at a location closer to forest 89, and the film 99 is cut, torn, or otherwise separated between the second adhesive sheet 111 and the third adhesive sheet, which then becomes adhesive sheet 110 for the continued pulling of additional film 99 from forest 89, while the removed film 98 is held by first and second adhesive sheets 110 and 111.

Figure 1I:
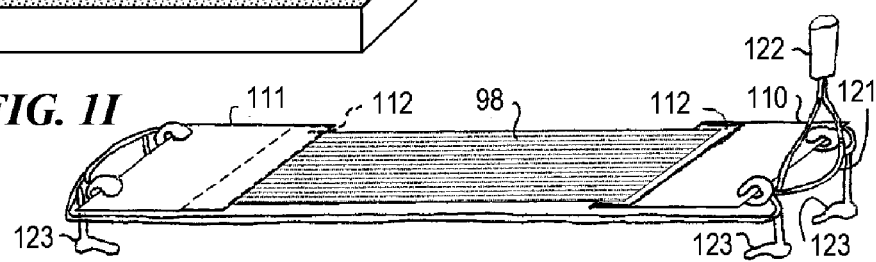
FIG. 1I is a perspective schematic diagram of a carbon nanotube film held at its ends by a first and second adhesive sheet after the film has been removed from the nanotube forest.

FIG. 1I is a perspective schematic diagram of a carbon nanotube film 98 held at its ends by first adhesive sheet 110 and second adhesive sheet 111, after the film 98 has been pulled and then removed from the carbon-nanotube forest 89. In some embodiments, a spacer bar 121 is used to hold one or more first adhesive sheets 110 and second adhesive sheets 111 at a fixed distance apart to prevent sagging or overstretching of film 99. In some embodiments, a handle 122 and/or feet 123 are provided so a person can manually handle the fragile film 98 more easily. (While film 98 is very strong compared to other materials of similar weight and length, multiple layers must be aggregated and/or embedded in a polymer to achieve noticeable strength on a macro scale.)

Figure 1J:
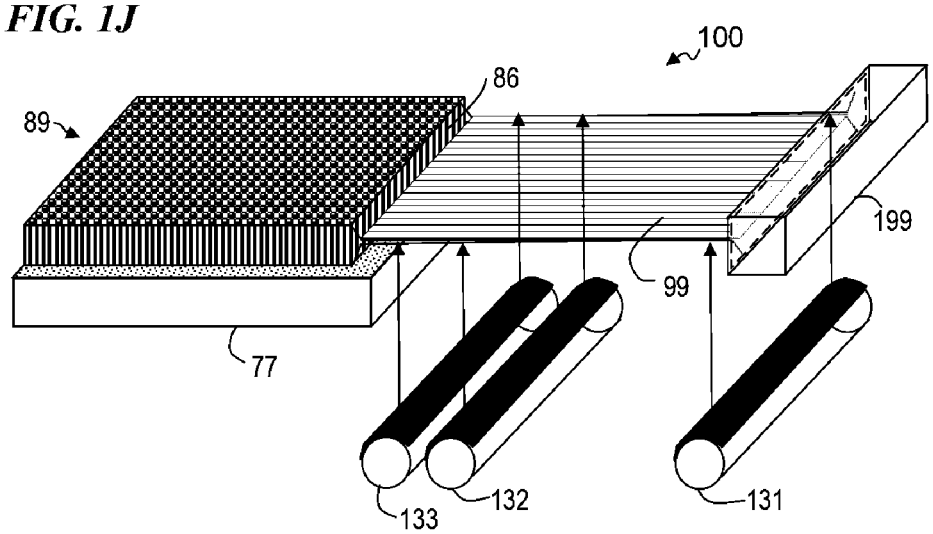
FIG. 1J is a perspective schematic diagram of a first, second and third adhesive bar being attached to a film pulled from face of a carbon-nanotube forest using an adhesive bar.

FIG. 1J is a perspective schematic diagram of a first adhesive bar 131, second adhesive bar 132 and third adhesive bar 133 being attached to a film 99 pulled from face 86 of a carbon-nanotube forest 89 using adhesive puller bar 199.

Figure 1K:
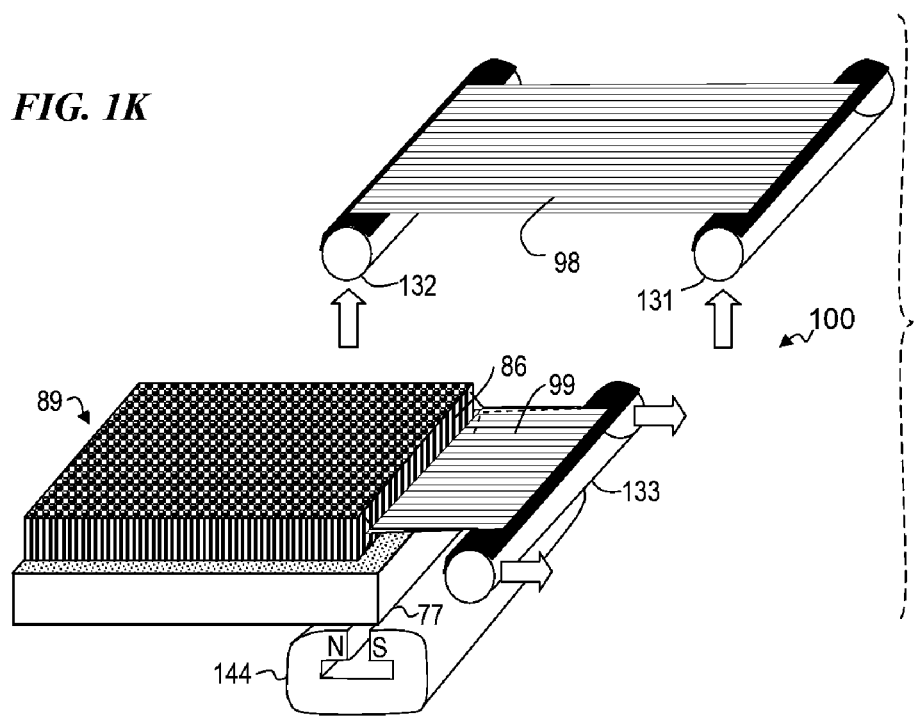
FIG. 1K is a perspective schematic diagram of a carbon nanotube film held at its ends by the first and second adhesive bar after removing the film from the carbon-nanotube forest, while the third adhesive bar is used to pull an additional length of film from a face of the carbon-nanotube forest.

FIG. 1K is a perspective schematic diagram of a carbon nanotube film 98 held at its ends by first adhesive bar 131 and second adhesive bar 132 after removing the film 98 from the carbon-nanotube forest 89, while the third adhesive bar 133 is used as adhesive puller bar 199 to pull an additional length of film 99 from a face of the carbon-nanotube forest 89. In some embodiments, first adhesive bar 131 and second adhesive bar 132 are held at a fixed distance apart by a spacer bar similar to spacer bar 121 of FIG. 1I. In some embodiments, a strong magnet 144 is positioned adjacent the face of substrate opposite where the nanotube forest 89 is being harvested. The nanotube formation process as described by Zhang et al. 2004 yields nanotube fibers with a purity of between 96 to 98% and 2 to 4% Fe and amorphous carbon. In some embodiments, an adhesion layer of nickel (Ni), titanium (Ti), vanadium (V), or some other suitable metal or composition is placed onto the nanoporous substrate (such as that disclosed in Zhang et al. 2004) and the iron (Fe) catalyst deposited thereon. The Fe layer is oxidized in order to form the catalyst. One purpose of this adhesion layer is to suppress separation of iron (Fe) or iron oxide from the catalyst layer and thereby placing impurities in the nanotube fiber. Keeping the iron oxide on the substrate also allows the substrate to be reused to grow more carbon nanotubes. In some embodiments, the strong north-south magnet 144 is placed, or a similar magnetic field is generated, under the substrate at or near the area of release (i.e., where the bases of the nanotubes are separating from the substrate) during the pulling of the nanotube film from the nanotube forest to attract the iron or iron compounds so as to prevent iron (Fe) from contaminating the nanotube fibers, by keeping iron on the surface of the nanoporous layer. In some embodiments, both the adhesion layer and the magnetic field are used to retain the catalyst material.

FIG. 1L is a perspective schematic diagram of a stack 105 of carbon nanotube films 98, each film in the stack 105 being held at its ends by a first adhesive sheet 110 and second adhesive sheet 111, the films 98 stacked one upon another, in order to obtain a plurality of carbon-nanotube films 98 stacked to form a single thicker film structure. In some embodiments, one or more stacks of adhesive strips are used to generate a layered, thinned, and flattened nanotube structure. In these embodiments, a first adhesive strip is placed at each end of a nanotube film 98 drawn to a suitable length (e.g., 3 meters or other suitable length). A second nanotube film 98 is placed on top of the first single nanotube film 98, and the adhesive strips holding its ends are placed on top of the adhesive strip holding the first film. This process is continued until a nanotube structure of a suitable number of layers is obtained. The suitability of a particular number of layers can be determined by empirical testing and/or modeling. As this nanotube structure 97 is completed, the stacks of adhesive strips 110 are built up at the ends of the structure 97, layered one on top of another.

Once a nanotube structure of a suitable thickness is created, each stack of adhesive strips 134 and 135 is turned or bent to an angle of ninety (90)-degrees to the nanotube structure such that it is perpendicular to the length of the nanotube structure 97 in a direction opposite that of the other end. In some embodiments, the angle to which both the stack of adhesive strips and substrate are bent is greater than ninety (90) degrees. The optimum angles can be determined through empirical testing or modeling. Thus, in some embodiments, the stacks of adhesive strips 134 and 135 are bent to ninety-degree angles to the film stack 97 in directions opposite from one another (and perpendicular to the nanotube structure 97).

FIG. 1M is a perspective schematic diagram of method 106 to form a flattened or densified stack 97 of carbon nanotube films 98, the stack 97 held at its ends by the respective first stack 135 of first adhesive sheets 110 and second stack 134 of second adhesive sheets 111, which, in some embodiments, are each folded at a right angle to film stack 97 (in some embodiments, one stack (e.g., stack 135) is folded up and the other (e.g., stack 134) folded down, in order to keep all films 98 at the same length and tautness).

In some embodiments, as a result of bending the first and second stacks of adhesive strips such that their ends are coplanar, the layered nanotube structure will be condensed, thinned and flattened, and the strength of the nanotube structure will be increased due, in part, to very high surface-to-volume ratio between the various layers of single nanotubes (i.e., by the nanotubes of the parallel layers sticking to one another across greater surface areas). Specifically, a greater portion of the surface area of a single nanotube will come into contact with the a greater portion of the surface area of a second single nanotube, and the second nanotube sheet will come into contact with a third, and so on and so on, resulting in a very strong layered and flattened nanotube structure.

FIG. 1N is a perspective schematic diagram of a flattened or densified stack 97 of carbon nanotube films 98 being removed from the respective stacks 134 and 135 of adhesive sheets 111 and 110 by other adhesive-sheet members 136 and 137. In some embodiments, the adhesive 112 on adhesive-sheet members 136 and 137 will stick to all layers of film stack 97, and the film ends attached to stacks 134 and 135 can be cut or torn off.

Figure 10E:
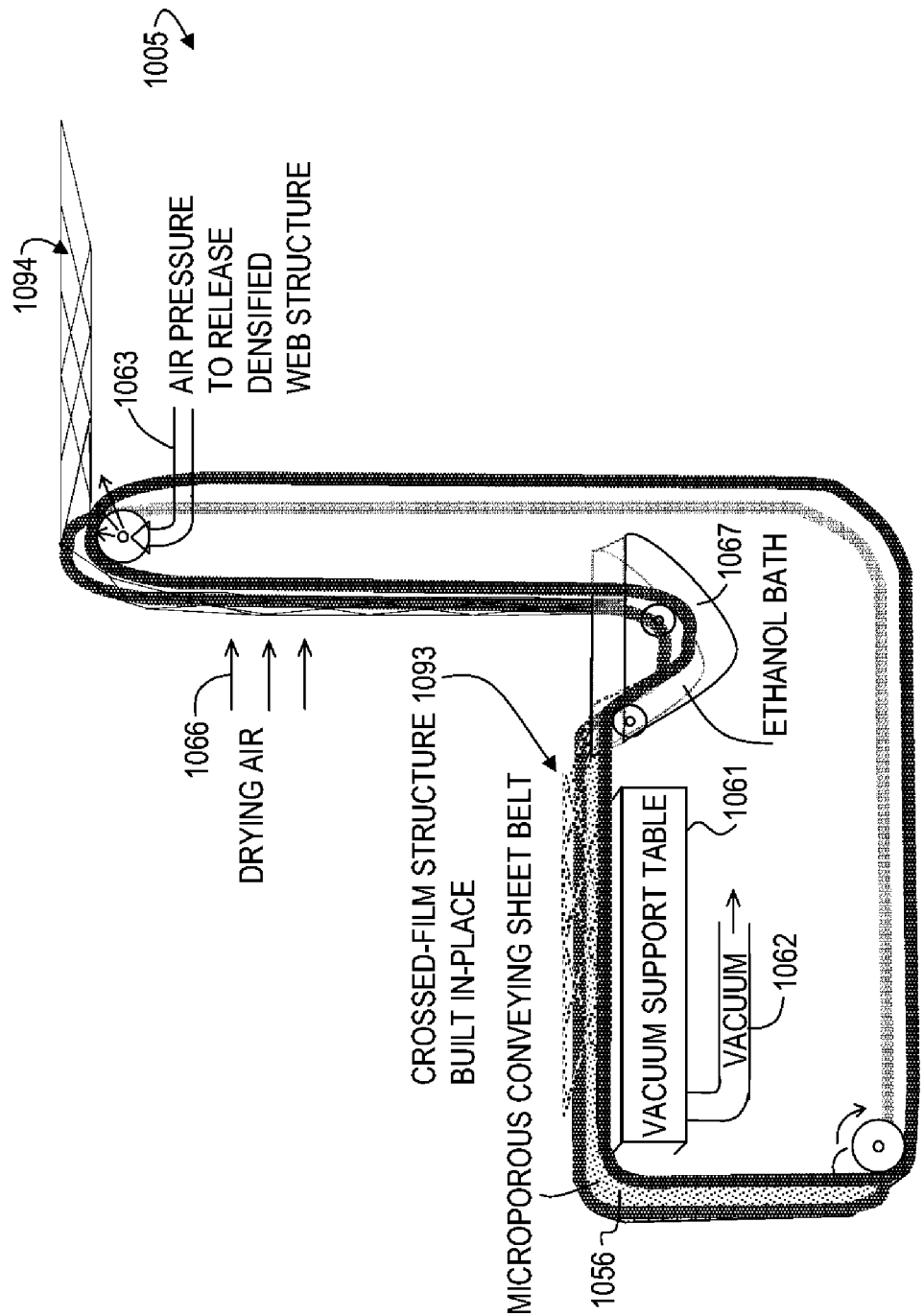
FIG. 10E is a perspective schematic diagram of densification steps in making a densified continuous-web carbon nanotube film structure.

FIG. 1-O is a perspective schematic diagram of a flattened or densified stack 97 of carbon nanotube films being held at their ends only by adhesive-sheet members 136 and 137. In some embodiments, the resulting stack is densified by placing film stack 97 on a surface, applying a liquid, and having the liquid evaporate to draw the fibers together by surface tension. In some embodiments, the densification is performed with the stack of films 97 held on a sheet or backing, and in some embodiments, is performed on an endless belt such as shown in FIG. 10E.

In at least one embodiment, a series of layered and flattened nanotube structures 97, e.g., created using the method described above, is used to form a further nanotube structure in a cross-hatch pattern as described in FIGS. 2A-2E below. In some embodiments, the above described layered and flattened nanotube structures 97 are used to form a nanotube structure in a cross-layer pattern. In some embodiments, a parallel-oriented layered nanotube structure is created. A plurality of these layered nanotube structures is then placed into a cross-hatch, cross-layer, woven or some other pattern. Once placed into one of these patterns, the adhesive-strip stack and substrates are folded to densify the nanotube structure in the above described manner. The result of this bending is that these nanotube structures that make up the above described patterns are flattened and densified, and hence stronger than they would otherwise be.

FIG. 1P is a perspective schematic diagram of a flattened or densified stack 97 of carbon nanotube films 98 being removed from the respective stacks 134 and 135 of adhesive sheets by adhesive-bar members 138 and 139 having adhesive coatings 115.

FIG. 1Q is a perspective schematic diagram of a flattened or densified stack 97 of carbon nanotube films 98 being held only by adhesive-bar members 138 and 139.

FIG. 1R is a perspective schematic diagram of a splice process 107 in which a first carbon nanotube film 99 being pulled from a first carbon nanotube forest 89 about to be spliced to a second carbon nanotube forest 89' using splicer bar 130. In some embodiments, splicer bar 130 includes a non-adhesive front nose 141 configured to press film 99 into approximately the center of front face 86' of forest 89'. In some embodiments, front nose 141 includes a porous front surface (see FIG. 14A) through which a vacuum is selectively applied in order to hold and later release film 99 during the splice process 107. Some embodiments of splice bar 130 also include a cutting edge 142 for severing the initial film 99 once the splice has been made.

FIG. 1S is a perspective schematic diagram of a first carbon nanotube film 99 from a first carbon nanotube forest 89 being spliced to a second carbon nanotube forest 89'.

Figure 1T:
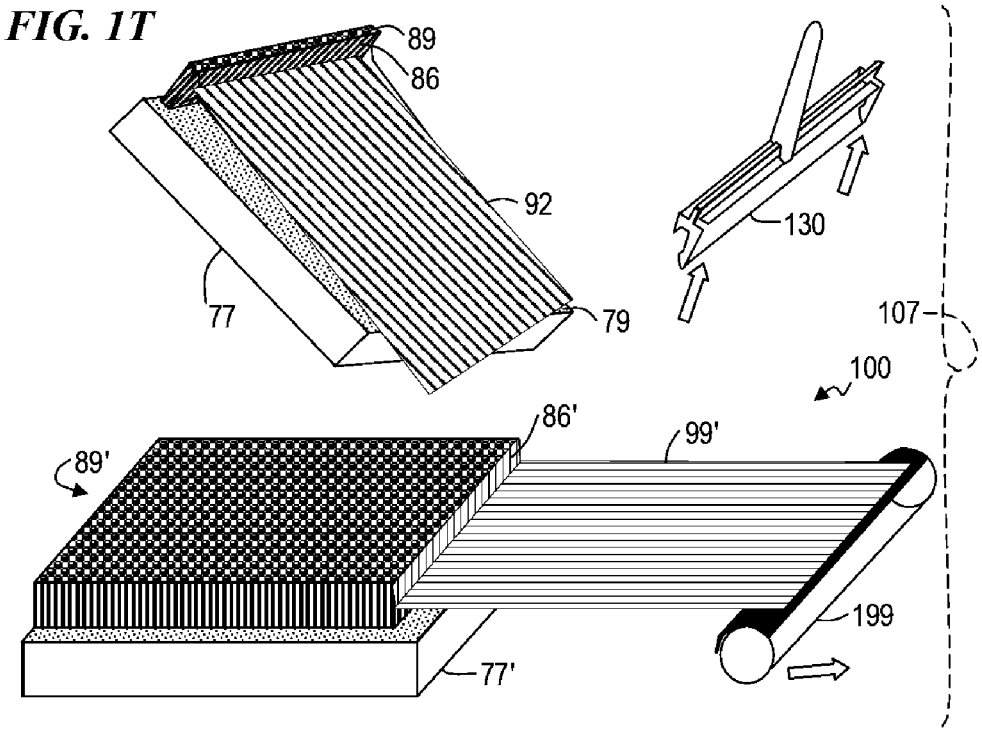
FIG. 1T is a perspective schematic diagram of a first carbon nanotube film being pulled from the second carbon nanotube forest after being spliced and removed from the first carbon nanotube forest.

FIG. 1T is a perspective schematic diagram of carbon nanotube film 99' being pulled from the second carbon nanotube forest 89' after being spliced and removed from the first carbon nanotube forest 89. Splicer bar 130 is being withdrawn.

In some embodiments, a small amount of forest 89 and a small film tail 92 may remain unused, and may be removed and recycled as ordinary carbon nanotube material. Once the remaining forest 89 is removed from substrate 77, additional carbon nanotube forest can be re-grown from catalyst surface 79, which, in some embodiments, may or may not be porous. It is believed that when a nanotube is grown from a catalyst-covered porous surface such as described herein, each MWNT grows from its base at or near the iron-oxide catalyst. It is believed that when a nanotube film is pulled from a nanotube forest, the MWNTs break at or near the iron-oxide catalyst (where the molecular bonds are perhaps not as strong and/or not aligned as they are elsewhere in each MWNT). This would typically leave most or all of the catalyst attached to the growth surface, available to catalyze further growth if the substrate is again placed in a growth furnace and supplied with carbon-bearing source gas.

Figure 1U:
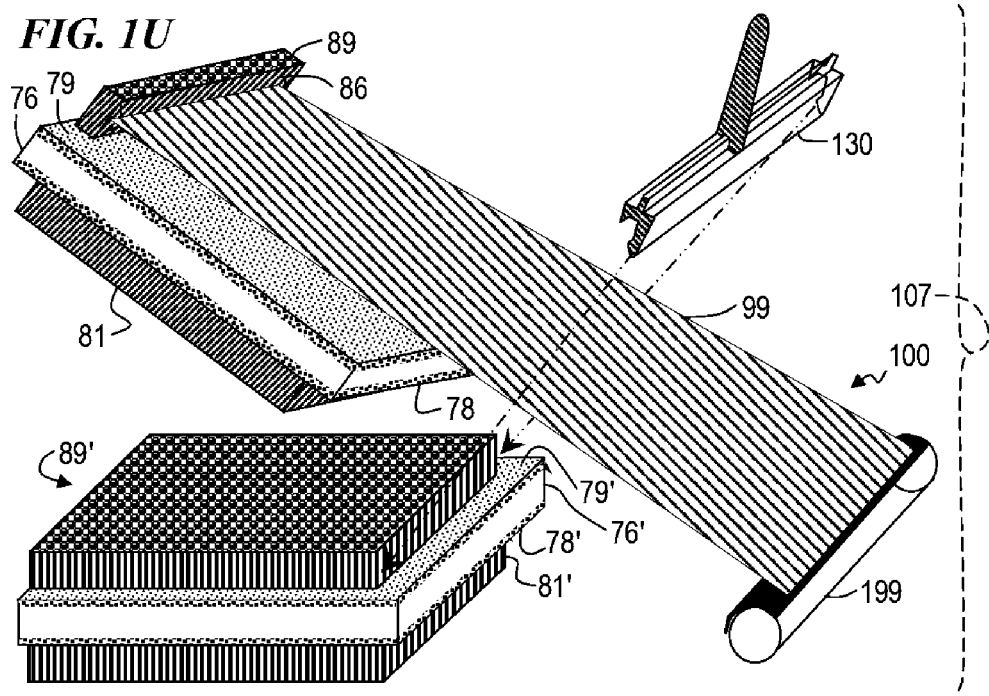
FIG. 1U is a perspective schematic diagram of a first carbon nanotube film being pulled from a first carbon nanotube forest on the top of a first double-sided substrate about to be spliced to a second carbon nanotube forest on the top of a second double-sided substrate.

FIG. 1U is a perspective schematic diagram of a system 108 wherein a first carbon nanotube film 99 being pulled from a first carbon nanotube forest on the top of a first double-sided substrate 76 is about to be spliced to a second carbon nanotube forest 89' on the top of a second double-sided substrate. In the embodiment shown, a bottom-side nanotube forest 81 is grown on the opposite-face growing surface 78, at the same time as top-side forest 89 is grown on top-side growing surface 79 of double-sided substrate 76. At a later time, substrate 77 may be flipped and a film 99 may be spliced to its nanotube forest 81. At a still later time, substrate 77' may be flipped and a film 99 may be spliced to its nanotube forest 81'. In this manner, a much longer film can be pulled than if the film 99 is pulled from only a single substrate 77.

FIG. 1V is a perspective view of a film-holder opener 185 for a clamping holder such as a split rubber tube. In some embodiments, film-holder opener 185 includes a bulb nose 186 to insert into the hollow core 183 of a clamping holder 181 (see FIG. 1Z), opposing separating surfaces 189 for holding the slit 182 of clamping holder 181 open as it is slid past film-holder opener 185. Opening 187 provides a space in which to insert film 98, for example by air flow (either pressure from outside or vacuum from inside). In some embodiments, pressurized air is directed through nozzle 188 (see FIG. 1Z), in order to push a film 98 through opening 187 and thus into film-holder 181. In some embodiments, a vacuum is applied to the conduit extending from the top of film-holder opener 185 in order to suck a film 98 through opening 187 and thus into film-holder 181. In some embodiments, the bottom of film-holder opener 185 is open from the film-depositing area and downstream in order that more of the film 98 comes in contact with the walls of hollow core 183, so that the film 98 moves with and is gripped by film-holder 181 rather than sticking to film-holder opener 185. In some embodiments, a flat surface 179 is provided next to film-holder opener 185 and supports film 98 as it is inserted into opening 187, wherein surface 179, film 98, and film-holder 181 do not move laterally relative to one another during the insertion process. Film-holder opener 185 is then moved towards the right (in the orientation shown the drawing), and slot 182 closes, thus gripping film 98. FIG. 1W is a top view of the film-holder opener 185. FIG. 1X is an end view of the film-holder opener 185. FIG. 1Y is a side view of the film-holder opener 185.

FIG. 1Z is a perspective schematic diagram of a carbon nanotube film 99 being inserted into a clamping film-holding-bar 181, such as a split rubber tube, for example. In some embodiments, a clamping film-holding-bar 181 includes a tube made of synthetic rubber or other elastomeric material having a hollow core 183 (which helps keep film-holding-bar 181 on film-holder opener 185 as it is slid right-to-left (in the orientation shown the drawing)) and a slit 182. In some embodiments, film-holder opener 185 (the embodiment shown in FIG. 1Z is slightly different than that of FIGS. 1V-1Y) has a bulb nose 186 and a top slot 187, which holds the slit 182 open as the film 98 is inserted. In some embodiments, pressurized air is directed through nozzle 188 to push a film 98 through opening 187 and thus into film-holder 181. In some embodiments, a vacuum is applied to the conduit extending from the top of film-holder opener 185 in order to suck a film 98 through opening 187 and thus into a film-holder 181.

Figure 2A:
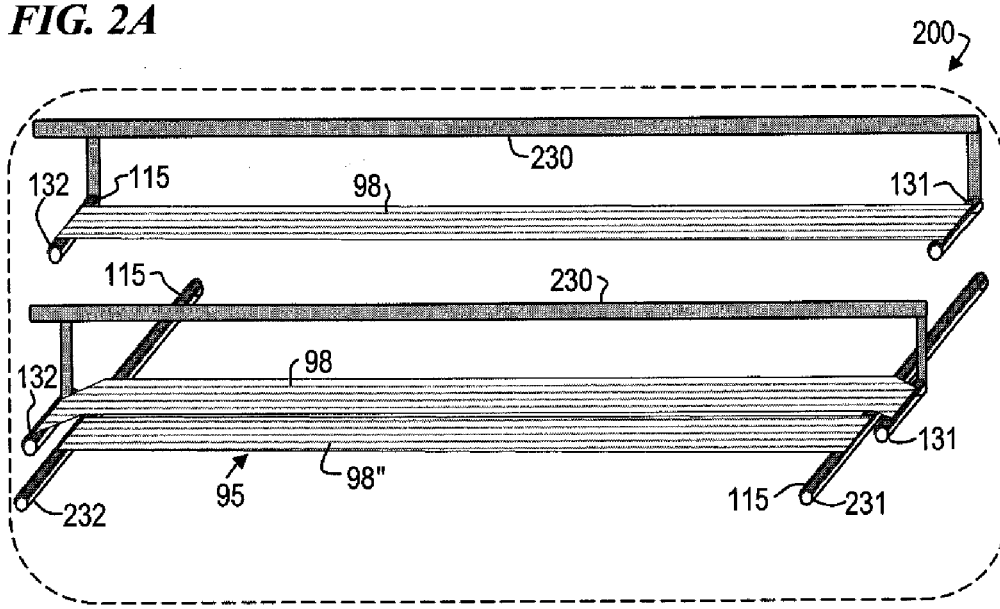
FIG. 2A is a perspective schematic diagram of an assembly of carbon nanotube films, each film in the assembly being held at its ends by a first and second adhesive rod, band or other or member, the films placed one next to another and each transferred from its respective transportation holder, in order to obtain a plurality of carbon-nanotube films placed to form a single wider and/or woven film structure.

FIG. 2A is a perspective schematic diagram of a system 200 and a method for assembling a plurality of carbon nanotube films 98 into a wider structure 95, each film 98 in the assembled structure 95 being held at its ends by a first adhesive rod, band or other or member 231 and second adhesive rod, band or other or member 232, the films 98 placed one next to another and each transferred from its respective transportation holder 230, in order to obtain a plurality of carbon-nanotube films placed to form a single wider and/or woven film structure 95. In some embodiments, each transportation holder 230 includes a first adhesive member 131 at one end and a second adhesive member 132 at the other end, each attached to a rod or other structure to keep them at a constant distance to prevent sagging or stretching of film 98. In some embodiments, as transportation holder 230 is pressed downward, adhesive member 131 drops below adhesive member 231 on its outside (right) edge, and adhesive member 132 drops below adhesive member 232 on its outside (left) edge, such that film 98 sticks to the adhesive surfaces of adhesive member 231 and adhesive member 232, whereupon further pressing down pulls or tears film 98 from adhesive member 131 and adhesive member 132. In other embodiments, a cutter is provided to cut the film 98 from adhesive member 131 and adhesive member 132. In some embodiments, a plurality of layers of films 98 are stacked one upon another. In some embodiments, an overlap is provided between adjacent films 98.

In some embodiments, members 131, 132, 231, and/or 232 use a liquid coating (such as ethanol or water or oil or other suitable chemical or mixture) rather than an adhesive coating to hold carbon nanotube film 98 (e.g., by surface tension).

Figure 2B:
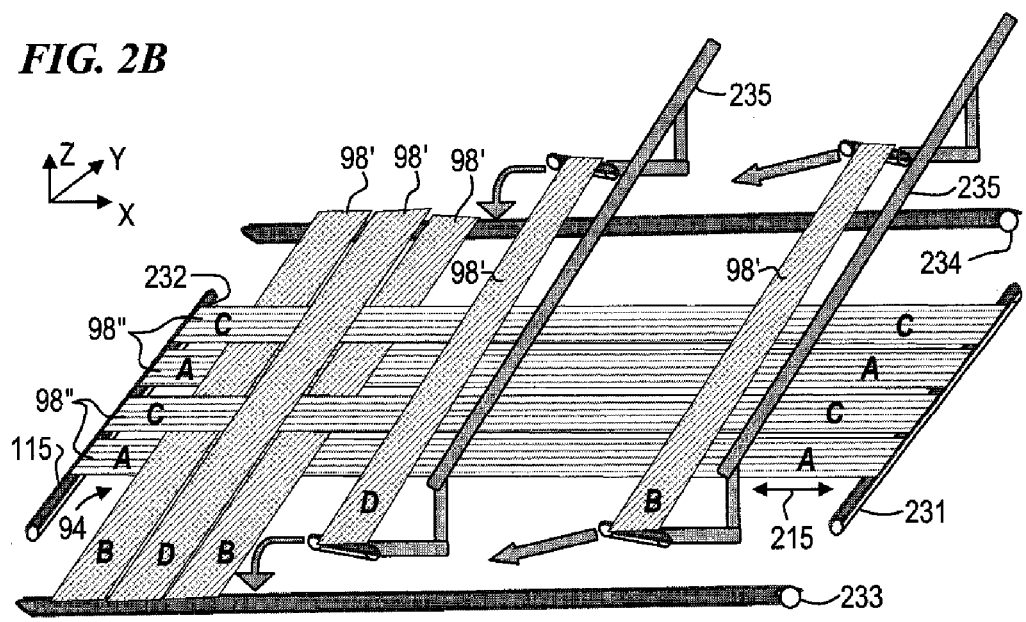
FIG. 2B is a perspective schematic diagram of an assembly of carbon nanotube films, each film in a first direction being held at its ends by a first and second adhesive member, the films placed one next to another and each transferred from its respective transportation holder, each film in a second direction being held at its ends by a third and fourth adhesive member, the films placed one next to another and each transferred from its respective transportation holder, in order to obtain a crossed-film structure of a plurality of carbon-nanotube films.

FIG. 2B is a perspective schematic diagram of a system 202 and a method for criss-cross assembly of carbon nanotube films 98. In some embodiments, each film 98" in a first direction 215 (e.g., the X direction) being held at its ends by a first adhesive member 231 and second adhesive member 232, the films 98" placed one next to another and each transferred from its respective transportation holder 230 as described for FIG. 2A (although small gaps between films 98 are shown in some of the figures throughout this application for clarity, in some embodiments, the films are tightly spaced and/or overlapped such that no such gaps are in the completed product). In some embodiments, each film 98' in a second direction 216 (e.g., the Y direction) is being held at its ends by a third adhesive member 233 and fourth adhesive member 234, the films 98' placed one next to another and each transferred from its respective transportation holder 235 in a manner such as described for FIG. 2A, in order to obtain a criss-crossed-film structure 94 made of a plurality of carbon-nanotube films. In some embodiments, the films are deposited in an order A, A, B, B, C, C, D, D, and so on. In some embodiments, after one complete layer 94 is deposited, one or more additional layers are stacked on the earlier layer(s).

Figure 2C:
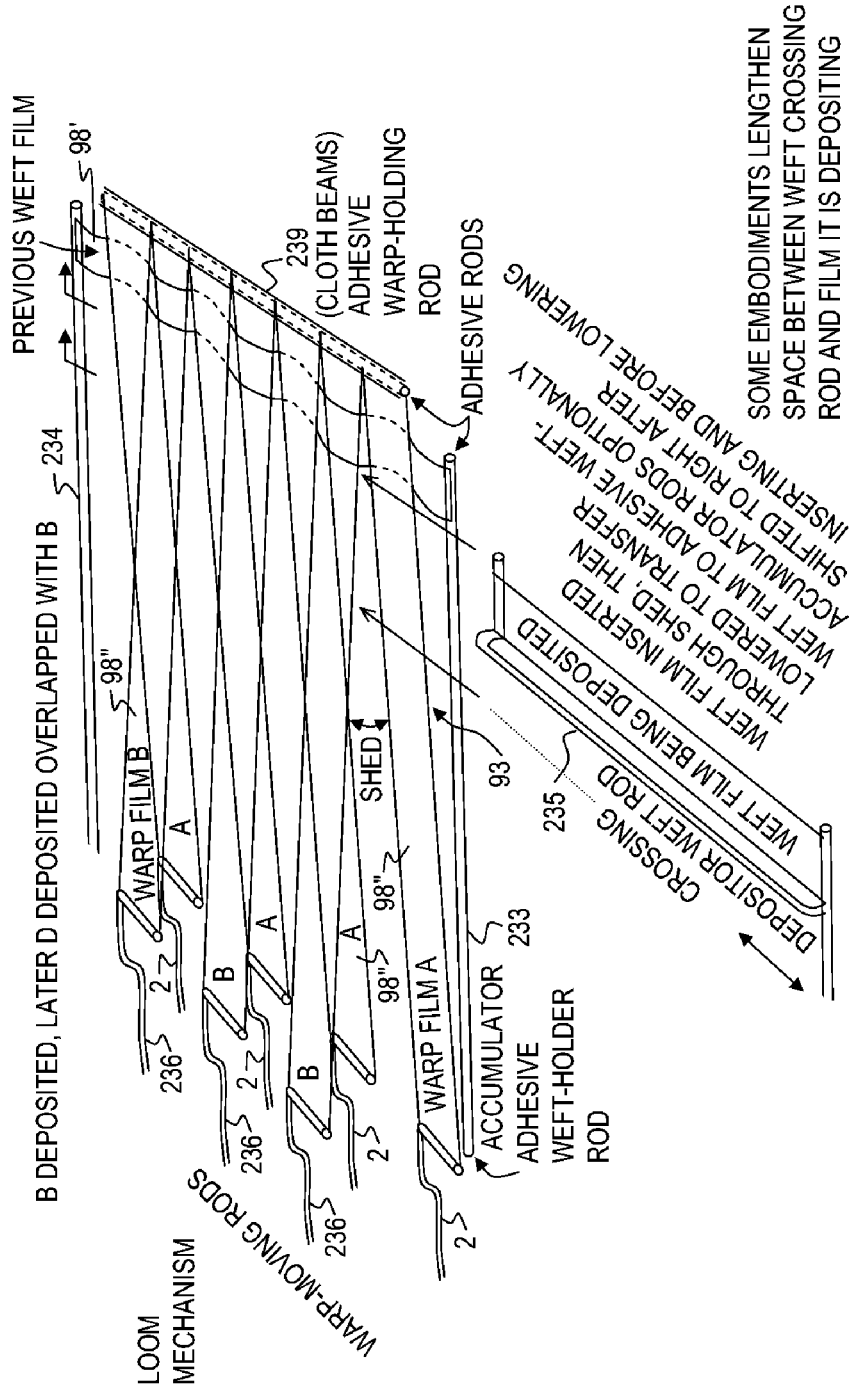
FIG. 2C is a perspective schematic diagram of a loom that provides a woven assembly of carbon nanotube films, each film in the assembly being held at its ends by a first and second adhesive rod, band or other or member.

FIG. 2C is a perspective schematic diagram of a loom system 204 that provides a woven assembly 93 of carbon nanotube films 98, each weft film 98' in the woven assembly 93 being held at its ends by a first and adhesive member 233 second adhesive member 234. Each warp film 98" is held at the right-hand end by adhesive member 239 (also called the cloth beam), and at its opposite (left-hand) end by one loom rod of the moving sets of loom rods 236 and 246. The warp films 98" marked A (e.g., every other warp film) are each connected to an adhesive-covered portion of a respective one of loom rods 246, and the warp films 98" marked B (e.g., the other set of every other warp film) are each connected to an adhesive-covered portion of a respective one of loom rods 236. Loom rods 236 and 246 alternately move up and down, as in a cloth loom, and between each movement, a weft film 98' is inserted sideways (lower left to upper right, then rightward in the figure), but then adhesively attached to adhesive member 234 and adhesive member 235.

For the various embodiments described herein, any of the described film-holding members (including those that operate by vacuum (see FIG. 14A) or surface tension of a liquid to hold the carbon nanotube film to a surface, those that clamp the film between two surfaces (see FIG. 1Z), as well as those members having an adhesive surface) can be substituted for one or more of the film holders called adhesive members.

Figure 2D:
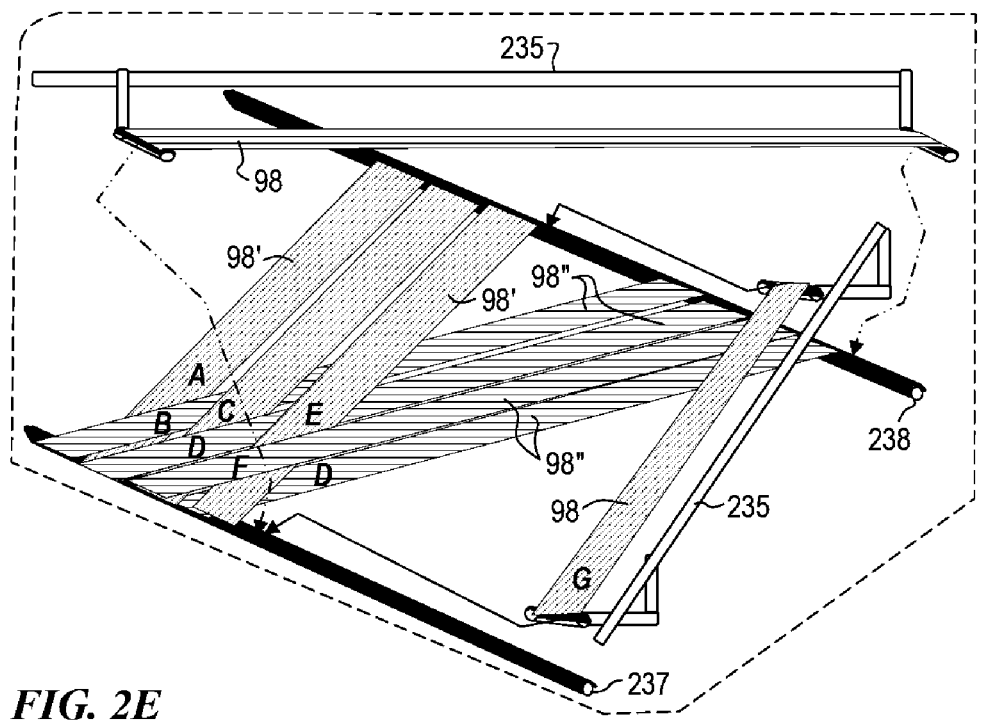
FIG. 2D is a perspective schematic diagram of an assembly of carbon nanotube films, each film in a first direction being held at its ends by a first and second adhesive member, each film in a second direction being held at its ends by the first and second member, the films placed one next to another and each transferred from its respective transportation holder, in order to obtain a crossed-film structure of a plurality of carbon-nanotube films in a continuous web.

FIG. 2D is a perspective schematic diagram of a system 205 and a method of assembly of carbon nanotube films 98, each film 98" in a first direction being held at its ends by a first adhesive member 237 and second adhesive member 238 (in some embodiments, each having an adhesive coating 115), each film 98' in a second direction also being held at its ends by the first adhesive member 237 and second adhesive member 238, the films placed one next to another and each transferred from its respective transportation holder 235 as described above, in order to obtain a crossed-film structure 93 of a plurality of carbon-nanotube films 98 in a continuous web. In some embodiments, the first adhesive member 237 and second adhesive member 238 are closed loops that are driven parallel to one another (e.g., on pulleys—see, for example, FIG. 10A, FIG. 11A, and FIG. 12A) to move in a conveyor-belt fashion so the continuous web 93 of criss-crossed films is obtained.

Figure 2E:
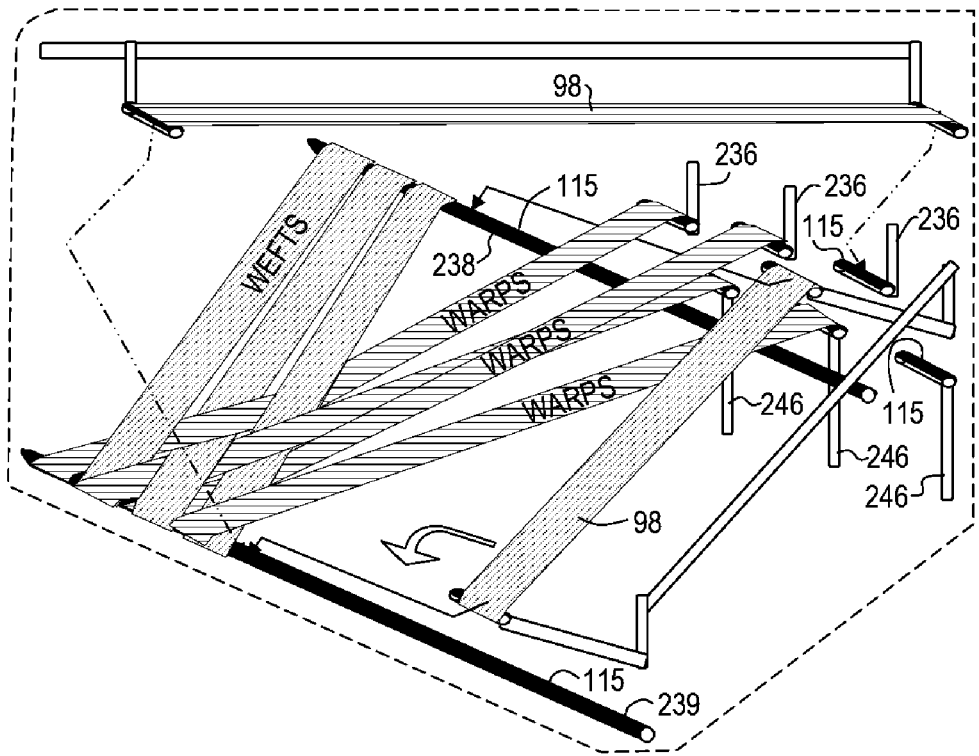
FIG. 2E is a perspective schematic diagram of loom that provides a woven assembly of carbon nanotube films, each film in the assembly being held at its ends by a first and second adhesive member, in order to obtain a crossed-film structure of a plurality of carbon-nanotube films in a continuous web.

FIG. 2E is a perspective schematic diagram of continuous-loop loom 206 that provides a continuous web of woven carbon nanotube films, each film in the assembly being held at its ends by a first adhesive member 239 and a second adhesive member 238, in order to obtain a woven-film structure 92 of a plurality of carbon-nanotube films in a continuous web. In the embodiment shown, the left adhesive conveyor-loop band 239 is designated the cloth beam 239 and the B warp films are attached from this cloth beam to the loom rods 236 alternating with the A warp films that are attached from this cloth beam 239 to the loom rods 246. In some embodiments, since the free movable portions of the warp films 98" get shorter as the conveyor moves to the left, the loom rods 236 and 246 towards the left (downstream) do not move up and down as much as those to the right (upstream). Once a downstream warp film 98" has completed its weaving, it is attached to adhesive member 238 and its loom rod (236 or 246) is moved to the upstream end and a new film 98 is attached as warp film 98" to it and to cloth beam 239 from transportation holder 235. Between each loom rod movement, a weft film 98' is inserted to the shed between the A films and the B films (shown by solid-line arrows), and attached to the conveyor-belt cloth beam 239 at one end and to the conveyor belt 238 at the other end. Its transportation rod 235' is then withdrawn, new warp film 98" is attached to the upstream loom rod 236 that is now empty and to the cloth beam 239 (shown by solid-line arrows) and detached from its transportation rod 235 (which is then removed), and the loom rods 246 that were down move up, and the loom rods 236 that were up move down. The next weft film 98' is then inserted. This process is unique in that, in some embodiments, the cloth beam adhesive member 239 is used to attach and convey the first end of every warp film 98" and the first end of every weft film 98', while adhesive member 238 is used to attach and convey the second end of every warp film 98" and the second end of every weft film 98', and adhesive member 239 and adhesive member 238 can be moved in parallel as a conveyor belt to generate a continuous web 90 of woven carbon nanotube films 98. In other embodiments, carbon nanotube threads or yarns (e.g., see FIG. 13B) are substituted for carbon nanotube films 98, and in some embodiments, are dispensed continuously from spools to the respective conveying adhesive members 238 and 239, as can be understood by a person skilled in the art.

In other embodiments, threads such as nanotube threads 1398 (such as described in FIG. 13B), or previously woven nanotube structures (such as web 1193 of FIG. 11F, or a densified stack of parallel films 97 such as in FIG. 1-O) are substituted for the nanotube films 98 of FIG. 2C, 2D or 2E. That is, in some embodiments, nanotube threads are woven by attaching (in some embodiments, adhesively, or in other embodiments, with a vacuum) warp threads to a cloth bar (such as conveyor belt 239) at one end (the far end) and to a loom rod at the other end (the near end), the loom rod being a member of one of a plurality of loom-rod sets. Wefts are inserted between the alternate up-and-down movements of the warps, and attached at their ends to holders 237 and 238 (see FIG. 2D), or holders to holders 239 and 238 (see FIG. 2E) to achieve the desired weave. When, in an embodiment such as FIG. 2E, a warp thread or film is finished (all the wefts to be woven with that warp have been woven), the near end of that warp is attached to belt 238, and a new warp thread or film is attached from belt 239 to a warp loom rod (e.g., the rightmost rod 246 in FIG. 2E) at the other side of the warps. In this way, the wefts are sequentially placed parallel to one another and attached at a first diagonal angle between adhesive belt 238 at their near end and adhesive belt 239 at their far end and woven with the warps, which are sequentially placed parallel to one another and attached at a second diagonal angle between adhesive belt 239 at their far end at the start of their weaving and adhesive belt 238 at their near end at the finish of their weaving.

Figure 2F:
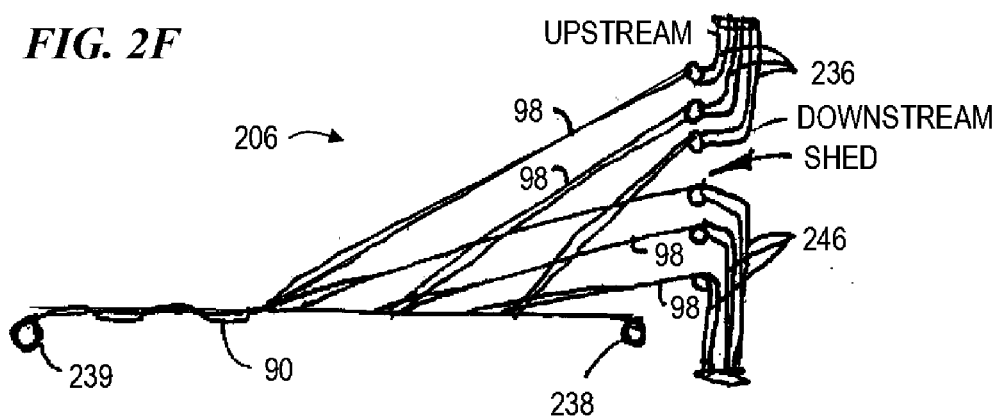
FIG. 2F is an end-view schematic diagram of the continuous-loop loom.

FIG. 2F is an end view schematic diagram of continuous-loop loom 206, showing the shed between the warp films 98" connected to loom rods 236 and the warp films 98" connected to loom rods 246 into which the weft film 98' is inserted.

Figure 3A:
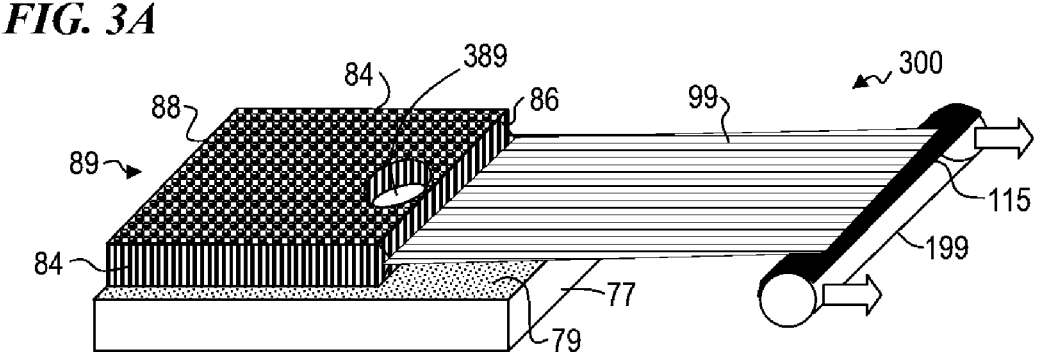
FIG. 3A is a perspective schematic diagram of a carbon nanotube film being pulled from a carbon nanotube forest having a gap in the nanotube forest.

FIG. 3A is a perspective schematic diagram 300 of a carbon nanotube film 99 being pulled from a carbon nanotube forest 89 having a gap 389 in the nanotube forest 89. Such a gap 389 will cause a lengthwise gap in the midst of film 99, and when the side films have been pulled even with the back of the gap, there may be an island of nanotube forest behind the gap to which the films are unable to pull nanotubes, further lengthening the lengthwise gap in the midst of film 99.

Figure 3B:
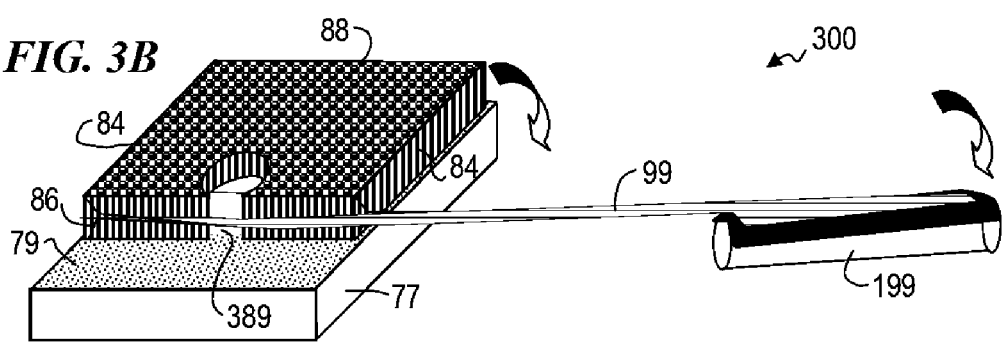
FIG. 3B is a perspective schematic diagram of a carbon nanotube film being pulled from a carbon nanotube forest having a gap in the nanotube forest in a manner that suppresses any gap in the film.

FIG. 3B is a perspective schematic diagram of a repair method for a possible gap in a carbon nanotube film 99 being pulled from a carbon nanotube forest 89 having a gap 389 in the nanotube forest 89 in a manner that suppresses any gap in the film. In some embodiments, both the puller member 199 and the substrate 77 are rotated nearly 90 degrees or more in the same rotational direction (e.g., clockwise), and the pull then continues at that acute angle until the pull reaches the end of gap 389, whereupon the puller member 199 and the substrate 77 are rotated back the nearly 90 degrees or more in the same rotational direction (e.g., counterclockwise) to the orientation shown in FIG. 3A. When the substrate 77 and puller member 199 are in the rotated position of FIG. 3B, so that the film from the far edge of the gap contacts or nearly contacts the forest 89 at the near end of the gap, the film can be gap-free or nearly so. Further, the rotated orientation prevents the formation of a forest island (as described above) behind the gap.

In some embodiments, a forest-merging press arm 665 (such as described below for FIG. 6C) is selectively moved when needed to press together the forest portions across a gap 389. This can be used to press across small gaps within a nanotube forest 89, such as can occur due to defects in the catalyst surface or other reasons. This pressure or contact between forest portions allows for the continuous or gap-free collection of the nanotube film 99 even if there is a slight gap due catalyst defects, flow-through defects or growing conditions in the nanotube forests 89.

In some embodiments, the present invention provides substantially continuous growth and harvesting of carbon-nanotube forests on one or more synthesis substrates within a carbon-nanotube forest "farm" chamber. In some embodiments, each synthesis substrate is reused for a plurality of growth cycles, wherein the substrate, having one or more catalyst-covered faces, is placed in a reaction chamber in a furnace (e.g., in some embodiments, operating at about 680 degrees C.) and a carbon-bearing precursor or reactant gas (e.g., in some embodiments, 5 mol % acetylene in a Helium carrier) is provided to the vicinity of the catalyst-covered face(s). In some embodiments, an interior-flow synthesis substrate is used, wherein the reactant gas is supplied through a face opposite the growth surface (called a flow-through substrate—see, e.g., FIG. 9F, 5B or 8K) or through a side face (called a side-flow substrate—see, e.g., FIG. 9J or 5F). In some embodiments, a nanotube film 99 is pulled directly from the nanotube forest 89 through an access port (e.g., 414) into the reaction chamber (e.g., 412) while the substrate 77 remains in the furnace (e.g., 410). In some embodiments, the forest 89 and substrate 77 remain at about the growth temperature (e.g., 680 degrees C.) while nanotube film 99 is pulled, while in other embodiments, the forest 89 and substrate 77 are cooled at least somewhat before nanotube film 99 is pulled (e.g., in various of the embodiments, to about 650° C. or higher, to about 625° C. or higher, to about 600° C. or higher, to about 575° C. or higher, to about 550° C. or higher, to about 525° C. or higher, to about 500° C. or higher, to about 475° C. or higher, to about 450° C. or higher, to about 425° C. or higher, to about 400° C. or higher, to about 375° C. or higher, to about 350° C. or higher, to about 325° C. or higher, to about 300° C. or higher, to about 275° C. or higher, to about 250° C. or higher, to about 225° C. or higher, to about 200° C. or higher, to about 175° C. or higher, to about 150° C. or higher, to about 125° C. or higher, to about 100° C. or higher, to about 75° C. or higher, or to about 50° C. or higher), while in yet other embodiments, the forest 89 and substrate 77 are cooled to about room temperature before nanotube film 99 is pulled. In other embodiments, a substrate 77 and its nanotube forest are withdrawn through access port (e.g., 414) from reaction chamber (e.g., 412) while one or more other substrates remain in the reaction chamber at about the growth temperature (e.g., 680 degrees C.). The methods of the present invention thus allow continuous or substantially continuous growth and harvesting of nanotube forests 89.

Figure 4A:
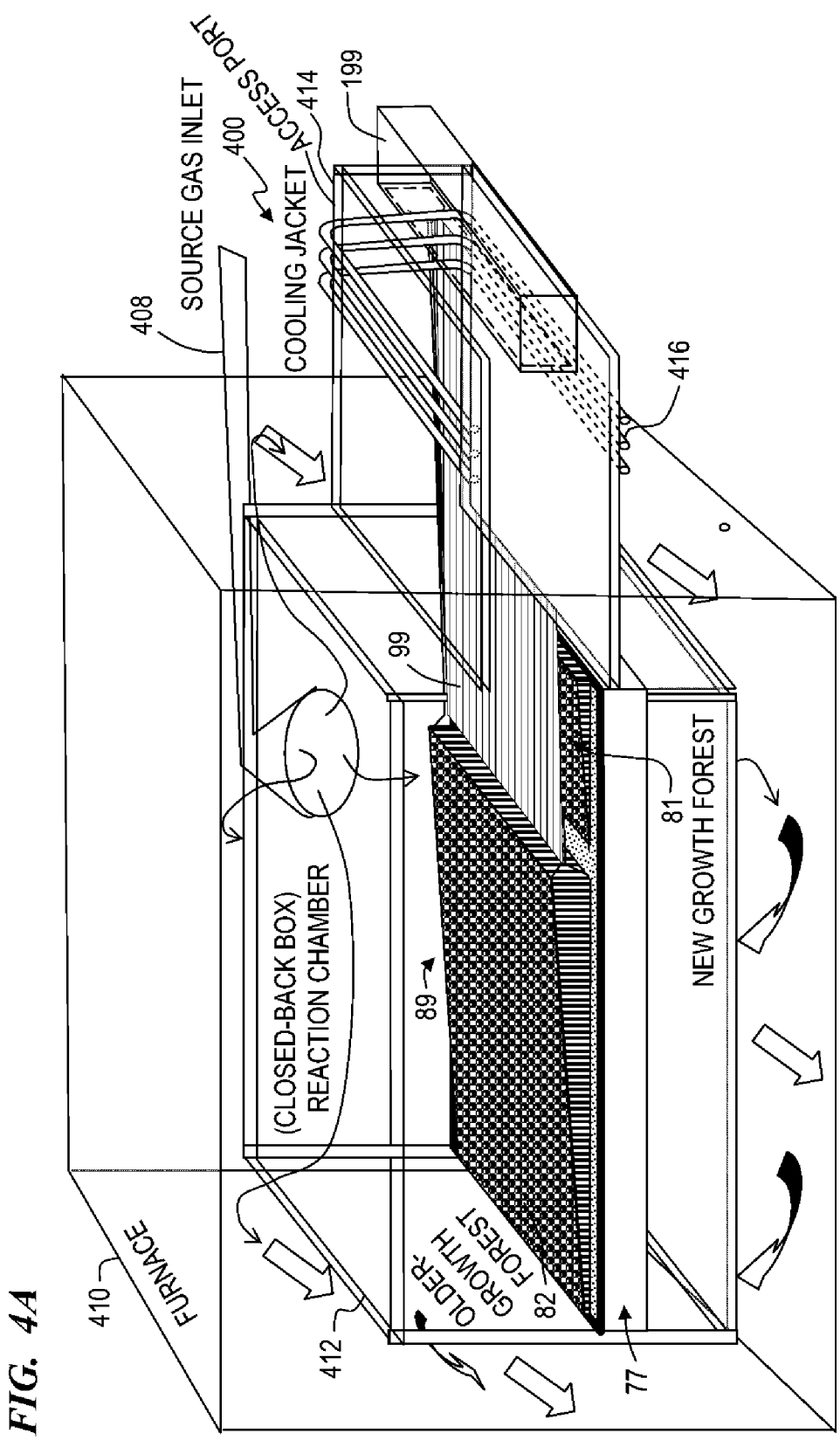
FIG. 4A is a perspective cross-section schematic diagram of an apparatus for the continuous synthesis and collection of carbon nanotubes.

FIG. 4A is a perspective block diagram of a system 400 that illustrates the continuous synthesis and collection of nanotube films. Here, an input reactant gas 61 is shown flowing through an input gas inlet 408 into the interior of a furnace 410. Within the furnace 410 is situated a reaction chamber 412. Input reactant gas 61 is shown flowing into the interior of the reaction chamber 412. Within the reaction chamber, the input reactant gas 61 comes into contact with a substrate 77 that is located within the reaction chamber 412. The substrate has a growth surface 79. Contact of the input reactant gas 61 with the growth surface 79 of the substrate 77 provides for the synthesis of a nanotube forest 89. The nanotube forest 89 is shown as having a leading edge 86, a trailing edge 88, a top 87 and a bottom 85. Also shown is a new growth nanotube forest 81. The leading edge 86 of the nanotube forest is illustrated as being pulled into a nanotube film 99 by a pulling bar 199. The nanotube film 99 passes through an access port 414 that is positioned in a side of the furnace 410. The nanotube film 99 then passes through the passage of the access port 414 through a cooling jacket 416.

In some embodiments, it is undesirable to have a direct sideways flow of gasses across the growing nanotube forest 89. The reaction chamber 412, with its closed upwind end and its open downwind end allows reaction gasses to readily diffuse into the growth zone while preventing a direct breeze. In some embodiments, a gas pressure is maintained at access port 414 to also suppress any flow of gas through the access port. In some embodiments, an inverted-U-shaped heat trap is placed in the path of the access port 414.

FIG. 4B is a side view of system 400. Input reactant gas 61 is shown flowing through an input gas inlet 408 into the interior of a furnace 410 in which a reaction chamber 412 is positioned. Within the reaction chamber 412 is shown a substrate having a growth surface 79 on which a nanotube forest 89 has been grown. Output exhaust gas 62 is shown flowing out of the furnace 410 through an exhaust outlet 409.

FIG. 4C is a top view of system 400 of the invention. Input reactant gas 61 is shown flowing through an input gas inlet 408 into the interior of a furnace 410 in which a reaction chamber 412 is positioned. Within the reaction chamber 412 is shown a substrate having a growth surface 79 on which a nanotube forest 89 has been grown. The nanotube forest 89 is illustrated as being pulled into a nanotube film 99 by a pulling bar 199. The nanotube film 99 passes through an access port 414 that is positioned in a side of the furnace 410. The nanotube film 99 then passes through a cooling jacket 416. Output exhaust gas 62 is shown flowing out of the furnace 410 through an exhaust outlet 409.

Figure 5A:
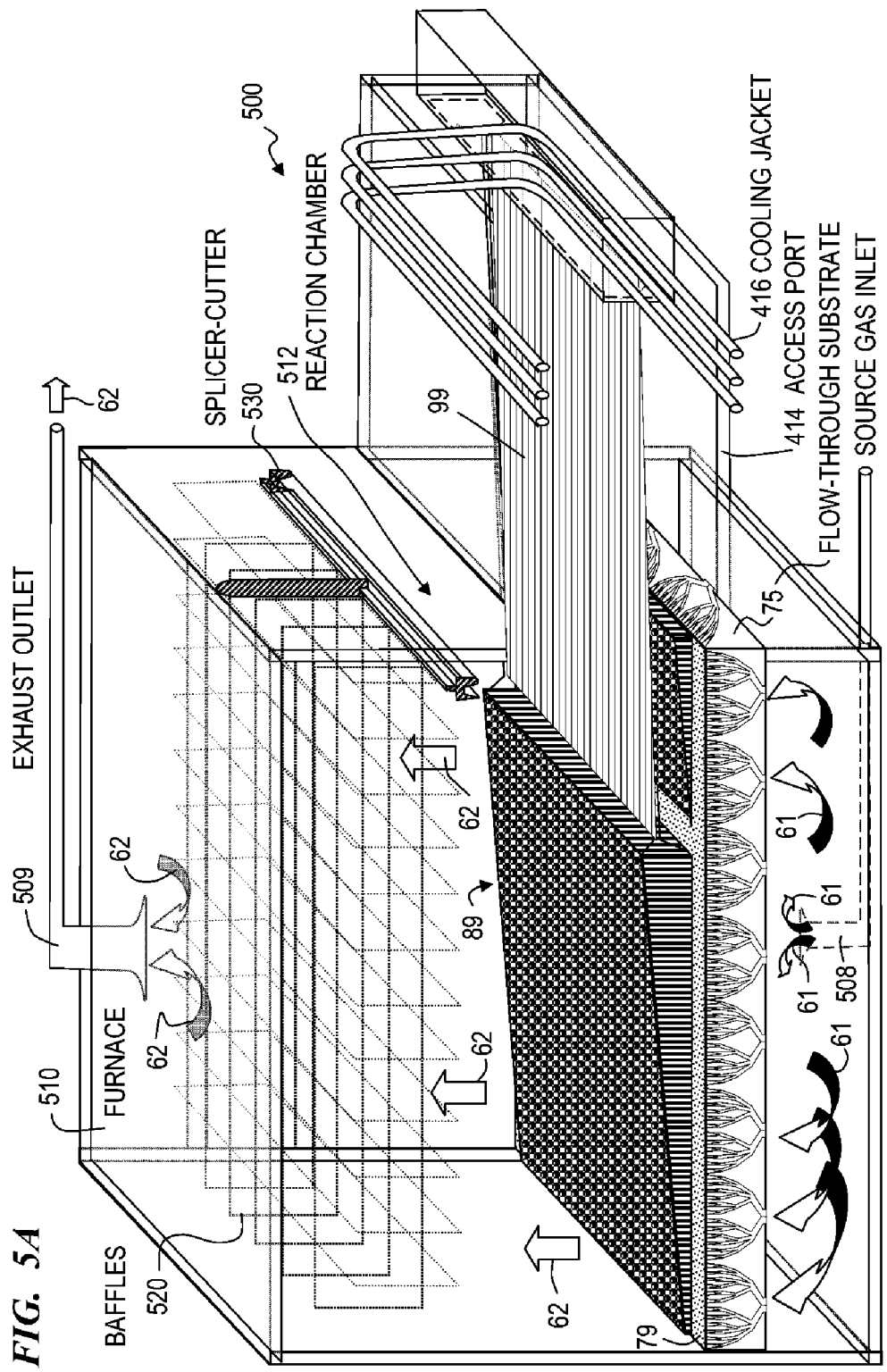
FIG. 5A is a perspective schematic diagram of an apparatus for the continuous synthesis and collection of carbon nanotubes during an intermediate collection stage of one round of synthesis.

FIG. 5A is a perspective block diagram of a system 500 that illustrates the continuous synthesis and collection of nanotube films using a method of the invention. Here an input reactant gas 61 is shown flowing through an input gas inlet 508 into the interior of a furnace 510. The input reactant gas 61 passes through a flow-through substrate 75 that is located within the furnace 510 and contacts a growth surface 79 positioned on the flow-through substrate 75. Contact of the input reactant gas 61 with the growth surface 79 of the flow-through substrate 75 provides for the synthesis of a nanotube forest 89 within a reaction chamber 512 positioned within the furnace 510. The output exhaust gas 62 then exits the furnace through an exhaust outlet 509. The nanotube forest 89 is shown as having a leading edge 86, a trailing edge 88, a top 87 and a bottom 85. Also shown is a new growth nanotube forest 81. The leading edge 86 of the nanotube forest is illustrated as being pulled into a nanotube film 99 by a pulling bar 199. The nanotube film 99 passes through an access port 414 that is positioned in a side of the furnace 510. The nanotube film 99 then passes through a cooling jacket 416. Positioned within the furnace are baffles 520 that direct the flow of outlet exhaust gas 62 from the reaction chamber 512 to an exhaust outlet 509. Also positioned within the furnace is a splicer-cutter 530 that is positioned above the leading edge of the new growth forest 81 that acts to cut the nanotube film from the old growth nanotube forest 82 and attach the nanotube film to the leading edge of the new 81.

Figure 5B:
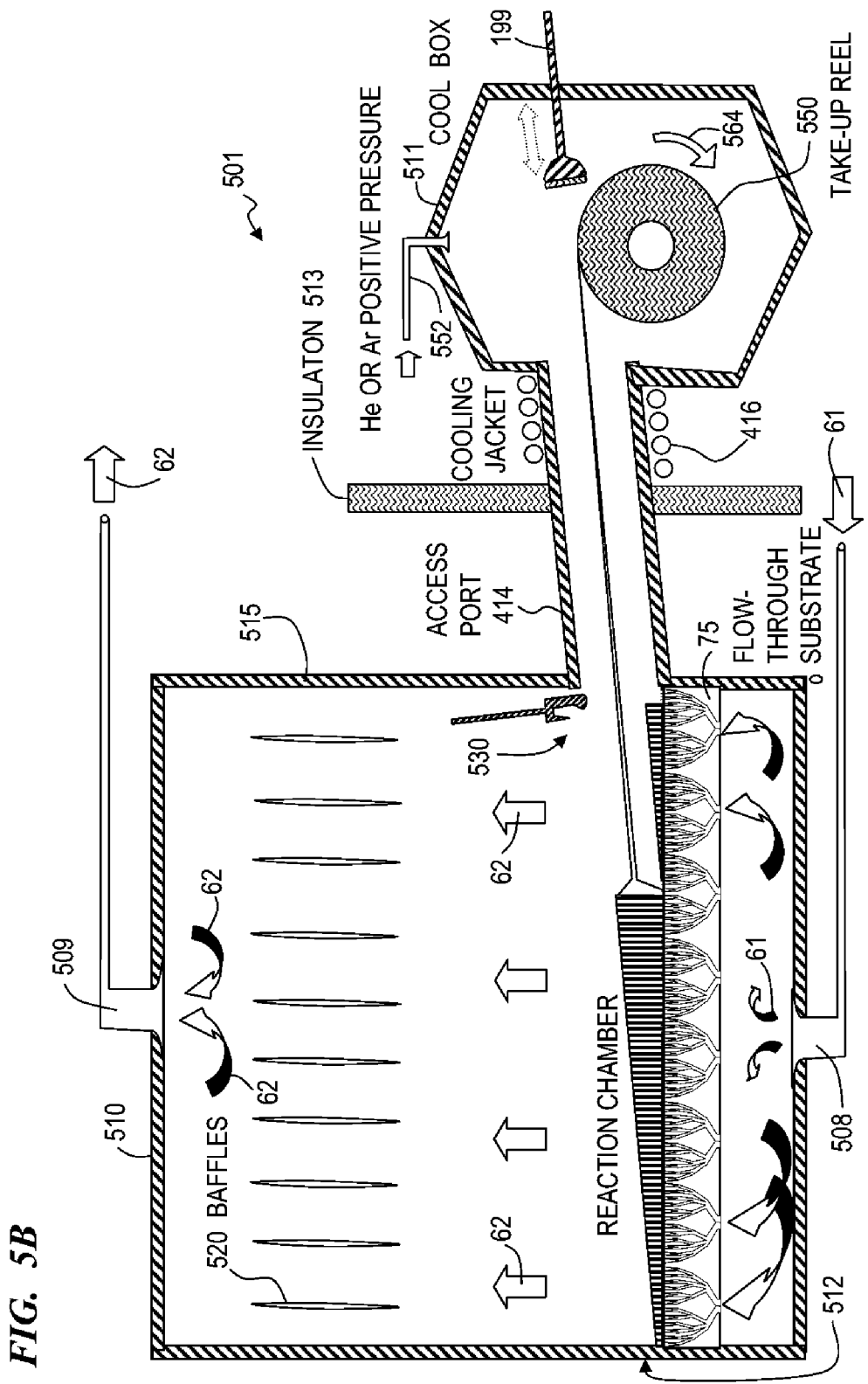
FIG. 5B is a cross-section side view of an apparatus for the continuous synthesis and collection of carbon nanotubes during an intermediate collection stage of one round of synthesis.

FIG. 5B is a side view diagram of a system 501 that illustrates the continuous synthesis and collection of nanotube films using a method of the invention. Here an input reactant gas 61 is shown flowing through an input gas inlet 508 into the interior of a furnace 515. The input reactant gas 61 passes through a flow-through substrate 75 that is located within the furnace 510 and contacts a growth surface 79 positioned on the flow-through substrate 75. Contact of the input reactant gas 61 with the growth surface 79 of the flow-through substrate 75 provides for the synthesis of a nanotube forest 89 within a reaction chamber 512 positioned within the furnace 510. The output exhaust gas 62 then exits the furnace through an exhaust outlet 509. The nanotube forest 89 is shown as having a leading edge 86, a trailing edge 88, a top 87 and a bottom 85. Also shown is a new growth nanotube forest 81. The leading edge 86 of the nanotube forest 89 is illustrated as being pulled into a nanotube film 99 by a take-up reel 550. The nanotube film 99 passes through an access port 514 that is positioned in a side of the furnace 510. The nanotube film 99 then passes through a cooling jacket 416. Positioned within the furnace are baffles 520 that direct the flow of outlet exhaust gas 62 from the reaction chamber 512 to an exhaust outlet 509. Also positioned within the furnace is a splicer-cutter 530 that is positioned above the leading edge of the new growth forest 81 that acts to attach the nanotube film to the leading edge of the new growth nanotube forest 81 and cut the nanotube film from the old growth nanotube forest. The take-up reel 550 is positioned within a cooling box 511 that is continuously connected to the access port 514. A pulling bar 199 is also positioned within the cooling box 511 that can be contacted with the leading edge 86 of a nanotube forest 89 to initiate formation of nanotube film 99. The cooling box 511 is illustrated as having a gas inlet 552 to provide input of gas (e.g., inert gas) to provide backpressure in the cooling box 511 relative to the furnace 510 (to prevent passage of reactant gasses and heat) and relative to the outside environment (to keep out oxygen and other contaminants). Also illustrated is movement 564 of the take-up reel 550 to change the angle of the nanotube film 99 as the leading edge 86 of the old growth nanotube forest 82 recedes toward the trailing edge 88 of the old growth nanotube forest 82 as the old growth nanotube forest 82 is collected.

Figure 5C:
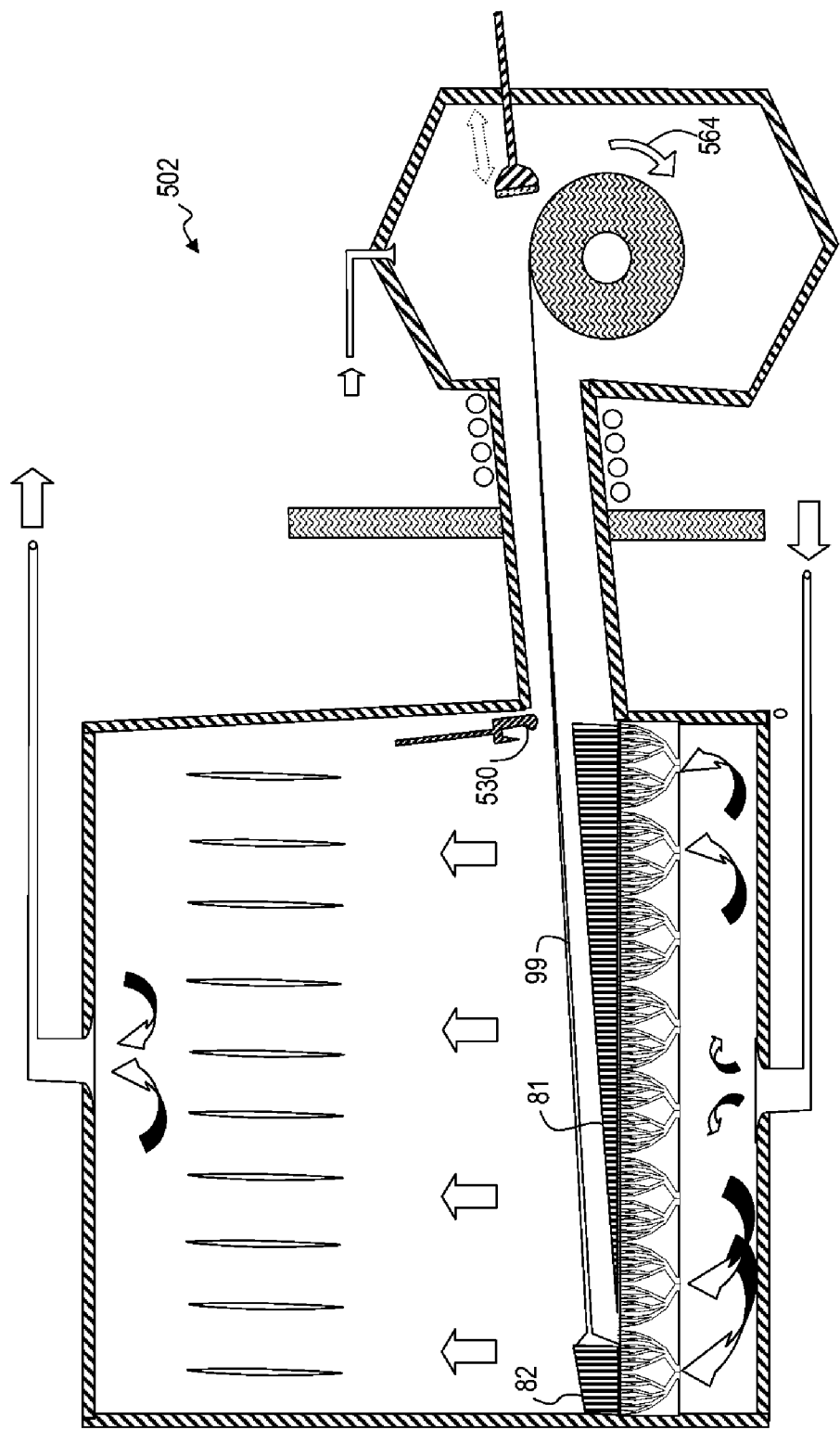
FIG. 5C is a cross-section side view of an apparatus for the continuous synthesis and collection of carbon nanotubes at a later collection stage of one round of synthesis.

FIG. 5C shows a later stage of nanotube film 99 collection relative to FIG. 5B. As illustrated, the leading edge 86 of the old growth nanotube forest 82 has receded toward the trailing edge 88 of the old growth nanotube forest 82 as the old growth nanotube forest 82 is collected. In addition, movement 564 of the take-up reel 550 is shown to illustrate movement of the take-up reel 550 so that the nanotube film 99 does not come into contact with the new growth nanotube forest 81.

Figure 5D:
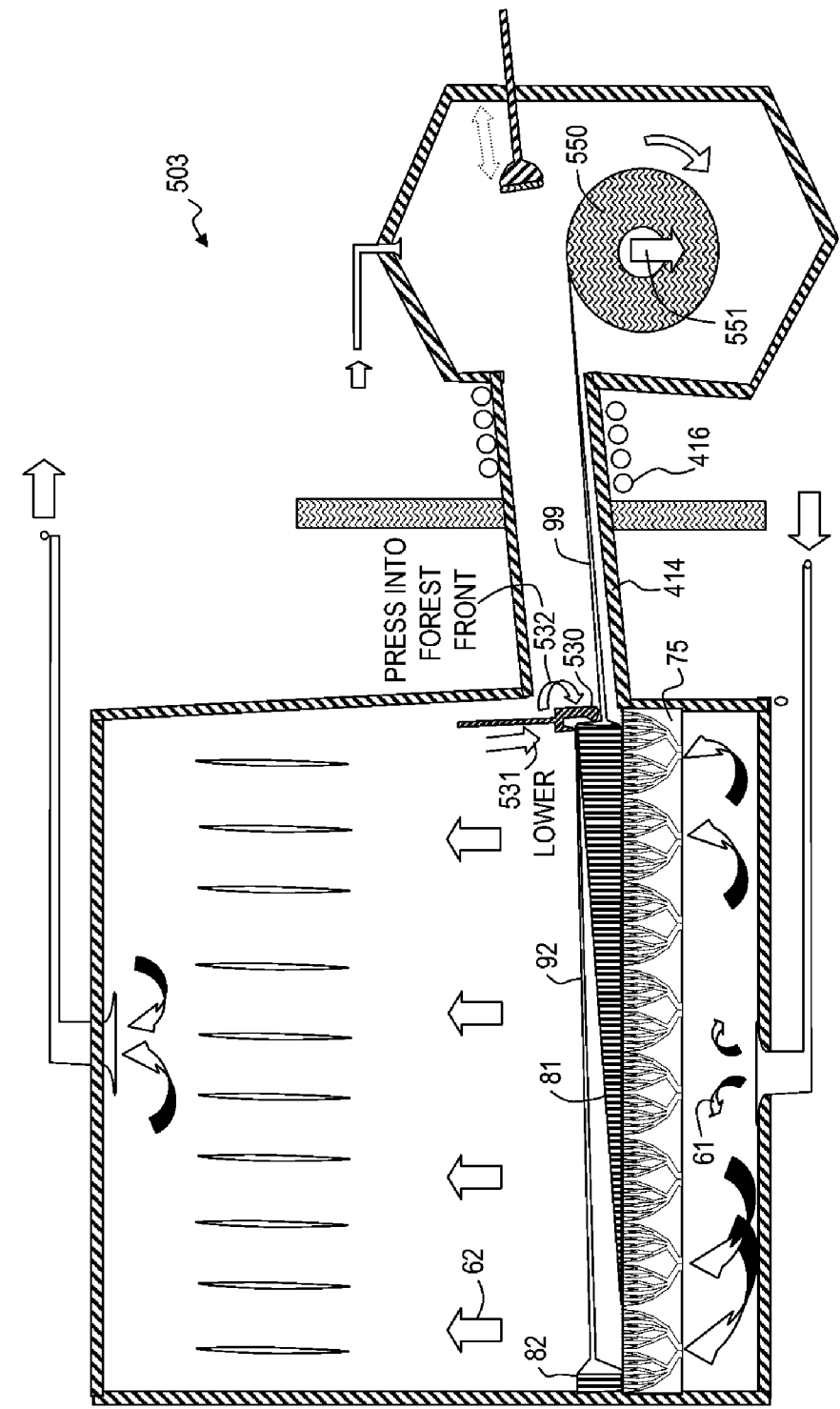
FIG. 5D is a cross-section side view of an apparatus for the continuous synthesis and collection of carbon nanotubes at a cutting and reattachment collection stage of one round of synthesis.

FIG. 5D shows a later stage of nanotube film 99 collection relative to FIG. 5C. As illustrated, the leading edge 86 of the old growth nanotube forest 82 has receded toward the trailing edge 88 of the old growth nanotube forest 82 as the old growth nanotube forest 82 is collected. The splicer-cutter 530 is positioned to attach the nanotube film 99 to the leading edge of the new growth nanotube forest 81, and, in some embodiments, slice the nanotube film 99 from the old growth to provide for continuous collection of the nanotube film 99. Slicing the nanotube film 99 produces a film tail 92 that represents the remainder of the old growth nanotube forest 82. In addition, movement 564 of the take-up reel 550 is shown to illustrate movement of the take-up reel 550 so that the nanotube film 99 comes into contact with the new growth forest 81.

Figure 5E:
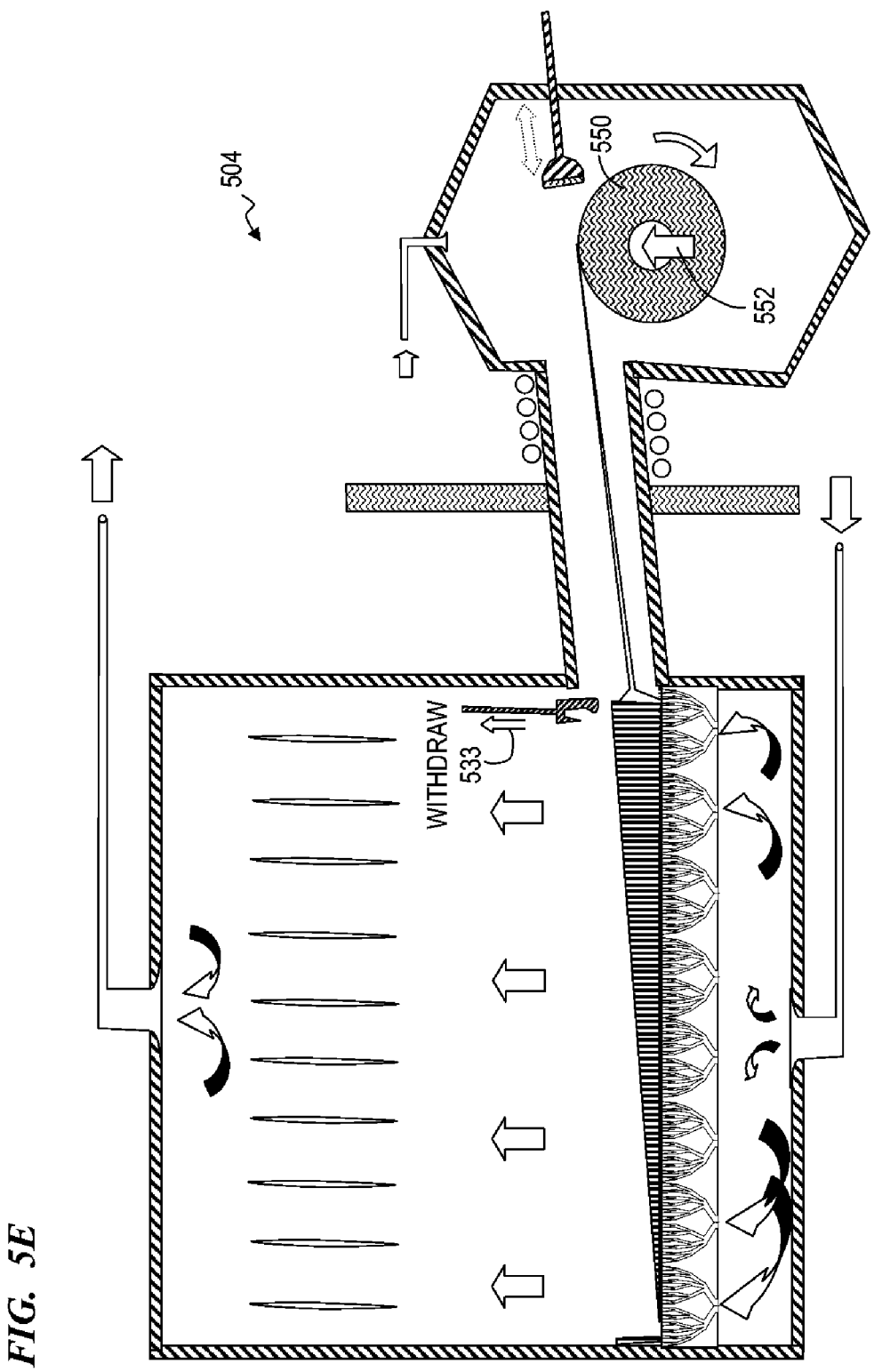
FIG. 5E is a cross-section side view of an apparatus for the continuous synthesis and collection of carbon nanotubes following reattachment to initiate a fresh collection stage.

FIG. 5E shows a later stage of nanotube film 99 collection relative to FIG. 5D. As illustrated, the nanotube film 99 has been attached to the leading edge of the new growth nanotube forest 81 to facilitate continuous collection of the nanotube film 99. In addition, movement 564 of the take-up reel 550 is shown to illustrate movement of the take-up reel 550 so that the nanotube film 99 comes into contact with the new growth forest 81. This action transforms the formerly new growth nanotube forest 81 into the old growth nanotube forest 82 to continue the synthesis and collection cycle.

Figure 5F:
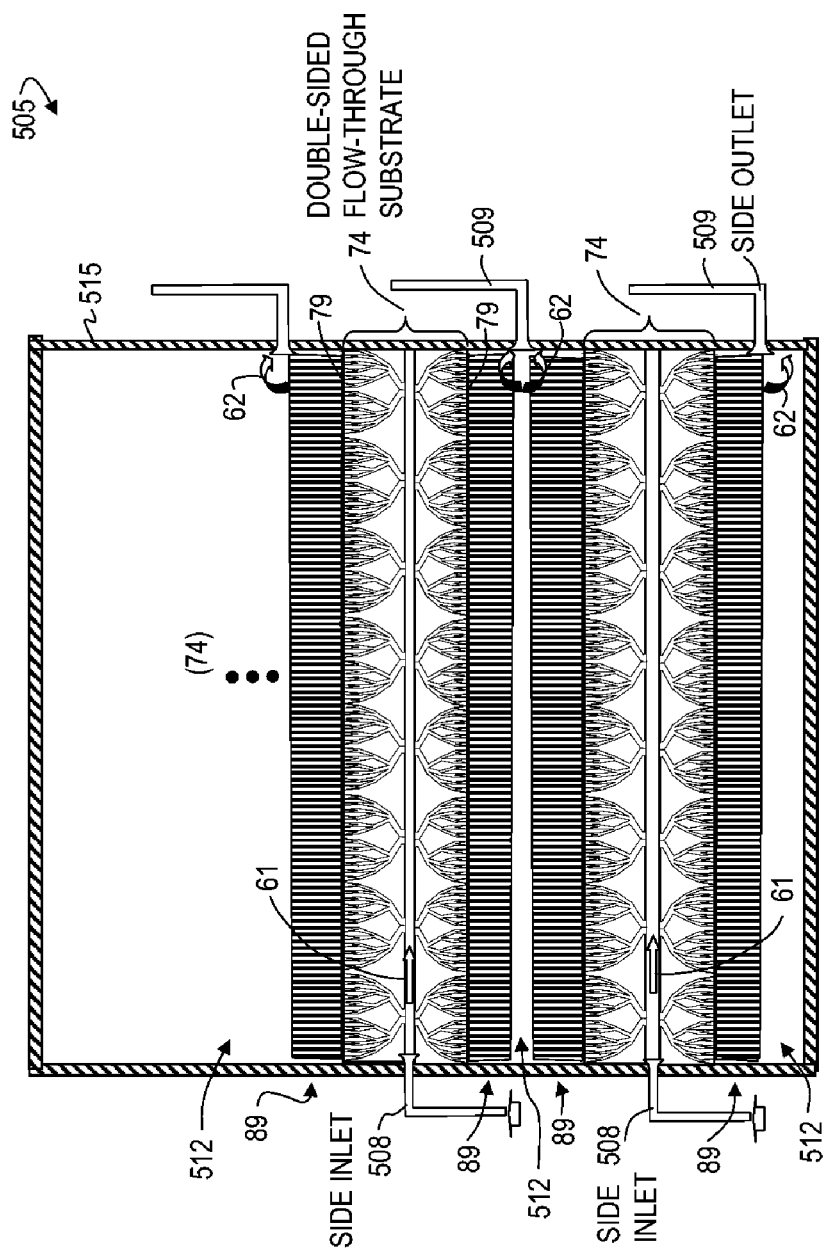
FIG. 5F is a cross-section side view of an apparatus for the synthesis of carbon nanotubes using a double-sided flow-through substrate.

FIG. 5F is a side view diagram of a system 505 that implements a method of some embodiments of the invention, which provides for nanotube synthesis on multiple double-sided flow-through substrates 74. Input reactant gas 61 is shown flowing through a side-inlet 508 into the interior of a furnace 515. The input reactant gas 61 passes through a double-sided flow-through substrate 74 that is located within the furnace 515 and contacts a growth surface 79 positioned on the double-sided flow-through substrate 74. Contact of the input reactant gas 61 with the growth surface 79 of the double-sided flow-through substrate 74 provides for the synthesis of a nanotube forest 89 within a reaction chamber 512 positioned within the furnace 515. The outlet exhaust gas 62 then flows through a side-outlet 509.

In some embodiments, the source reactant gas 61 includes acetylene in a helium carrier, and the exhaust or output gas 62 includes some of the acetylene, the helium carrier, and waste byproducts of the nanotube synthesis reaction such as hydrogen gas and/or other hydrocarbons. In some embodiments, the exhaust gasses are recycled, e.g., by compressing and separating the gasses, then remixing the recovered acetylene and helium carrier, adding supplemental new gasses as needed, and using the result as input reactant gas 61.

FIG. 5G is a side view diagram of a system 506 that implements a method of some embodiments of the invention, which provides for nanotube synthesis on an extended basis from flow-through substrates 594. Input reactant gas 61 is shown flowing through a side-inlet 508 into the interior of a furnace 515. In some embodiments, the input reactant gas 61 passes through a flow-through substrate 594 that is located within the furnace 515 and contacts a growth surface 79 positioned on the flow-through substrate 594. Contact of the input reactant gas 61 with the growth surface 79 of the flow-through substrate 594 provides for the synthesis of a nanotube forest 89 within a reaction chamber 512 positioned within the furnace 515. The outlet exhaust gas 62 then flows through a side-outlet 509. In some embodiments, a puller bar 590 is attached (e.g., using a suitable pressure-sensitive adhesive), and operated by weight and/or servo control to gently pull on the tops (i.e., the end distal to the growing surface 79 of substrate 594) in a direction 591. In some embodiments, direction 591 is substantially vertical and downward. In other embodiments, direction 591 is upward. In some embodiments, substrate 594 is porous to allow reactant gasses 61 access to growing surface 79. In some embodiments, exhaust ports 509 are provided through puller bar 590.

FIG. 5H is a cross-section side view schematic of a carbon-nanotube synthesis apparatus 507 having a heat trap 576. In some embodiments, nanotube film 99 is passed across one or more rollers 577 in a raised portion (heat trap 576) of access port 514. In some embodiments, hot gasses and/or helium (in embodiments that use helium in the process) and/or less dense gasses, from furnace 590 (which can be any of the furnaces described herein such as 510 described above or 610 described below) will tend to rise to the top of heat trap 576, while the cooler and/or more dense gasses (e.g., argon) remain in the cool box 518. In some embodiments, the vertical rise used by heat trap 576 is up to a meter or more, (e.g., in some embodiments, about 0.5 meters or more, about 1 meter or more, about 2 meters or more, about 3 meters or more, about 4 meters or more, about 5 meters or more, about 6 meters or more, or about 7 meters or more) in order to suppress gas diffusion effects that might otherwise cause undesired gas to flow through port 514. Thus, in some embodiments, such a heat trap is used in a passageway through which nanotube film 99 is passing, while in other embodiments, such a heat trap is used for a passageway through which nanotube forests 89 on substrates 77 are passing.

Figure 6A:
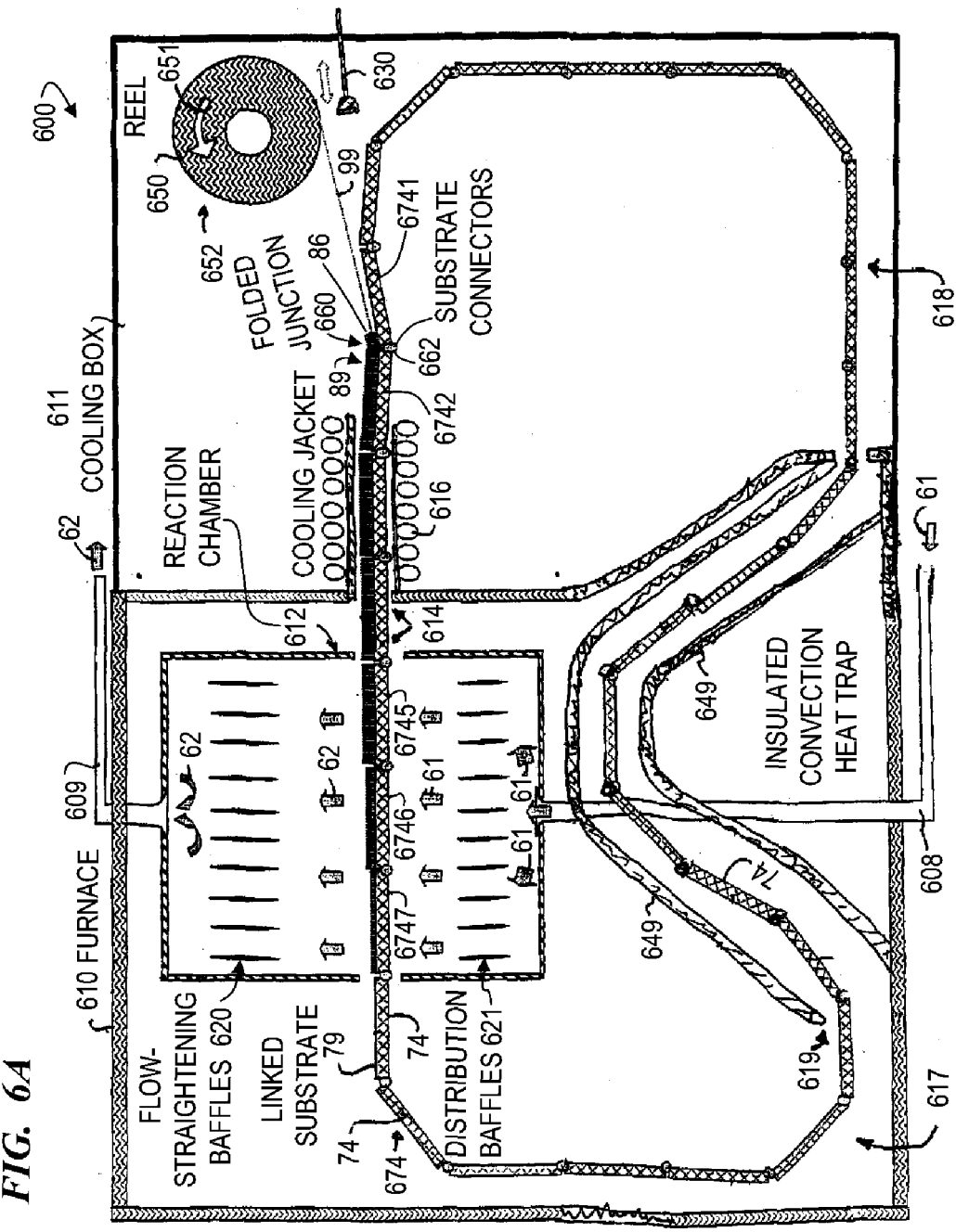
FIG. 6A is a cross-section side view of an apparatus that includes flow-through linked substrates for the continuous synthesis of carbon nanotubes.

FIG. 6A is a side view block diagram of a system 600 that illustrates the continuous synthesis and collection of nanotube films using a method of the invention. Here, an input reactant gas 61 is shown flowing through an input gas inlet 608 into the interior of a reaction chamber 612 that is positioned within a furnace 610.

In some embodiments, at least one substrate 74 of the plurality of substrates 74 in linked-substrate loop 674 is a flow-through nanoporous substrate such as described in FIG. 8J, FIG. 8P, FIG. 9F, or FIG. 9J. In other embodiments, a conventional non-flow-through substrate is used such as described in U.S. Pat. No. 6,232,706 or the articles listed above as Zhang et al. 2004 or Zhang et al. 2005. In yet other embodiments, non-porous substrates, such as rough- or smooth-textured silicon wafers are used.

In some embodiments, the input reactant gas 61 passes through distribution baffles 621 and then through one or more side-by-side flow-through linked substrates 74 that are located within the reaction chamber 612 of the furnace 610. In some embodiments, reaction chamber 612 forms, or is moveable to form, a fairly tight seal around the bottom of the substrates in the reaction chamber 612 (e.g., 6747, 6746, and 6745 in the embodiment shown) in order to force the gas through the flow-through substrate(s) (or into the sides of a side-flow substrate, in other embodiments). By providing a flow-through substrate, reactant gas reaches all parts of the growing forest, such that nanotubes near the edges grow at about the same rate as nanotubes on the center of the forest, thus avoiding forests with concave tops that grow that way because they do not have sufficient gas reaching the center of the forest due to blockage from the nanotubes around the edge. The input reactant gas 61, upon reaching the top of substrate 74, contacts a catalyst-covered growth surface 79 on the flow-through linked substrate 74. Contact of the input reactant gas 61 with the catalyst on growth surface 79 of a substrate 74 in the linked-substrate loop 674 provides for the synthesis of nanotube forests 89 within a reaction chamber 612 that is positioned within the furnace 610. It is believed that growth occurs at the bottom of each nanotube (i.e., next to the catalyst). The exhaust or output gas 62 then exits the furnace through an exhaust outlet 609.

The nanotube forests 89 are shown as having a leading edge 86, a trailing edge 88, a top 87 and a bottom 85. The linked-substrate loop 674 includes individual substrates 74 that are linked by substrate connectors 662. The linked-substrate loop 674 forms a continuous loop that can be intermittently or continuously advanced. As the loop is advanced, the individual linked flow-through substrates 74 pass through a pre-heat furnace 618 that is included within the furnace 610, enter into a reaction chamber 612 where synthesis of nanotube forest 89 occurs, exit the reaction chamber 612 through an access port 614 in the side of the furnace 612, pass through a cooling jacket 616, have their nanotube forests 89 harvested, and then reenter the furnace through another access port 615 after their forests 89 have been harvested.

In some embodiments, linked-substrate loop 674 forms a continuous loop that can be continuously advanced, or in other embodiments, the loop is advanced (for example, by the length of the center-to-center distance between substrates 74) and then substantially stopped for a period of time. For example, in the embodiment shown, three substrates are in growth chamber 612 at any one time, and each substrate 74, after entering reaction chamber 612 spends one-third of its growth time in the position of substrate 6747, the next one-third of its growth time in the position of substrate 6746, and the last one-third of its growth time in the position of substrate 6747 (e.g., in some embodiments, about 200 seconds in each station for a total of ten minutes). In some embodiments, the substrates 74 are cooled at least somewhat by resting in cooling jacket 616 while subsequent substrates 74 grow their nanotube forests 89 in reaction chamber 612.

In some embodiments, after an individual substrate 74 passes through the cooling jacket 616, the leading edge 86 of the nanotube forest 89 grown on a leading (i.e., an initial) individual substrate 74 is contacted with a pulling bar 630. The pulling bar 630 (which, in some embodiments, has an adhesive front surface such as shown in FIG. 1D, a vacuum front surface as shown in FIG. 14B, or other suitable film-pull-starting mechanism) pulls the leading edge of nanotube forest 89 from substrate 6741 to form a nanotube film 99. In some embodiments, the nanotube film 99 is attached to be wound around rotating take up reel 650. The pulling bar 630 is then retracted and the take up reel 650 turns in direction 651 to continuously pull and take up the nanotube film 99 from the individual linked substrate 74 and form nanotube-film spool 652.

In some embodiments, when the continuous closed loop of linked-substrate loop 674 is advanced (or advanced and then stopped), the portion of continuous loop 674 immediately next to the film pull (i.e., substrate 6741, which has the nanotube forest 89 that is currently being harvested into film 99, and substrate 6742 that has the nanotube forest 89 that will next be harvested) is bent inward to form a folded junction 660 where the trailing edge 88 (see FIG. 1A) of the preceding nanotube forest 89 on substrate 6741 is placed into contact with the leading edge 86 of the following nanotube forest 89 on substrate 6741.

FIG. 6B is a close-up side view of the folded junction 660 of FIG. 6A. It illustrates the nanotube film 99 being pulled and collected from the leading edge 86 of a nanotube forest 89 on linked substrate 6741 as the trailing edge 88 of that nanotube forest 89 is being placed into contact with the leading edge 86 of another nanotube forest 89 grown on the next following linked substrate 6742 at a folded junction 660. This intimate contact allows the film harvest to jump from the depleted nanotube forest on linked substrate 6741 to the unharvested forest on linked substrate 6742, for the continuous collection of the nanotube film 99 from the individual linked substrates 74 of the advancing linked-substrate loop 674.

Figure 6C:
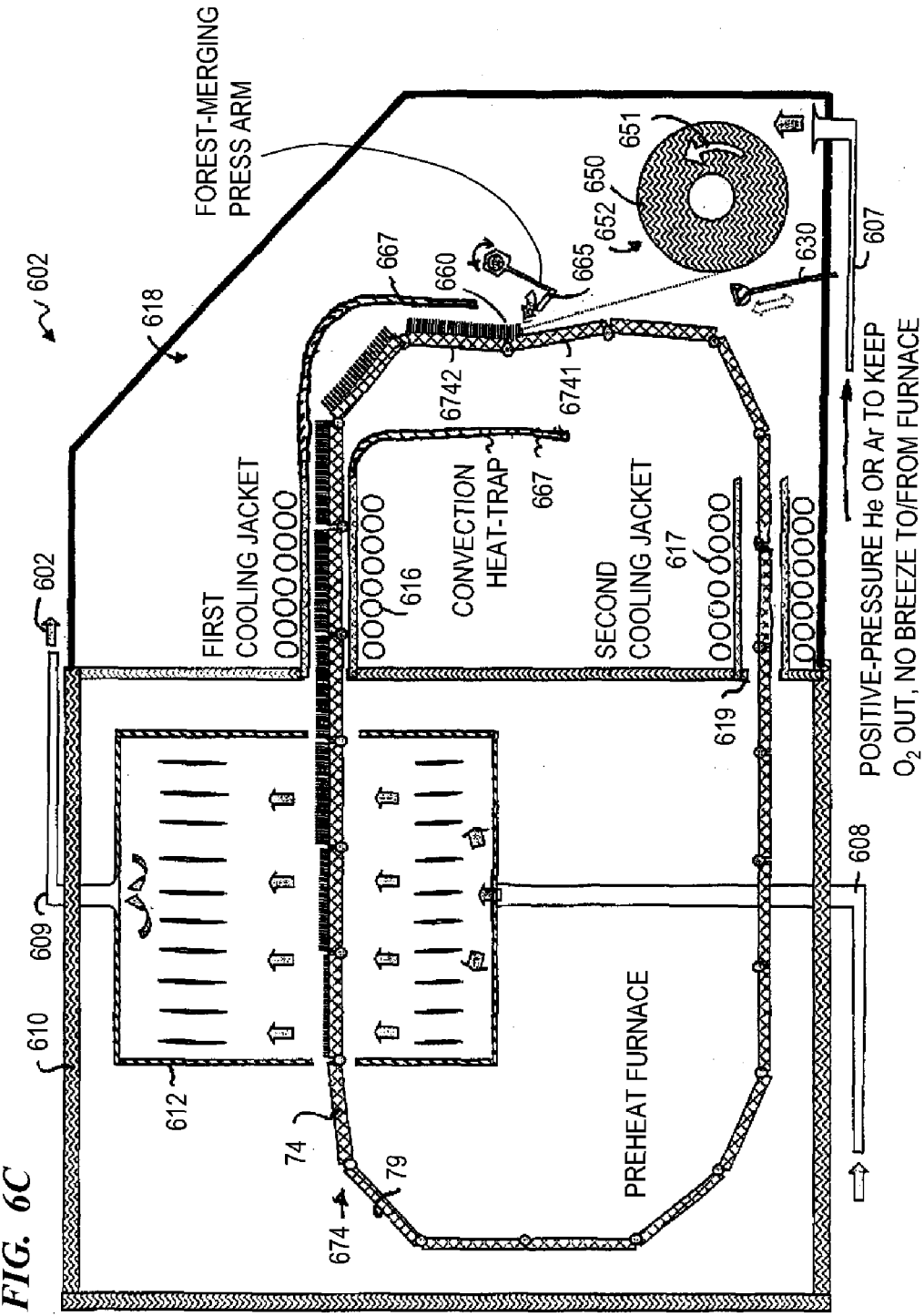
FIG. 6C is a cross-section side view of an apparatus for the continuous synthesis of carbon nanotubes in which the nanotubes are continuously collected in a downward manner.

FIG. 6C is a side-view diagram of a system 602 that provides the continuous synthesis and collection of nanotube films used by a method of the invention. In some embodiments as shown, an input reactant gas 61 is flowing through an input gas inlet 608 into the interior of a reaction chamber 612 that is positioned within a furnace 610. The input reactant gas 61 passes through distribution baffles 62 and then through linked substrates 74 that are located within the reaction chamber 612 of the furnace 610. The input reactant gas 61 contacts a growth surface 79 positioned on the linked substrates 74. Contact of the input reactant gas 61 with the growth surface 79 of the linked substrates 74 provides for the synthesis of nanotube forests 89 within the reaction chamber 612 that is positioned within the furnace 610. The nanotube forests 89 are shown as having a leading edge 86, a trailing edge 88, a top 87 and a bottom 85. The linked-substrate loop 674 includes individual substrates 74 that are linked by substrate connectors 662.

In some embodiments, at least one linked substrate 74 in linked-substrate loop 674 is a flow-through nanoporous substrate such as described in FIG. 8J, FIG. 8P, FIG. 9F, or FIG. 9J. In other embodiments, a conventional non-flow-through substrate is used such as described in U.S. Pat. No. 6,232,706 or the articles listed above as Zhang et al. 2004 or Zhang et al. 2005. In yet other embodiments, non-porous substrates, such as rough- or smooth-textured silicon wafers are used.

In some embodiments, linked-substrate loop 674 forms a continuous loop that can be continuously advanced, or in other embodiments, the loop is advanced (for example, by the length of one linked substrate 74) and then substantially stopped for a period of time. For example, in the embodiment shown, three substrates are in growth chamber 612 at any one time, and the substrates stop for a period of time (e.g., one-third of the nanotube growth time) in each position around the loop, then move one substrate length (i.e., by the center-to-center distance between linked substrates 74) to the next position and again stop. In other embodiments, a slow continuous movement is used that moves the loop at a rate approximately equal to the rate of harvest at the front nanotube forest 89.

In some embodiments, the already-harvested linked substrates re-enter furnace 610 and pass through an optional heat trap 649, which suppresses convective heat flow. As the linked-substrate loop 674 is advanced, the individual linked flow-through substrates 74 pass through a preheat furnace 617 that is included within the furnace 610, enter into reaction chamber 612 where synthesis (lengthwise growth) of nanotube forest 89 occurs, exit the reaction chamber 612 through a first access port 614 in the side of furnace 610, pass through a cooling jacket 616, pass through a second cooling jacket 618, and then reenter the furnace through another access port 619. After an individual substrate 74 passes through the cooling jacket 616, the leading edge 86 of the nanotube forest grown on the individual substrate 74 is contacted with a pulling bar 630. The pulling bar 630 pulls the nanotube forest 89 to form a nanotube film 99. The nanotube film 99 is attached to and wound by a take up reel 650. The pulling bar 630 is then retracted and the take up reel 650 turns 651 to continuously take up the nanotube film 99 from the individual substrate 74. As the continuous loop 674 of linked substrates is advanced, the continuous loop 674 forms a folded junction 660 where the trailing edge 88 of the preceding nanotube forest 89 (on substrate 6741) is placed into contact with the leading edge 86 of the following nanotube forest 89 (on substrate 6741). In addition, in some embodiments, the nanotube forest 89 grown on preceding linked substrate 6741 is pressed into the leading edge of a nanotube forest 89 growing on the following linked substrate 6742 by a forest-merging press arm 665 which is selectively moved when needed to press the two forests together. This can be at the junction between different nanotube forests 89 on separate substrates 6741 and 6742 as shown, but, in some embodiments, can also be used to press across small gaps within a nanotube forest 89, such as can occur due to defects in the catalyst surface or other reasons. This pressure or contact between forests allows for the continuous collection of the nanotube film 99 from the separate substrates 74 of the advancing continuous loop 674 even if there is a slight gap due to spacing between substrates and/or growing conditions at the edges of the substrates.

Also illustrated is an input gas inlet 607 positioned next to the take up reel 650 in some embodiments, and through which gas (e.g., an inert gas such as helium or argon, or other gas that does not detrimentally react with the warm or hot nanotube forests 89) can flow to maintain a slight positive gas pressure that acts to exclude oxygen from the cool chamber 618 of the invention during collection of nanotube-film 99.

FIG. 6D is a side cross-section view diagram of a system 604 that provides continuous nanotube synthesis, wherein the chamber of furnace 610 is located generally above cool chamber 618, in order to suppress convection between the chambers. The features are the same as, or similar to, like-numbered features described in FIGS. 6A and 6C.

Figure 7A:
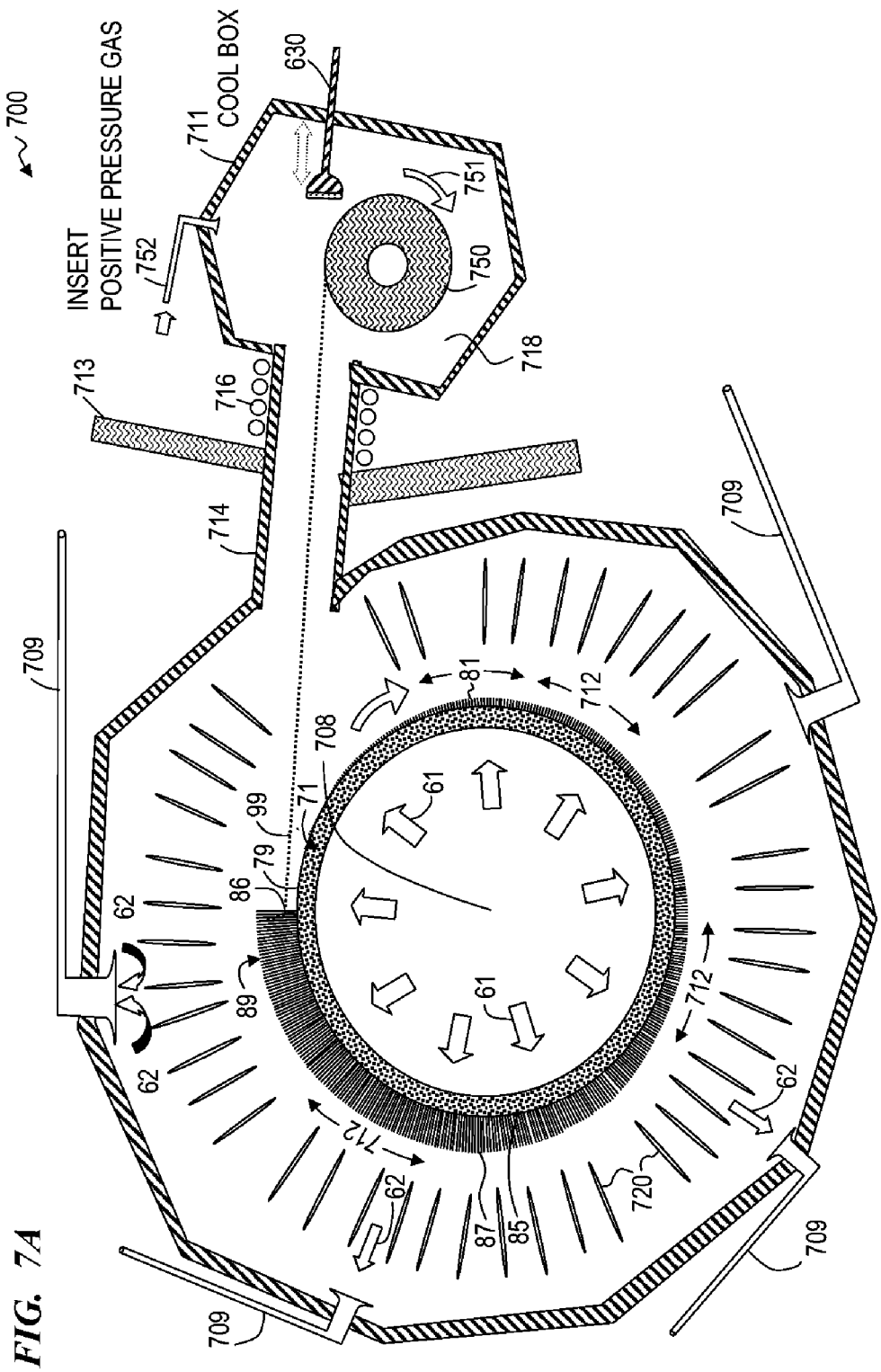
FIG. 7A is a cross-section side view of an apparatus for the continuous synthesis of carbon nanotubes in which the nanotubes are continuously collected from a substantially cylindrical flow-through substrate.

FIG. 7A is a side cross-section view diagram of a continuous nanotube synthesis device or system 700 of some embodiments of the invention. Here, an input reactant gas 61 is shown flowing into the interior of a closed-ended substantially cylindrical substrate 71 that is positioned within a furnace 710. In some embodiments, cylinder substrate 71 has an outer layer formed of microporous ceramic of the type used to cold filter beer, for example having an inner structure and composition similar to the ceramic filters described in U.S. Pat. No. 6,394,281 by Ritland et al., which is incorporated herein by reference.

In some embodiments, the outer surface of the starting material is formed or machined to a substantially smooth outer surface in the shape of a cylinder. In other embodiments, the shape of a truncated cone or other solid prism shape is used. In some embodiments, this outer layer's surface is covered with a CVD-deposited layer of polysilicon, which is then treated with an anodic etch in ethanol and hydrofluoric acid to create a nanoporous surface as described above for silicon wafers, and then covered with a 5-nanometer (for example) layer of iron that is then oxidized to form the nanotube catalyst. This forms a flow-through substrate cylinder 71. Other embodiments use other materials to create cylinders (that may be, but need not be, flow-through) that will operate at the high temperatures (e.g., 680 to 700 degrees centigrade, in some embodiments). In some embodiments that use a porous material for cylinder substrate 71, the slightly pressurized input reactant gas 61 passes or permeates through the substantially cylindrical porous substrate 71 and contacts a catalyst-covered growth surface 79 located on the outside of substantially cylindrical substrate 71. Interaction of the input reactant gas 61 with the catalyst-covered growth surface 79 of cylindrical substrate 71 provides for the synthesis of a radially-aligned, densely packed continuous nanotube forest 89 on the catalyst-covered growth surface 79. This synthesis occurs within a reaction region 712 that is located within furnace 710. In some embodiments, no reaction chamber enclosure is used since the nanotube forest is continuously grown in a radial direction as cylinder 71 rotates, and the nanotube film 99 is harvested continuously from front face 86 of forest 89 while still at the reaction temperature (e.g., 680 to 700 degrees centigrade, in some embodiments).

The nanotube forest 89 is shown as having a leading edge 86, new growth nanotube forest 81, a top 87 distal from growth surface 79 of cylinder 71, and a bottom 85 adjacent to growth surface 79 of cylinder 71. The exhaust or output gas 62 then exits the furnace 710 through an exhaust outlet 709. In some embodiments, a leading edge 86 of the nanotube forest 89 is initially contacted with a pulling bar 630 that then withdraws from nanotube forest 89 to form and pull nanotube film 99. In some embodiments, nanotube film 99 is attached to a take up reel 750. The pulling bar 630 is then retracted and the take up reel 750 turns in direction 751 to continuously collect the nanotube film 99 from cylindrical substrate 71. In some embodiments, cylindrical substrate 71 is very slowly turned as the nanotube film 99 is collected from the substrate to provide for continuous collection of the nanotube film 99. In some embodiments, an optical sensor is connected to a servo motor used to rotate cylindrical substrate 71 in order to keep front edge 86 of nanotube forest 89 at an optimal position or angle for pulling the nanotube forest 89. In some embodiments, nanotube film 99 passes through a side access port 714 in furnace 710 and through cooling jacket 716 into cool chamber 718 before it is collected on the take up reel 750 positioned within cooling box 711. In some embodiments, cooling box 711 includes a positive-pressure gas inlet 752 that provides for entry of gas to maintain a positive pressure within the cooling box 711 that acts to exclude oxygen or other potential contaminants from the cooling box 711. Also illustrated are insulation walls 713.

Figure 7B:
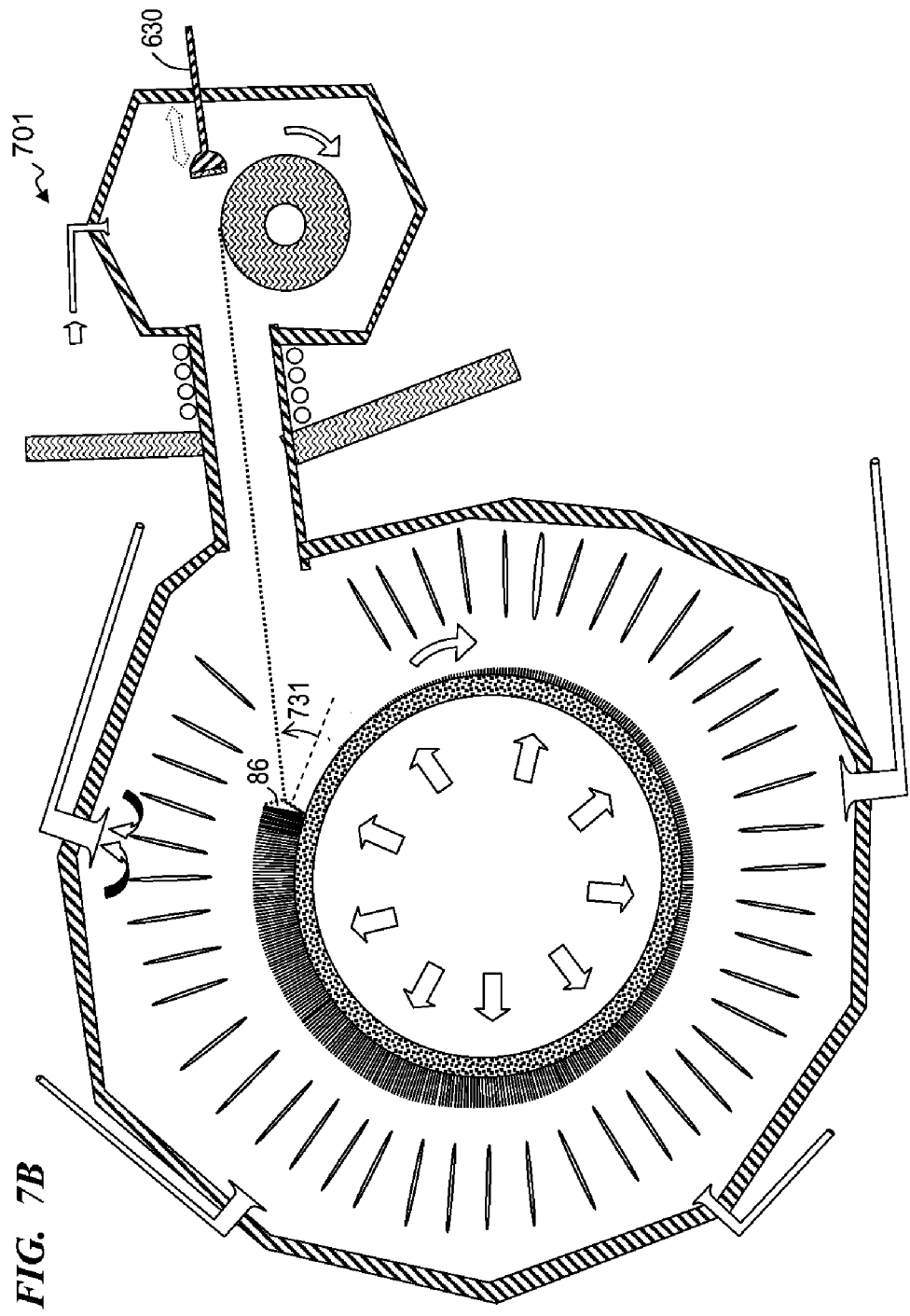
FIG. 7B is a side-view of an apparatus for the continuous synthesis of carbon nanotubes in which the nanotubes are continuously collected from a substantially cylindrical flow-through substrate.

FIG. 7B is side cross-section view of system 701, a variation where the take up reel 750 is positioned within the cooling box 711 such that the nanotube film 99 forms a forest-merge pull angle 731 from the normal vector to forest front face 86 (or the tangent vector to cylinder substrate 71). In some embodiments, forest-merge pull angle 731 forces nanotubes on the leading edge 86 of the nanotube forest 89 into better contact with nanotubes that are slightly behind the leading edge 86, in order to increase collection efficiency from the leading edge 86 of the nanotube forest 89. In some embodiments, system 700 or system 701 also includes a press bar.

> Some embodiments of the below methods use techniques as described in U.S. Pat. No. 6,428,713 to Christenson et al., entitled "MEMS sensor structure and microfabrication process therefor" which is incorporated herein by reference.

FIGS. 8A-8K are perspective schematic diagrams of a substrate 877 going through steps in making a flow-through substrate for growing carbon nanotube forests 89, this method used in some embodiments of the present invention. In FIG. 8A, a substrate 877 (e.g., made of a silicon wafer having a 100-crystal orientation at its top surface) is overlaid by $SiO_2$ strips or islands 801 by well-known semiconductor-processing techniques. (E.g., in some embodiments, the top layer is thermally oxidized; the pattern is photo-lithographically defined, and etched to leave strips 811. In some embodiments, one approach is to heat substrate 877 to a high temperature, for example, 850 to 1200 degrees C., in a controlled atmosphere containing either pure oxygen or water vapor. At such high temperatures, the oxygen and/or water vapor diffuse into and react with the silicon of substrate 877, thereby forming a silicon dioxide layer on the exposed top surface of substrate 877. This silicon dioxide is patterned into strips 811 that serve as a bonding oxide for epitaxial growth, as an etch-termination layer, and are later removed to leave lateral gas passages and an inner surface for the porous-etch process.) This results in partially processed substrate 800. In some embodiments, strips 811 are periodically connected to one another with narrow bridges along their lengths or near their ends, in order that the gas passages that result from later processing are all connected to one another. Other materials can be substituted in other embodiments.

In FIG. 8B, substrate 877 is processed to grow epitaxial single-crystal silicon 820 to the tops of $SiO_2$ strips 811 by well-known semiconductor-processing techniques. This results in partially processed substrate 801.

In FIG. 8C, substrate 877 has experienced further epitaxial single-crystal silicon growth laterally 822 over the edges $SiO_2$ strips 811 by well-known semiconductor-processing techniques (lateral epitaxial growth). This results in partially processed substrate 802.

In FIG. 8D substrate 877 has experienced further epitaxial single-crystal silicon growth laterally, completely covering $SiO_2$ strips 811. This results in partially processed substrate 803 having an outer silicon surface 821 that is substantially covering at least one face of substrate 877, wherein underlying at least a portion of the outer silicon surface 821 are silicon dioxide strips 811.

In FIG. 8E, substrate 877 has been covered with silicon dioxide, wherein the top surface is left completely covered with $SiO_2$ and the bottom has been patterned into $SiO_2$ strips 831. This results in partially processed substrate 804.

In FIG. 8F, substrate 877 has been etched from the bottom. For example, in some embodiments, using deep reactive ion etching (DRIE), e.g., as described in U.S. Pat. No. 6,685,844 to Rich et al. and/or as described in U.S. Pat. No. 6,127,273 to Laermer et al., which are incorporated herein by reference. In some embodiments, an Alcatel 601 DRIE machine and a pulsed-gas process, as described in the just-mentioned patents, is used to form back channels 834 and leaving silicon beams 830. In some embodiments, silicon cross beams 832 are also left. This results in partially processed substrate 805. FIG. 8G shows this result along section line 8G.

FIG. 8G shows a cross-section view of processed substrate 805 showing silicon cross beam 832 that was left. The bottom etch was stopped before penetrating top layer 821.

In FIG. 8H substrate 877 has been etched to remove substantially all the silicon dioxide. This results in partially processed substrate 806, having upper channels 841 and bottom channels 834. FIG. 8I shows this result along section line 8I.

FIG. 8I shows a cross-section view of processed substrate 806 showing silicon cross beam 832 that was left.

In FIG. 8J, substrate 877 has been processed with a nanoporous etch as described above. E.g., in some embodiments, at least top layer 821 is a highly P-doped n$^+$ type silicon substrate (100-oriented-crystal top surface, resistivity 0.008-0.018 Ohm-cm), and is electrochemically etched in 1:1 HF (49% in water) ethanol with an anodization current density of 10 mA/cm$^2$ (in some embodiments, typical etching time is five minutes). This forms a thin nanoporous layer (pore size about 3 nanometers) on top of a microporous layer (pore size about 100 nanometers). In some embodiments, the other exposed surfaces of the channels are also affected similarly, and have a nanoporous surface. Next, in a step B, in some embodiments, the top of the porous layer is covered substantially in its entirety (unlike Dai et al. describe in U.S. Pat. No. 6,232,706) with a five-nanometer thick iron (Fe) film by e-beam evaporation. The inner and bottom surfaces are not iron coated, in order to prevent nanotube growth inside substrate 877. In some embodiments, after deposition of iron, the substrate is annealed in air at 300 degree C. overnight. This annealing step oxidizes the surface of the silicon as well as the iron, converting the iron patterns into catalytically active iron-oxide. The resulting silicon dioxide layer formed on the underlying porous silicon prevents the porous structure of layers from collapsing during any following high-temperature chemical vapor deposition (CVD) step. This results in partially processed substrate 807, having upper channels 841 and bottom channels 834. The top growing surface 79 has an iron-oxide catalyst layer and a large plurality of nanopores that conduct reactant gasses from the bottom of substrate 807 through to the top layer 79.

FIG. 8K shows a cross-section view of processed substrate 807 showing silicon cross beam 832 that was left. The two-dimensional X-Y grid of beams 830 and 832 provide structural integrity to substrate 807. In some embodiments, the cross beams 832 are at a slant angle to direction Y, in order that all passages 841 connect to at least one gas passage 834 through the back of substrate 807. Region 871 represents where the bottom etch was stopped before eating through top layer 821.

FIG. 8L is a bottom-view schematic diagram of a flow-through substrate 807 for growing a carbon nanotube forest 89.

FIG. 8L1 is a close-up bottom-view schematic diagram of a flow-through substrate for growing a carbon nanotube forest. In some embodiments, the cross beams 832 are at a slant angle to direction Y, in order that all passages 841 connect to at least one gas passage 834 through the back of substrate 807.

FIGS. 8M-8P are perspective schematic diagrams of alternative steps in making a flow-through substrate for growing carbon nanotube forests. In some embodiments, these steps represent processing done after that of FIG. 8G.

FIG. 8M is a perspective schematic view of a substrate 808, wherein the nanopore etching described for FIG. 8J above is performed before etching to remove silicon dioxide strips 811, in order that the etching operation occurs only from the top surface of top layer 821 to form porous top layer 861. FIG. 8N shows this result along section line 8N.

FIG. 8N shows a cross-section view of processed substrate 808 showing silicon cross beam 832.

In FIG. 8O substrate 877 has been etched to remove substantially all the silicon dioxide of strips 811. This results in completed substrate 809, having upper channels 841 and bottom channels 834. FIG. 8I shows this result along section line 8I.

FIG. 8I shows a cross-section view of completed substrate 809 showing silicon cross beam 832.

FIGS. 9A-9G are perspective schematic diagrams of steps in making a flow-through substrate for growing carbon nanotube forests. The processing here is similar in some respects to that described in FIGS. 8A to 8K, except that narrow, deep channels 919 are used rather than the less-deep channels 811 used in FIGS. 8A to 8K.

Figure 9A:
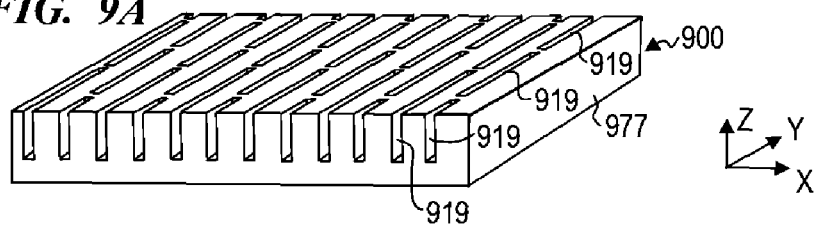
FIGS. 9A, 9B, 9C, 9D, 9E, 9F, and 9G are perspective schematic diagrams of steps in making a substrate 977 into a flow-through substrate 905 for growing carbon nanotube forests.

In FIG. 9A, a substrate 977 (e.g., made of a silicon wafer having a 100-crystal orientation at its top surface) deep etched to create grooves or channels 919 by deep reactive ion etching (DRIE), e.g., as described in U.S. Pat. No. 6,685,844 to Rich et al. and/or as described in U.S. Pat. No. 6,127,273 to Laermer et al., which are incorporated herein by reference. In some embodiments, an Alcatel 601 DRIE machine and a pulsed-gas process, as described in the just-mentioned patents, is used. Channels 919 will delineate lateral gas passages that extend in the Y direction in the final processed substrate, while reducing the lateral extent (the size of the top porous membrane between support pillars in the Z direction) of the nanoporous top surface in order to increase the strength of the top surface.

In some embodiments, as described below for FIG. 9H, additional occasional cross channels 920 (e.g., along the X direction, left-to-right in the diagram and each connecting to a plurality of the channels shown (those extending in the Y direction, from lower left in the diagram to upper right)). In some embodiments, these cross channels 920 are wider than channels 919, and thus etch deeper than channels 919. In some embodiments, the cross channels 920 are positioned in a staggered manner along the Y direction, in order to prevent any straight channel completely crossing the substrate in the X direction, which could weaken the substrate along that line. In some embodiments, cross channels 920 are etched completely through substrate 977, eliminating the need for, and the steps used to separately create, the back channels 915, since the wider cross channels serve a similar purpose.

Figure 9B:
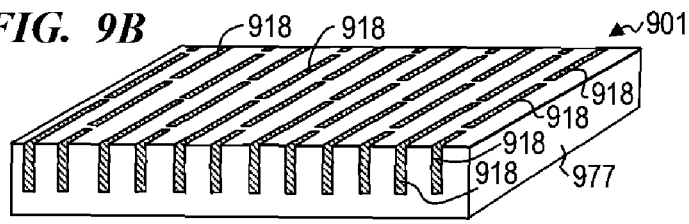

In FIG. 9B, substrate 977 is processed to fill channels 919 and channels 920 with $SiO_2$ to form silicon dioxide strips 918, which support the epitaxial lateral overgrowth (ELOG) of silicon top layer 930, but will then later be etched away to leave lateral gas passages.

Figure 9C:
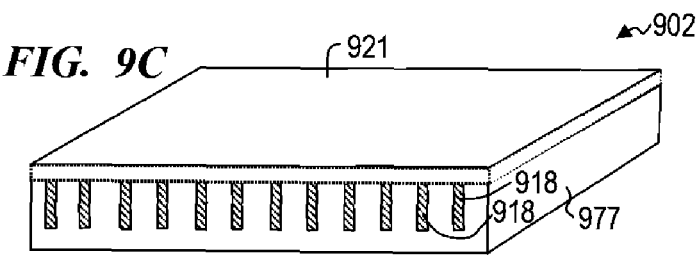

In FIG. 9C substrate 977 has experienced epitaxial single-crystal-silicon growth laterally, completely covering $SiO_2$ strips 911. This results in partially processed substrate 902 having an outer silicon surface 921 that is substantially covering at least one face of substrate 977, wherein underlying at least a portion of the outer (e.g., top) silicon surface 921 are silicon dioxide strips 918 having a greater vertical extent than width, and extending lengthwise in the Y direction.

Figure 9D:
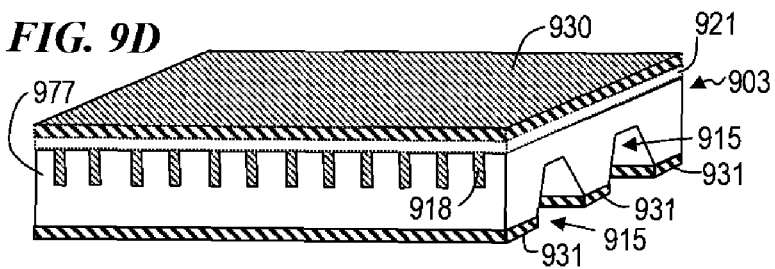

In FIG. 9D, substrate 977 has been covered with silicon dioxide, wherein the top surface is left completely covered with $SiO_2$ and the bottom has been patterned into $SiO_2$ strips 931. This results in partially processed substrate 804. Further, substrate 977 has been etched from the bottom (for example, in some embodiments, using DRIE) to form back channels 915 and leaving silicon beams 939. In some embodiments, silicon cross-beams extending in the Y direction or at an angle to the Y direction are also left, as described in FIG. 8G. This results in partially processed substrate 903. The bottom etch was stopped after the bottom channels 915 reach the silicon dioxide strips 918, but well before penetrating top layer 921. This provides greater strength than in FIG. 8G, and is also easier to accomplish because the silicon dioxide strips 918 are so much deeper than silicon dioxide strips 811 of FIG. 8G.

Figure 9E:
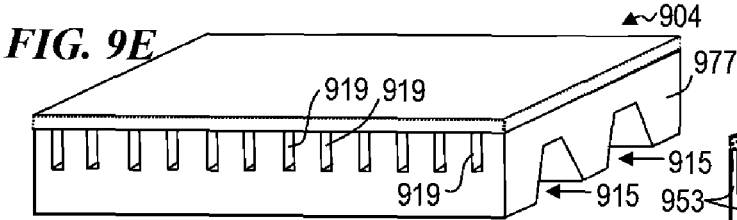

In FIG. 9E substrate 977 has been etched to remove substantially all the silicon dioxide. This results in partially processed substrate 904, having upper channels 918 extending in the Y direction and bottom channels 915 extending in the X direction.

Figure 9G:
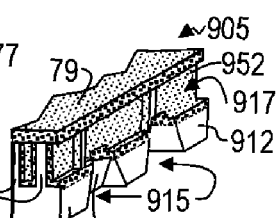
Figure 9F:
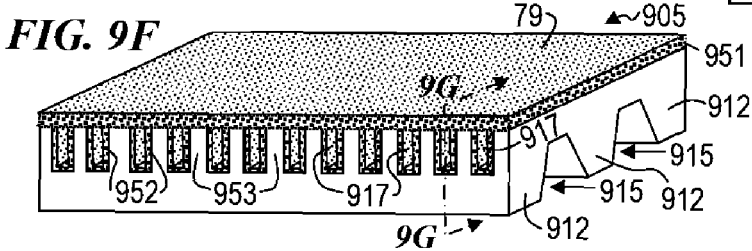

In FIG. 9F, substrate 977 has been processed with a nanoporous etch as described above for FIG. 8G. The top growing surface 79 has an iron-oxide catalyst layer and a large plurality of nanopores that conduct reactant gasses from the bottom of substrate 977 through porous layer 951 to the catalyst-covered growth surface 79. In some embodiments, the initial channels 919 are spaced far enough apart that the vertical walls are initially thick enough such that after nanopore etching creates porous layer 952, there is still a wall of substantially solid silicon 953 to help support and strengthen top layer 951. FIG. 9G shows the resulting completed substrate along section line 9G.

FIG. 9G shows a cross-section view of processed substrate 905 showing silicon bottom cross beam 932 that was left after the bottom etch earlier. The two-dimensional X-Y grid of beams 915 and 932 provide structural integrity to substrate 905. In some embodiments, the cross beams 932 are at a slant angle to direction Y, in order that all passages 917 connect to at least one gas passage 934 through the back of substrate 905.

Figure 9H:
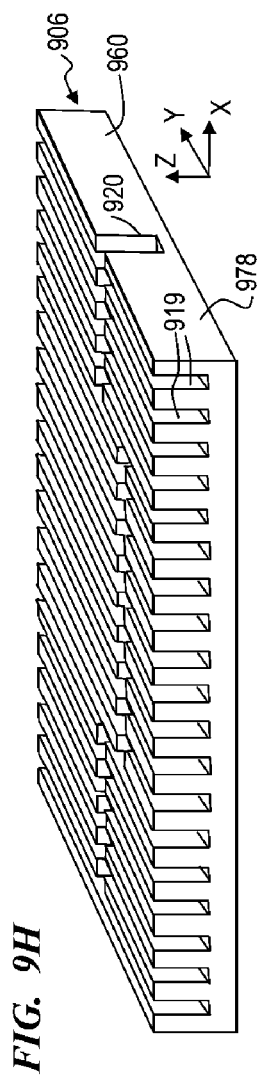
FIG. 9H is a perspective schematic diagram showing the step that substrate 977 (e.g., made of a silicon wafer having a 100-crystal orientation at its top surface) is deep etched to create grooves or channels 919 by deep reactive ion etching (DRIE), as described for FIG. 9A.

In FIG. 9H, a substrate 977 (e.g., made of a silicon wafer having a 100-crystal orientation at its top surface) is deep etched to create grooves or channels 919 by deep reactive ion etching (DRIE), as described for FIG. 9A. In some embodiments, additional occasional cross channels 920 (e.g., along the X direction in the diagram and each connecting to a plurality of the channels 919 that extend in the Y direction). In some embodiments, these cross channels 920 are wider, and thus etch deeper than channels 919. In some embodiments, the cross channels 920 are moved back and forth along the Y direction, in order to prevent any straight channel completely crossing the substrate in the X direction, which could weaken the substrate along that line. In some embodiments, at least some of either channels 919 or channels 920 are etched out to a point that will be outside side wall 960 in the completed substrate, in order to provide a gas inlet port through a side wall of substrate 978.

Figure 9I:
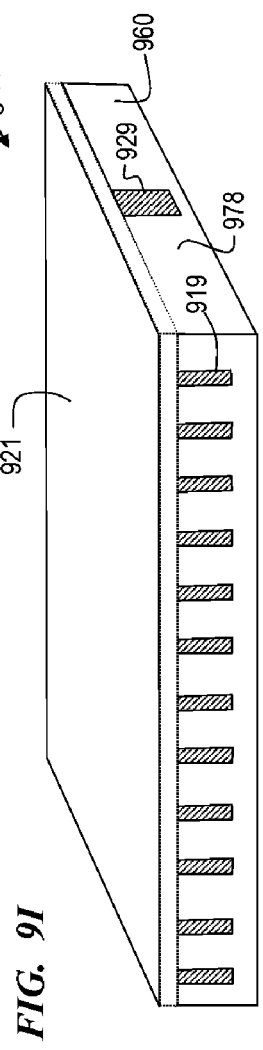
FIG. 9I is a perspective schematic diagram showing the step that substrate 977 is processed to fill channels 919 and channels 920 with $SiO_2$. to form silicon dioxide strips 918, which support the epitaxial lateral overgrowth (ELOG) of silicon top layer 930, but will then later be etched away to leave lateral gas passages having at least one gas inlet port through a side wall 960 of substrate 978.
Figure 9J:
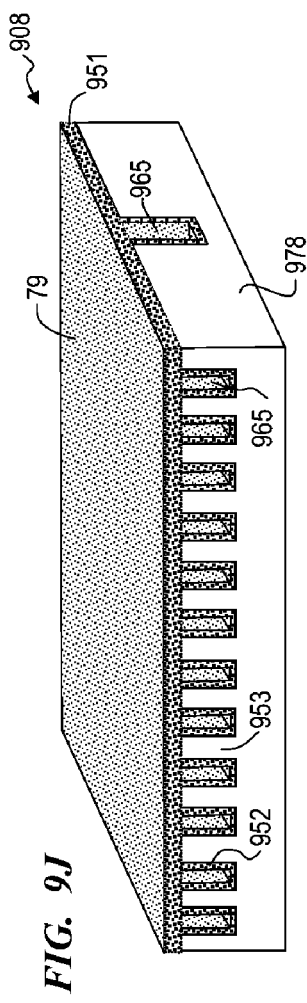
FIG. 9J is a perspective schematic diagram showing the step that substrate 977 has been processed with a nanoporous etch as described above for FIG. 8G.

In FIG. 9I, substrate 977 is processed to fill channels 919 and channels 920 with SiO$_2$. to form silicon dioxide strips 918, which support the epitaxial lateral overgrowth (ELOG) of silicon top layer 930, but will then later be etched away to leave lateral gas passages having at least one gas inlet port through a side wall 960 of substrate 978. Further, substrate 977 has now experienced epitaxial single-crystal-silicon growth laterally, completely covering SiO$_2$ strips 919 and 920. This results in partially processed substrate 906 having an outer silicon surface 921 that is substantially covering at least one major face of substrate 978, wherein underlying at least a portion of the outer (e.g., top) silicon surface 921 are silicon dioxide strips 919 having a greater vertical extent than width, and extending lengthwise in the Y direction, and silicon dioxide strips 920 having a greater vertical extent than width, and extending lengthwise in the X direction to contact a plurality of strips 919. Processing continues as described for FIGS. 9A-9G, In FIG. 9J, substrate 977 has been processed with a nanoporous etch as described above for FIG. 8G. The top growing surface 79 has an iron-oxide catalyst layer and a large plurality of nanopores that conduct reactant gasses from the bottom of substrate 978 through porous layer 951 to the catalyst-covered growth surface 79. In some embodiments, the initial channels 919 are spaced far enough apart that the vertical walls are initially thick enough such that after nanopore etching creates porous layer 952, there are still walls 953 of substantially solid silicon to help support and strengthen top porous layer 951.

Figure 9K:
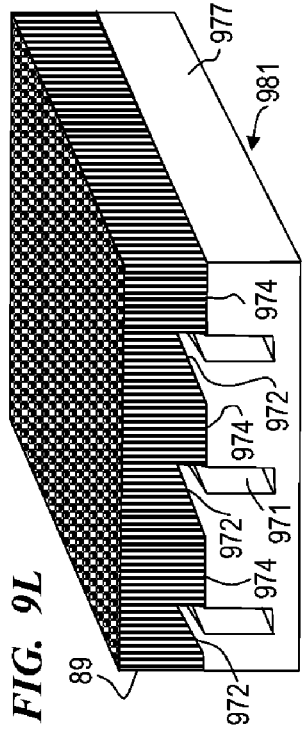
FIGS. 9K and 9L are perspective schematic diagrams of steps in making a substrate 977 into a side-flow or through-flow dugout substrate 982 for growing carbon nanotube forests.

FIG. 9K is a perspective-view schematic diagram of a substrate 977 made into a side-flow or through-flow dugout substrate 981 for growing carbon nanotube forests. In the embodiment shown, dugout substrate 981 includes a plurality of long, deep, narrow slots 971, over which roofs 972 have been grown (for example, by epitaxial lateral overgrowth over silicon dioxide that was later removed), such that the leading edge of each roof 972 extends to or slightly over the opposite sidewall 973 (thus giving the appearance of the structure an impression of a baseball stadium dugout).

Figure 9M:
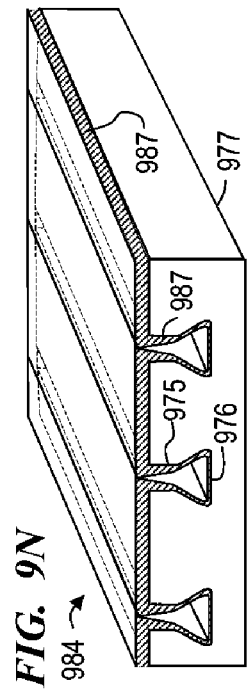
FIGS. 9M, 9N, and 9O are perspective schematic diagrams of steps in making a substrate 977 into a side-flow or through-flow substrate 985 for growing carbon nanotube forests.
Figure 9L:
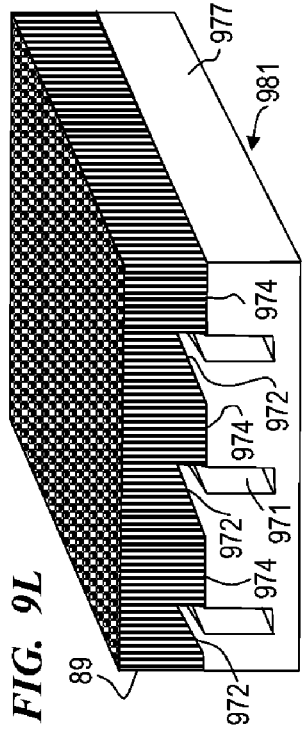

FIG. 9L is a perspective-view schematic diagram of a side-flow dugout substrate 982 on which has been grown a nanotube forest 89. The roofs 973 and the remaining top surface 974 together form a growing surface that allows growth of nanotube forest 89 on a substantially continuous basis in the X and Y directions, wherein the reactant gas flows through channels 971, then permeates up and out of the dugout to feed the growth of nanotube forest 89 at its base. This allows even the interior of forest 89 to be fed with a sufficient supply of reactant so all the nanotubes grow at the same rate.

Figure 9N:
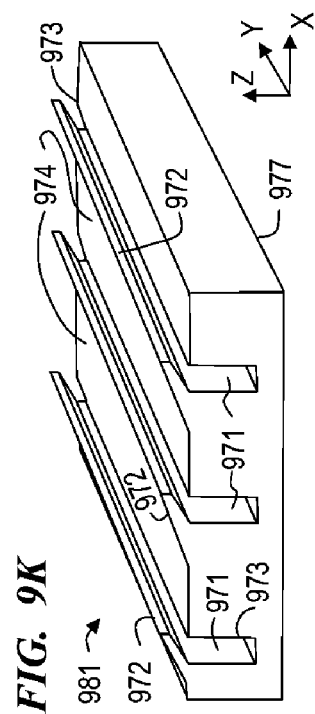
Figure 9O:
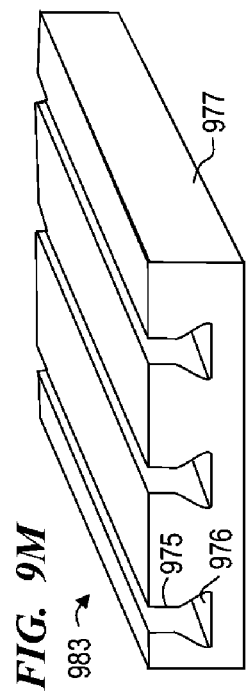

FIGS. 9M, 9N, and 9O are perspective-view schematic diagrams of making a substrate 977 into a side-flow or through-flow substrate 985 for growing carbon nanotube forests 89, according to some embodiments.

FIG. 9M shows a substrate 977 after having channels 975 that have been etched using DRIE in order to form wide-bottomed channels 976, in some embodiments, for example, as described in U.S. Pat. No. 6,127,273 mentioned above.

FIG. 9N shows substrate 977 after having added epitaxial growth 987 that substantially closes the tops of channels, while leaving the wide channel bottoms substantially open.

FIG. 9O shows substrate 977 after having anodic nanoporous etching, as described above. In some embodiments, the anodic nanoporous etching forms micropores and nanopores 988 into the top layer 987, such that reactant gas can flow through channels 976 and the micropores and nanopores in order to supply nanotube growth in the interior portion of growing nanotube forest 89.

FIG. 10A is a perspective schematic diagram of apparatus 1000 and method for making a continuous-web carbon nanotube film structure 1093. In a manner similar to that shown in FIG. 2D, criss-crossed lengths of carbon nanotube film 1098 are laid across film-holding belts 1037 and 1038, which, in some embodiments, are at least partially coated with pressure-sensitive adhesive. In some embodiments, one or more spools 652 (e.g., from an apparatus such as shown in FIG. 6A) dispenses nanotube film 1098, which is laid across the span between holding belts 1037 and 1038, pulled sufficiently tight for the desired resulting structure 1093, and then attached to holding belt 1037 and holding belt 1038. E.g., in some embodiments, a non-stick bar 1011 is used to press film 1098 into the adhesive on belt 1037 when it reaches that side, and non-stick bar 1012 is used to press film 1098 into the adhesive on belt 1038 when it reaches the opposite side. Illustrated schematically in FIG. 10A, the films 1098 are dispensed at an angle to the direction of movement of structure 1093 (e.g., at 10 to 80 degrees to the direction of movement 1030. In some embodiments, belts 1038 and 1039 are continuous-loop belts that run as a conveyor around pulleys 1039. In some embodiments, the completed structure 1093 is a continuous web that is transferred to sheet holder belt 1050 for further processing downstream (to the right). In some embodiments, sheet holder belt 1050 includes a flexible sheet 1055 having adhesive strips 1057 and 1058 along opposite edges.

In other embodiments, as described below for FIG. 10E, sheet holder belt 1050 instead includes a microporous surface through which air is pulled (e.g., from a vacuum applied through a smooth perforated support surface 1061 underneath sheet holder belt 1050) in order to hold structure 1093 sheet holder belt 1050 without adhesive strips 1037 and 1038. This has the advantage of being able to reverse the air flow to provide a pressure (rather than vacuum) in order to easily release the assembled criss-cross film structure 1093 from sheet holder belt 1050 as desired.

In some embodiments, a plurality of films 1098 (e.g., A, B, and C shown here) are laid side-by-side, back and forth, edge-to-edge, across the build area as the conveyor mechanism moves in direction 1030.

In some embodiments, belts 1037 and 1038 are omitted, and the films 1098 are assembled in a like manner directly onto sheet holder belt 1050 (e.g., using non-stick bars 1011 and 1012 being used to press the taut film into adhesive strips 1057 and 1058.) In other embodiments, sheet holder belt 1050 instead includes the microporous surface through which a vacuum is pulled as described above. This has the advantage of directly laying and holding the films 1098 with vacuum to hold the films, and then being able to reverse the air flow to provide a pressure (rather than vacuum) in order to easily release the assembled criss-cross film structure 1093.

FIG. 10B is a cross-section view schematic diagram of a transfer step in making a continuous-web carbon nanotube film structure 1093. In this view, holder belts 1038 and 1037 are moving towards the viewer outside the edges of sheet 1055 on which adhesive strips 1058 and 1057 are affixed. Other embodiments use vacuum attachment to a microporous sheet member 1050 as just described.

FIG. 10C is an enlarged perspective schematic diagram of a transfer step in making a continuous-web carbon nanotube film structure 1093. In the embodiment shown, non-stick presser rollers 1013 and 1014 press crossed-film structure 1093 onto conveyor 1050, thus removing crossed-film structure 1093 from belts 1038 and 1037. In some embodiments, presser rollers 1013 and 1014 also include a cutting edge 1015 to help cut crossed-film structure 1093 from belts 1038 and 1037.

FIG. 10D is a top-view schematic diagram of the transfer step described in FIG. 10C.

FIG. 10E is a perspective schematic diagram of system 1005 showing assembly and densification steps in making a densified continuous-web carbon nanotube film structure 1094. In some embodiments, a continuous-loop microporous plastic sheet 1056 is passed across perforated vacuum table 1061, and air 1062 is pulled through microporous plastic sheet 1056 to hold a cross-cross pattern of nanotube films 1098 as it is formed into crossed-film structure 1093 as described above. (In other embodiments, continuous adhesive strips 1058 along the edges of sheet 1055 such as shown in FIG. 10B are used.) In some embodiments, belt 1056 and the as-laid (undensified) continuous-web nanotube film structure 1094 on its surface are then dipped into a liquid bath 1066, such as ethanol, for example, and then withdrawn vertically and dried using air 1065 to density the carbon-film that is drawn thinner with the shrinking and thinning liquid film on the surface of sheet holder belt 1050. In some embodiments, once the densified film is dry (e.g., at the top of FIG. 10E), air pressure is applied through the microporous plastic sheet 1056, in order to separate the densified film 1094 from microporous plastic sheet 1056 in a continuous web for later processing or spooling onto a take-up reel.

FIGS. 11A-11F are perspective schematic diagrams of steps in making a continuous web of crossed films, where each film in the assembly is being held at its ends by a first and second adhesive member of a conveying mechanism that is moved in a rotary rocking motion, in order to obtain a crossed-film structure of a plurality of carbon-nanotube films in a continuous web.

FIG. 11A is a perspective-view schematic diagram of system 1100 that includes endless-belt adhesive holder 1137 and endless-belt adhesive holder 1138 each moving diagonally downward at an angle ALPHA such that film 1198, which is being dispensed from spool 652, travels substantially straight down in direction 1190. This forms a crossed-film structure 1193 having crossed films at angle two times alpha. In some embodiments, a non-stick bar 1111 is used to press film 1198 into the adhesive on belt 1038 from the left when it reaches that side, and non-stick bar 1112 is used to press film 1198 into the adhesive on belt 1037 from the left. Once film 1198 is attached to belts 1137 and 1138, the conveying mechanism 1139 is swung (e.g., in the embodiment shown, clockwise) in direction 1151.

FIG. 11A1 is a side-view of system 1100 as shown in FIG. 11A.

FIG. 11B is a perspective-view of system 1100 while the conveying mechanism 1139 is in the midst of swinging in direction 1151. In some embodiments, conveying mechanism 1139 continues to maintain angle ALPHA.

FIG. 11B1 is a side-view of system 1100 as shown in FIG. 11B.

FIG. 11C is a perspective-view of system 1100 after the conveying mechanism 1139 has completed swinging in direction 1151. In some embodiments, a non-stick bar 1113 is used to press film 1198 into the adhesive on belt 1037 from the right when it reaches that side. In some embodiments, conveying mechanism 1139 continues to maintain angle ALPHA, and is swung in direction 1152 once the film has attached to adhesive member 1137.

FIG. 11C1 is a side-view of system 1100 as shown in FIG. 11C.

FIG. 11D is a perspective-view of system 1100 while the conveying mechanism 1139 is in the midst of swinging back (counterclockwise) in direction 1152. In some embodiments, conveying mechanism 1139 continues to maintain angle ALPHA.

FIG. 11D1 is a side-view of system 1100 as shown in FIG. 11D.

FIG. 11E is a perspective-view of system 1100 after the conveying mechanism 1139 has completed swinging in direction 1151. In some embodiments, a non-stick bar 1113 is used to press film 1198 into the adhesive on belt 1037 from the right when it reaches that side. In some embodiments, conveying mechanism 1139 continues to maintain angle ALPHA, and is swung in direction 1152 once the film has attached to adhesive member 1137.

FIG. 11E1 is a side-view of system 1100 as shown in FIG. 11E.

FIG. 11F is a perspective-view of system 1100 while the conveying mechanism 1139 is in the midst of swinging in direction 1151. In some embodiments, conveying mechanism 1139 continues to maintain angle ALPHA. Film structure 1193 now has three layers of film strips, and can continue indefinitely to form a continuous web. In some embodiments, once the end of film 1198 on a first spool is reached, it is spliced (in some embodiments, for example, using the technique described below for FIG. 14E) to the beginning of a film 1198 on a second spool.

FIG. 11F1 is a side-view of system 1100 as shown in FIG. 11F.

FIG. 12A is a perspective schematic diagram of system 1200 showing steps in making a continuous web of crossed films, where each film in the assembly is being held at its ends by a first and second adhesive member of a conveying mechanism, in order to obtain a crossed-film structure of a plurality of carbon-nanotube films in a continuous web. In some embodiments, system 1200 that includes endless-belt adhesive holder 1237 and endless-belt adhesive holder 1238 (in some embodiments, each having an adhesive coating 115) moving downward at an angle ALPHA such that film 1198, which is being dispensed from spool 652, travels substantially straight down in direction 1190. The film 1198 here is dispensed to stick to moving conveyor 1239, which, in some embodiments, includes flexible adhesive belts 1237 and 1238. In some embodiments, the lower ends of belts 1237 and 1238 are positioned as defined by fixed horizontal axle 1217, while the upper ends of belts 1237 and 1238 are twisted to follow axle 1216, which is swung back and forth as in FIGS. 11A-11F above. This allows the final end of conveying mechanism 1239 to remain fixed relative to machinery further downstream.

Figure 13A:
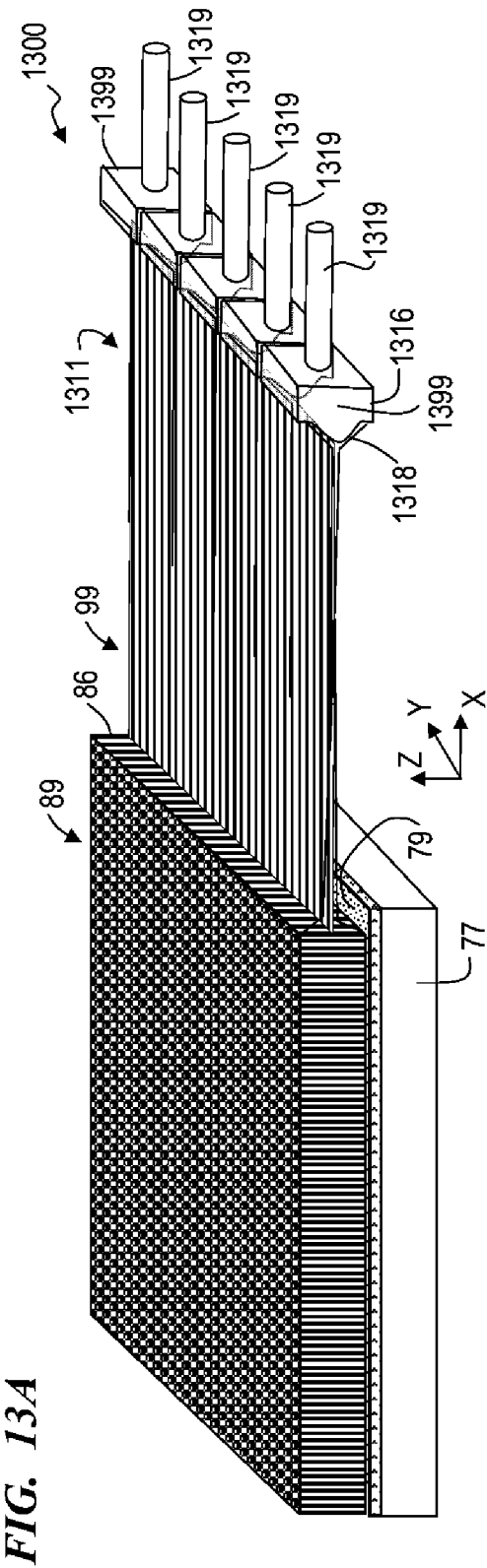
FIGS. 13A and 13B are perspective schematic diagrams of making a plurality of continuous yarns from a plurality of carbon-nanotube films pulled from carbon-nanotube forests.

FIG. 13A is a perspective schematic diagram of a system 1300 that shows a method for making a plurality of continuous yarns from a plurality of carbon-nanotube films pulled from carbon-nanotube forests. In some embodiments, system 1300 includes a plurality of film-holding bars 1399 pulling a film 99 from the face 86 of a carbon-nanotube forest 89, each using a rounded-front adhesive bar 1318. In other embodiments, other non-adhesive methods, such as described elsewhere herein are used to affix the leading ends of the films to film-holding bars 1399. In some embodiments, every other one of the film-holding bar 1399 (e.g., the even-numbered second and fourth film-holding bars 1399 in the diagram) are initially extended further (to the left, in the negative X direction in the diagram) in order to start their pull first, and in order to move further right with their film pull than the odd-numbered film-holding bars 1399, in order that they can spin without interfering with one another. Once sufficient film 99 has been initially pulled, rods 1319 will start to spin, to create a plurality of nanotube yarns similar to the single yarn described in the Zhang et al. 2004 article referred to above. In some embodiments, each film-holding bar 1399 includes a reference surface 1316 that is configured to rest on surface 79 of substrate 77, in order that the rounded front adhesive surface 1318 engages face 86 of nanotube forest 89 at a height (e.g., the middle) suitable to start a film pull. In some embodiments, the height is empirically determined. In some embodiments, a slight vertical motion is imparted as adhesive surface 1318 engages face 86 of nanotube forest 89 to get better contact for starting the film pull.

Figure 13B:
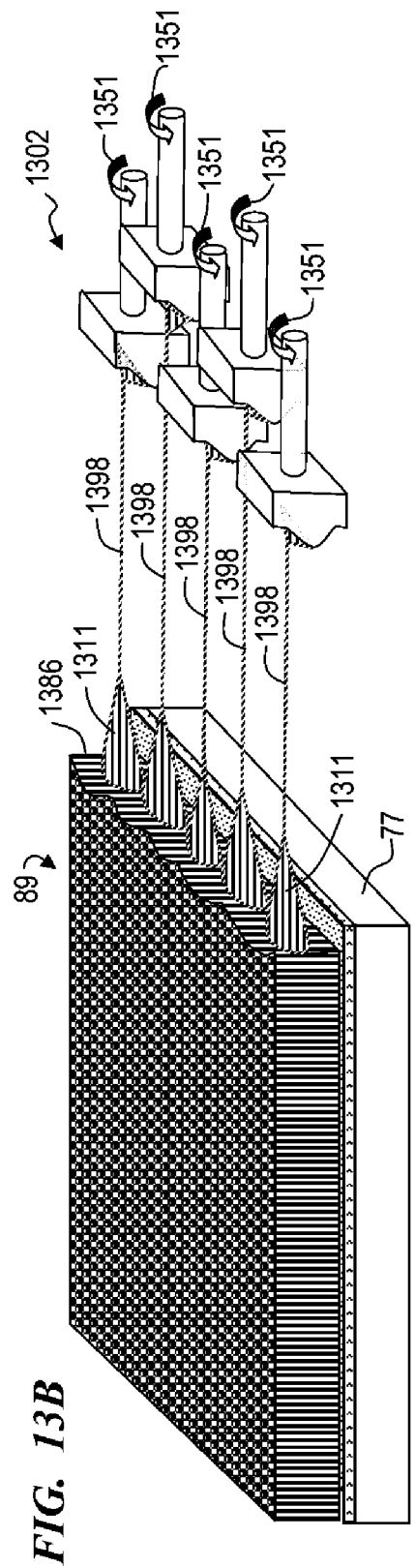

FIG. 13B is a perspective schematic diagram of system 1300 after spinning 1351 of each rod 1319 has started, making the plurality of continuous yarns 1398 from the plurality of carbon-nanotube films 1311 pulled from carbon-nanotube forest 89. In some embodiments, once the initial nanotube forest 89 has been harvested and spun into yarns 1398, carbon nanotubes from another forest 89' (or from a film 98 formed as described above) are spliced to the tail end(s) of the films 1311 pulled from the initial nanotube forest 89. In some embodiments, the spinning 1351 of each rod 1319 is stopped first, in order to pull more film 99 for the splicing process 1303.

Figure 13C:
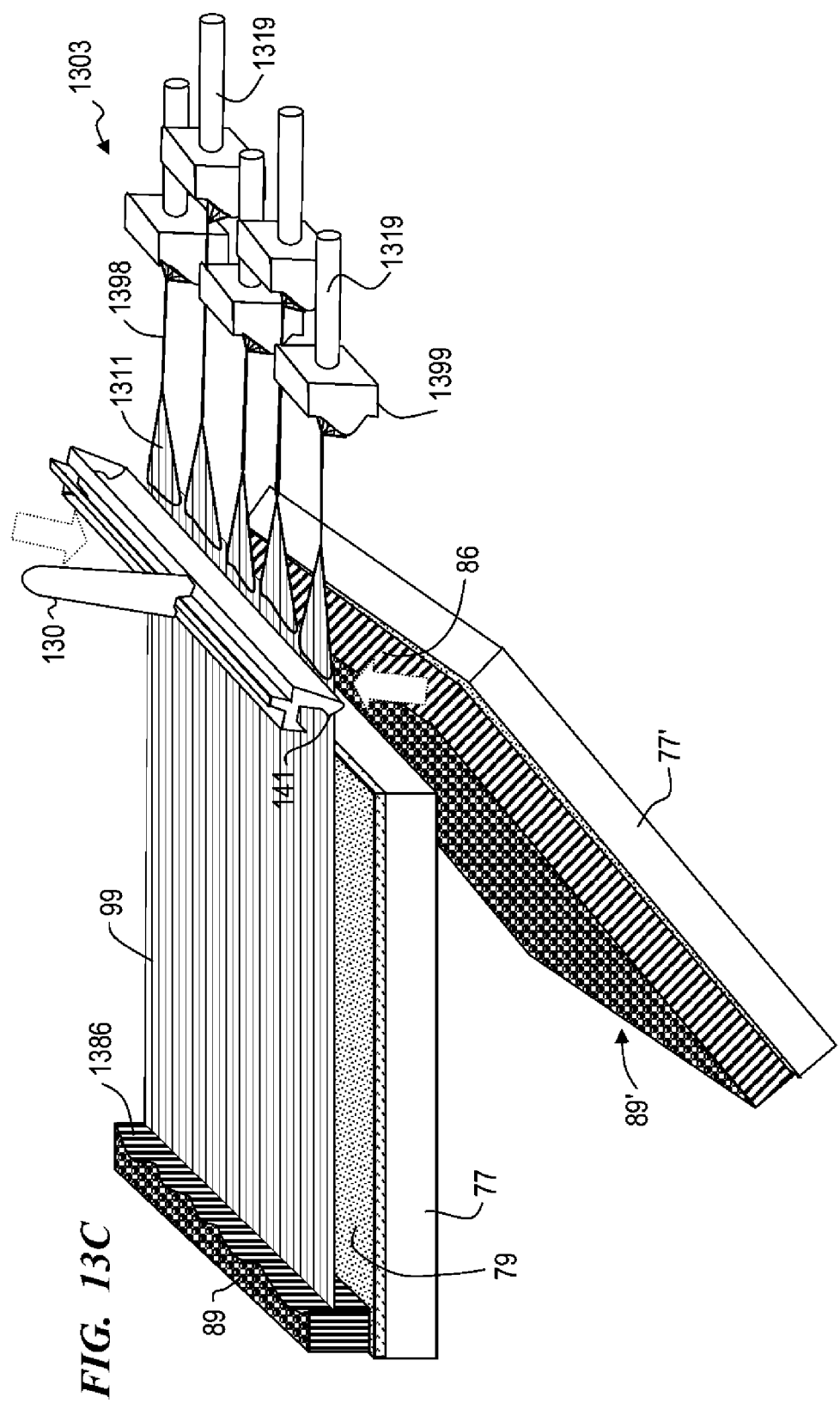
FIGS. 13C and 13D are perspective-view schematic diagrams of splicing films and/or yarns while making a plurality of continuous yarns from a plurality of carbon-nanotube forests on different substrates.

FIG. 13C is a perspective schematic diagram of a splice process 1303 in which a first carbon nanotube film 99 (or the individual portions 1311 of that film) being pulled from a first carbon nanotube forest 89 is about to be spliced to a second carbon nanotube forest 89' using splicer bar 130, in a manner similar to that described above for FIGS. 1R-1T. In some embodiments, splicer bar 130 includes a non-adhesive front nose 141 configured to press film 99 into approximately the center of front face 86' of forest 89'. In some embodiments, front nose 141 includes a porous front surface (see FIG. 14A) through which a vacuum is selectively applied in order to hold and later release film 99 during the splice process 1303. Some embodiments of splice bar 130 also include a cutting edge 142 for severing the initial film 99 once the splice has been made.

Figure 13D:
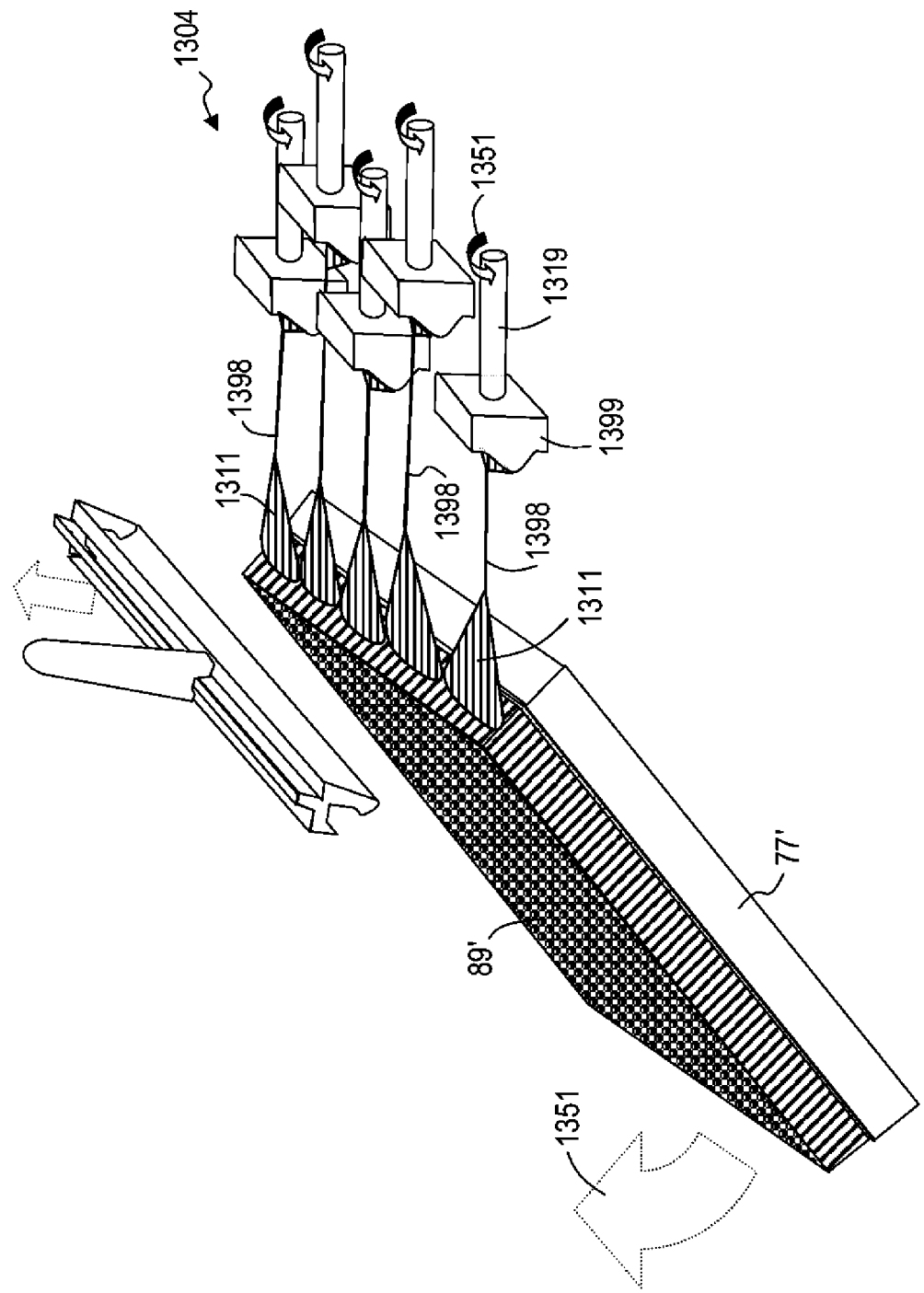

FIG. 13D is a perspective schematic diagram of carbon nanotube yarns 1398 being pulled from nanotube films 1311 the second carbon nanotube forest 89' after being spliced and removed from the first carbon nanotube forest 89. Splicer bar 130 is being withdrawn. In some embodiments, substrate 77' is swung in direction 1351 back to a normal pulling position. In this manner a plurality of continuous yarns 1398 are continuously pulled from a successively presented plurality of carbon-nanotube forests 89 from different substrates 77.

FIG. 14A is a perspective schematic diagram of a system 1400 for in initiating and pulling a continuous nanotube film 99 from a carbon-nanotube forest 89 using a vacuum film-holding bar 1499. In some embodiments, vacuum film-holding bar 1499 includes one or more internal channels 1417 leading to a microporous front interface, e.g., made of porous ceramic having a composition similar to the ceramic filters described in U.S. Pat. No. 6,394,281 by Ritland et al., which is incorporated herein by reference.

FIG. 14B is a perspective schematic diagram of system 1400 with a vacuum film-holding bar 1499 pulling nanotube film 99 from carbon-nanotube forest 89.

FIG. 14C is a perspective schematic diagram of system 1402 useful for transferring films 98 obtained by pulling a continuous film 99 from a carbon-nanotube forest 89 using vacuum film-holding bar 1499, in a manner similar to that shown in FIGS. 1J and 1K. In some embodiments, each of vacuum film-holding bars 1431, 1432, and 1433 are of a construction substantially similar to vacuum film-holding bar 1499. The use of vacuum film-holding bars allows a vacuum/air suction to be applied at a time when adhesion or holding of the film is desired, and then for air pressure to be applied at a later time when release of the film is desired. In some embodiments, vacuum film-holding bar 1431 is omitted, and vacuum film-holding bar 1499 serves that purpose.

FIG. 14D is a perspective schematic diagram of system 1402 after transferring film 98 to vacuum film-holding bars 1431 and 1432 and separating it from continuous film 99 that continues to be pulled from carbon-nanotube forest 89 using vacuum film-holding bar 1433.

Figure 14E:
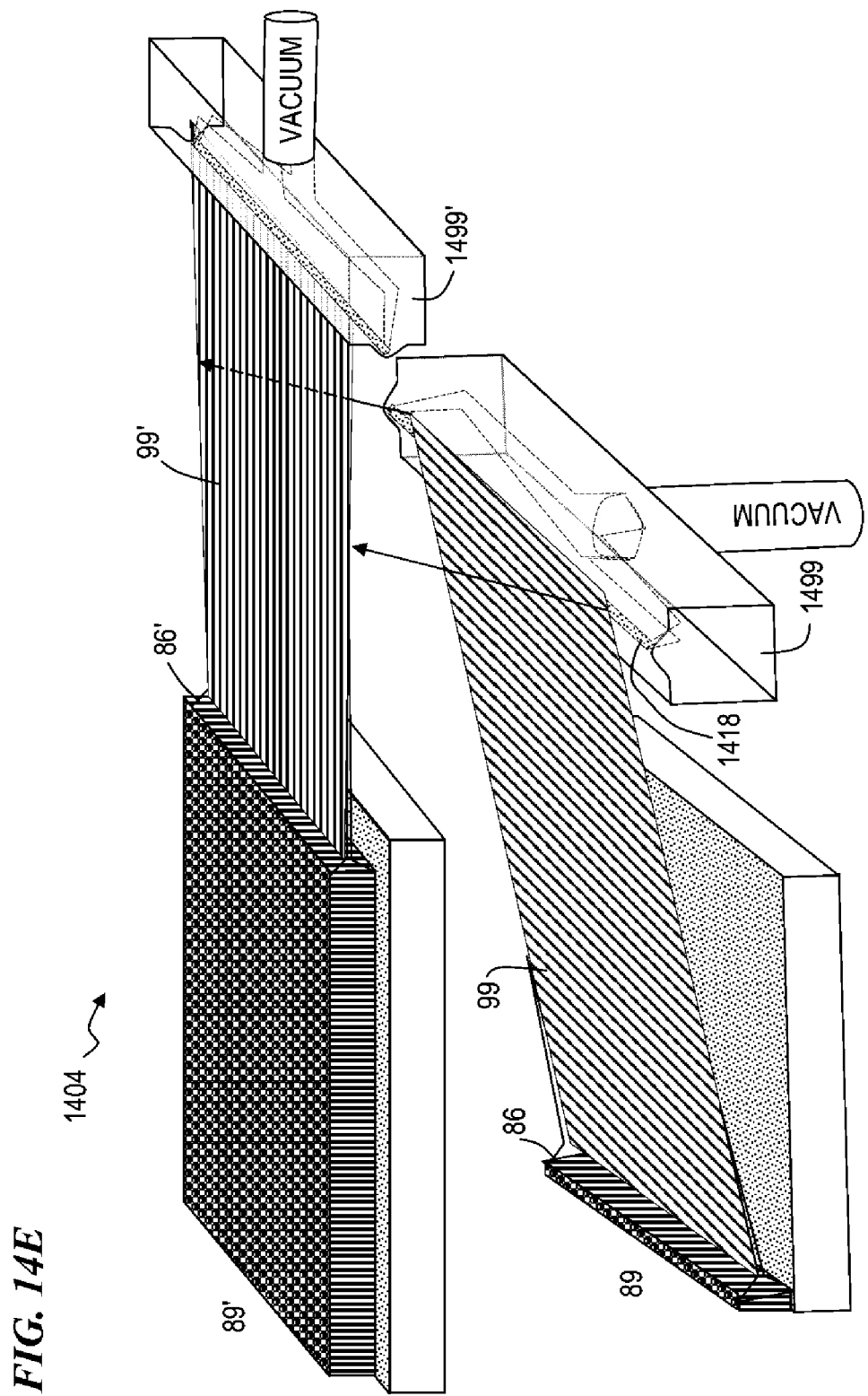
FIG. 14E is a perspective schematic diagram of splicing films while pulling a continuous film from carbon-nanotube forests on different substrates using vacuum film-holding bars.

FIG. 14E is a perspective schematic diagram of splicing films 99 and 99' while pulling a continuous film 99 from carbon-nanotube forests 89 and 89' from different substrates 77 and 77' using vacuum film-holding bars 1499 and 1499'. In some embodiments, film 99 is being pulled from front face 86 of forest 89 using vacuum film-holding bar 1499. The harvest of nanotube forest 89 is nearly complete. New film 99' is pulled from front face 86' of forest 89' using vacuum film-holding bar 1499'. Film 99 is moved into contact with new film 99' using vacuum film-holding bar 1499, which, after sufficient contact has spliced film 99 to film 99', then applies air pressure to release the films from vacuum film-holding bar 1499. In some embodiments, a cutting or tearing operation severs the remaining tail of film 99 from the sliced film.

FIGS. 15A, 15B, 15C, 15D, and 15E are top-view schematic diagrams of system 1500 building a cross-woven nanotube cloth 1593 on a vacuum table 1561. FIG. 15A shows system 1500 after laying nanotube film strip 1511 and holding it by vacuum to table 1561. In some embodiments, nanotube film 99 is directly pulled from nanotube forest 89 that was grown on substrate 77, and is laid on vacuum table 1561 to form strip 1511. Upon reaching an edge (the bottom edge in the diagram) of the vacuum surface 1562, substrate 77 is raised and inverted at an angle of reflection equal to the angle of incidence. FIG. 15B shows system 1500 in state 1502 after laying second nanotube film strip 1512 and holding it by vacuum to table 1561. Upon reaching the next edge (the left edge in the diagram) of the vacuum surface 1562, substrate 77 is again raised and un-inverted at an angle of reflection equal to the angle of incidence. FIG. 15C shows system 1500 in state 1503 after laying third nanotube film strip 1513 and holding it by vacuum to table 1561. Upon reaching the next edge (the top edge in the diagram) of the vacuum surface 1562, substrate 77 is raised and again inverted at an angle of reflection equal to the angle of incidence. FIG. 15D shows system 1500 in state 1504 after laying fourth nanotube film strip 1514 and holding it by vacuum to table 1564. FIG. 15E shows system 1500 in state 1505 after laying fifth nanotube film strip 1515 and many more and holding them by vacuum to table 1564.

FIG. 15F is a side view partially in cross section of system 1500 in state 1505, showing an air-flow connection 1564 for selectively applying either vacuum (to attach and hold nanotube film 99 to surface 1562 of substrate 1561 for formation of film structure 1593 and/or for further processing such as coating film structure 1593 with a liquid such as ethanol which is then evaporated to thin and densify film structure 1593, or for impregnating film structure 1593 with a binder such as PVA, epoxy, and/or the like) or air pressure (to release the completed film structure 1593 from its surface). In some embodiments, substrate 1561 includes a plurality of interior passages 1563 coupled between air-flow connection 1564 and a microporous surface layer 1562 (e.g., in some embodiments, for example, having an inner structure and composition similar to the ceramic filters described in U.S. Pat. No. 6,394,281 mentioned above, or in other embodiments, substrate 1561 is a flow-through (e.g., silicon) wafer such as described in FIG. 8K, FIG. 9J or FIG. 9N) through which the vacuum or air pressure are applied. In some embodiments, film 99 is applied directly as it is pulled from nanotube forest 89 on substrate 77, while in other embodiments, a preformed film 98 (as described in any of the embodiments above) is applied to surface 1562. In some embodiments, the vacuum holds a plurality of stacked film layers because each film is essentially an aerogel-type material through which air can readily pass. In some embodiments, the microporous top layer has through openings small enough that the sideways-oriented nanotubes are not sucked into its surface, but rather lie across it until released by a reverse of the air flow or pressure. In some embodiments, top surface 1562 is an essentially flat plane; while in other embodiments, the top surface has a three-dimensional shape in the form of the desired end product, used as a mold.

FIGS. 16A and 16B are perspective schematic diagrams of system 1600 building a cross-woven nanotube airfoil 1693 using a continuous web of crossed films 98, where each film 98 in the assembly is being held across its entire length and width by a curved vacuum table 1677. In some embodiments, film 99 is applied directly as it is pulled from nanotube forest 89 on substrate 77, while in other embodiments, a preformed film 98 (as described in any of the embodiments above) is applied to surface 1562. In some embodiments, film structure 1593 is coated with a liquid such as ethanol (e.g., by spraying a mist or dipping into the liquid), which is then evaporated to thin and density film structure 1593. In some embodiments, once the film structure 1693 is completed, a binder of, e.g., PVA, epoxy, or the like is applied.

Various embodiments of the invention include combinations of subsets of features from a plurality of embodiments described herein, and are specifically contemplated by the inventor.

The Use of Adhesive-Coated Rods to Create Layered and Flattened Nanotube Structures In some embodiments, adhesive strips and/or adhesive-coated rods are used in conjunction to create a layered and flattened nanotube structure. In such an embodiment, an adhesive strip of an appropriate width is used to draw a nanotube sheet. Once drawn with the adhesive strip, the end of the nanotube sheet to which the adhesive strip is attached is, in turn, attached to a second adhesive-coated rod, and the adhesive strip is removed. This nanotube sheet is attached by folding the end of the nanotube sheet over the second rod, such that the rod is connected to the nanotube sheet. In some embodiments, these adhesive-coated rods are 1 to 2 mm in diameter and of some suitable length corresponding to the width of the nanotube-forest-bearing substrate. In some of the various embodiments, these "rods" are made from steel, iron, aluminum, plastic, rubber, rubber-coated steel cable, or some other suitable material.

In some embodiments, once the second adhesive-coated rod is employed, a first adhesive-coated rod is placed at the first end of the nanotube sheet. The first and second adhesive-coated rods are used in combination to manipulate an individual nanotube sheet. In some embodiments, the first and second adhesive-coated rods are used to manipulate and/or transfer a nanotube sheet to a second set of rods comprising a third and fourth adhesive-coated rods. Using the adhesive strips and the first and second adhesive-coated rods to transfer a nanotube sheet, a layered nanotube structure can be built up, whereby the process of generating nanotube sheets is repeated, as is the transfer of these sheets from the adhesive-strip holder to the first and second rods, and finally to the third and fourth rods. Specifically, several nanotube sheets are layered one on top of another, with the ends of the nanotube sheets attached to the adhesive-coated third and fourth rods.

In at least one embodiment, once a nanotube structure of a suitable thickness is created through the layering of the nanotube sheets, the third and fourth adhesive-coated rods are rotated in opposite directions (i.e., one in a clockwise and another in a counter-clockwise direction) to flatten the layers that comprise the nanotube structure.

The Use of Adhesive-Coated Rods to Create a Cross-Hatch Structure Composed of Layered and Flattened Nanotube Structures In some embodiments, once a series of nanotube structures are created, they are combined to generate a cross-hatch or cross-layer pattern. These cross-hatch or cross-layer patterns and the size of the nanotube structures generated in a cross-match or cross-layer pattern are only limited by the number of the nanotube structures used. Once the requisite cross-hatch or cross-layer patterns is formed, the third and fourth adhesive rods used to manipulate each individual nanotube structure are removed, leaving a complete nanotube structure formed in a cross-layer or cross-hatch pattern.

The Use of Adhesive-Coated Rods to Create a Woven Structure Composed of Layered and Flattened Nanotube Structures The process of generating a structure or fabric using a loom is well known. U.S. Pat. No. 169 (by Erastus B. Bigelow, issued Apr. 20, 1837), which is incorporated herein in its entirety, describes a power-loom for weaving coach lace and other similar fabrics. Common to most looms is the use of warp threads, weft threads, and a space between the warp threads called a shed. Typically, the process of weaving fabrics using a loom includes alternately raising and lowering a series of warp threads oriented to each other in a generally parallel manner, such that one set of parallel warp threads would be raised, and an adjacent set of parallel warp threads would be lowered. In some embodiments, each thread of the second set is located between two threads of the first set. Between each alternate raising and lowering of these sets of warp threads, a weft thread is passed through the space (or "shed") between the sets of warp threads. Looms automate this process of raising, lowering and the passing through of weft threads to create fabrics.

In at least one embodiment, modifications of traditional weaving techniques utilizing a loom, such as disclosed in U.S. Pat. No. 169, are used to form a single nanotube structure consisting of multiple smaller structures of nanotubes. In such an embodiment, a set "A" of layered, condensed nanotube structures are attached to a loom. A second set "B" of layered, condensed nanotube structures is also attached to a loom. Collectively, set A and set B are referred to as warp films and individually as a warp film. In some embodiments, set A and set B are spread out in a horizontal array (i.e., a horizontal loom) while in other embodiments, a vertical array (i.e., a vertical loom) is used. In some embodiments, the distance or "shed" between the outer-most A and B warp films is greater than the distance between other warp films in the set A or B as attached to a loom, such as described in FIGS. 2E and 2F. In some embodiments, the shed is the same between all warp-film sets as described in FIG. 2C. In some embodiments, when a loom containing sets A and B is operated, the nanotube structures of set B are placed in an up position, while the nanotube structures of set A are placed in a down position. Once the loom is operated to place a weft structure, the positions of sets A and B alternate. While sets A and B alternate, a series of additional nanotube structures serve as wefts and are passed into the shed existing between the members of set A and set B. These wefts are thus, in effect, woven into the warps forming set A and B. In some embodiments, the wefts are shifted toward the point at which the warp sets are attached so as to strengthen the woven nanotube structure. Once this process is competed, a woven nanotube structure is created.

An Automated Process for Generating a Nanotube Layer of Sheets

In some embodiments, a combination of adhesive-coated rods and rollers are utilized to draw nanotube sheets from one or more nanotube forests attached to one or more substrates. In some embodiments, the substrate is formed from a glass, silicon (Si) or sapphire, and, in some embodiments, is between 1 and 50 cm wide or wider. In some embodiments, the substrate has a porous surface, wherein in some embodiments, the surface pores are about 10 nanometers or smaller across. In some embodiments, the height of the forest of nanotubes is grown to approximately 0.25 mm. This height can be varied based upon the process used to form the nanotube fibers as is described above. In one embodiment, one or more nanotube sheets are drawn, pulled together to form multiple layers, and flattened using a series of rollers. Once flattened, in some embodiments, a PVA (poly(vinyl alcohol)) solution or some other suitable solution is sprayed onto the newly formed nanotube structure in order to densify the structure. Specifically, the effect of the liquid evaporating is to shrink the nanotube sheet, thus making the sheets themselves denser. In some embodiments, a PVA (poly(vinyl alcohol)), ethanol or some other suitable liquid bath is used whereby the nanotube structure is passed through the bath to allow for the nanotube structure to densify. After being passed through the bath, the nanotube structure is passed around a rotating drum, allowed to dry, and accumulated in a roll. In some embodiments, strips of the nanotube structure are cut at a predetermined length, and spliced together to form a long continuous piece of layered, flattened nanotube film.

Some embodiments of the invention provide a nanotube article that includes a plurality of nanotube films stacked on a continuous web in each of one or more directions relative to a length-wise edge having the longest dimension of the web. In some embodiments, the web is densified and wound on a take-up roll. In some embodiments, the web and each of the plurality of nanotube films includes carbon fullerene nanotubes. In some embodiments, the web includes woven nanotube films. In some embodiments, the web includes a first set having a plurality of nanotube warp films positioned at a first angle to a length-wise edge of the web woven with a second set having a plurality of nanotube weft films positioned at a second angle, different than the first angle, to a length-wise edge of the web. In some embodiments, the web includes crossed-but-not-woven nanotube films. In some embodiments, the web includes a first set having a plurality of nanotube films parallel to one another crossed-but-not-woven with a second set having a plurality of nanotube films parallel to one another.

Another aspect of the invention, in some embodiments, includes an apparatus for continuous fabrication of a carbon nanotube film, wherein the apparatus includes a first film-transport mechanism having one or more nanotube-film-holding surfaces, and movable along a first fabrication path; and a layer-build-up mechanism operable to place carbon nanotube film across the nanotube-film-holding surfaces while the holding surfaces are moving along the fabrication path. In some embodiments, the nanotube-film-holding surfaces include one or more adhesive surfaces along a surface of a flexible sheet belt, wherein the layer-build-up mechanism lays each film at a non-parallel non-perpendicular angle to a lengthwise edge of the sheet belt. In some embodiments, the belt is a continuous-loop made of a polymer material having the adhesive surfaces along its two opposite outer edges, and wherein the nanotube film is placed across the belt and held by the one or more adhesive surfaces. In some embodiments, the nanotube-film-holding surfaces include one or more adhesive surfaces along a surface of each of a plurality of separate spaced-apart endless-loop belts moved substantially piecewise parallel to one another. Some embodiments further include a second film transport mechanism having a plurality of spaced-apart adhesive surfaces on a sheet belt, and movable along a second fabrication path that connects to the first fabrication path in a manner to allow transfer of the nanotube film from the first film transport mechanism to the second film transport mechanism. In some such embodiments, the layer-build-up mechanism includes a first set of one or more warp-film holders operable to hold a first set of warp films stretched to a first adhesive strip along a distal first edge of the first film-transport mechanism from the first set warp-film holders, and a second set of warp film holders operable to hold a second set of warp films stretched to the first adhesive strip, wherein the first film-transport mechanism includes a second adhesive strip along a second edge opposite the first edge, and a weft-film placement mechanism operable to place a weft film in a shed between the first set of warp films and the second set of warp films and attach opposite ends of the weft to the first and second adhesive strips respectively and then separate from the attached weft. In some such embodiments, the first set warp-film holders moves in a direction opposite relative to the second set warp-film holders after deposition of a weft film placed from the first adhesive strip to the second adhesive strip, and wherein the warp-film holders successively attach a near end of each warp film to the second adhesive strip as it completes its weave and then separate from the attached warp. In other embodiments, the first film-transport mechanism includes a vacuum table, wherein the nanotube-film-holding surfaces are operable to hold and release nanotube film using a gas-pressure difference, the vacuum surface movable relative to layer-build-up mechanism to position itself for a predetermined film deposition layout.

Another aspect of the invention, in some embodiments, includes an apparatus on which to synthesize a carbon nanotube forest, wherein the apparatus includes an interior-flow substrate having a first major face, a first nanoporous surface layer in fluid communication with the first major face, an interior flow system operable to deliver gasses to the nanoporous layer from a side or face of the substrate other than the first major face, and a nanotube-synthesis catalyst on the first nanoporous layer. In some embodiments, the interior flow system includes a first plurality of gas passages having a depth greater than their width. In some embodiments, the substrate is a side-flow substrate wherein each one the first plurality of gas passages provide fluid communication to the porous layer from one or more sides adjacent the first major face. In some embodiments, the interior flow system includes a first plurality of gas passages having a depth greater than their width and having a length along a Y-direction, and a second plurality of gas passages that extend to a depth more distal from the first major face than the depth of the first plurality of gas passages, and wherein each of the second gas passages is in fluid communication with a plurality of the first plurality of gas passages, in order to form a flow-through substrate. Some embodiments further include a furnace having a temperature control and heating unit operable to maintain an effective temperature for nanotube synthesis; a substrate-holding mechanism; a gas-flow system operable to deliver one or more reactant gasses to a side or face of the substrate other than the first major face and to exhaust spent gasses from a vicinity of the first major face; and an access port through which nanotube product can be removed without interrupting a substantially continuous operation of the furnace at substantially its effective temperature for nanotube synthesis. In some such embodiments, the substrate is configured to have plurality of successive nanotube forests grown and harvested.

Some embodiments of the invention provide a method that includes stacking a plurality of nanotube films on a continuous web in each of one or more directions relative to a length-wise edge having the longest dimension of the web. In some embodiments, the method further includes densifying the web and winding it on a take-up roll. In some embodiments, the web and each of the plurality of nanotube films includes carbon fullerene nanotubes. In some embodiments, the method further includes weaving nanotube films to form the web. In some embodiments, the method further includes positioning and holding a first set having a plurality of nanotube warp films at a first angle to a length-wise edge of the web, and weaving the first set with a second set having a plurality of nanotube weft films positioned at a second angle, different than the first angle, to a length-wise edge of the web. In some embodiments, the method includes crossing-but-not-weaving the nanotube films. In some such embodiments, the web includes a first set having a plurality of nanotube films parallel to one another crossed-but-not-woven with a second set having a plurality of nanotube films parallel to one another.

Another aspect of the invention, in some embodiments, includes method for continuous fabrication of a carbon nanotube film, wherein the method includes moving a first film-transport mechanism, having one or more nanotube-film-holding surfaces, along a first fabrication path; and placing carbon nanotube film across the nanotube-film-holding surfaces while the holding surfaces are moving along the fabrication path. In some embodiments, the nanotube-film-holding surfaces include one or more adhesive surfaces along a surface of a flexible sheet belt, wherein the layer-build-up mechanism lays each film at a non-parallel non-perpendicular angle to a lengthwise edge of the sheet belt. In some embodiments, the belt is a continuous-loop made of a polymer material having the adhesive surfaces along its two opposite outer edges, and wherein the method includes placing the nanotube film across the belt and holding it by the one or more adhesive surfaces. In some embodiments, the method performs one or more processes associated with the individual features of the above described apparatus.

Another aspect of the invention, in some embodiments, includes a method for synthesizing a carbon nanotube forest, wherein the method includes flowing reactant gasses to an interior of a nanotube-growth substrate having a first major face, a first nanoporous surface layer in fluid communication with the first major face, an interior flow system operable to deliver gasses to the nanoporous layer from a side or face of the substrate other than the first major face, and a nanotube-synthesis catalyst on the first nanoporous layer. In some embodiments, the interior flow system includes a first plurality of gas passages having a depth greater than their width. In some embodiments, the substrate is a side-flow substrate wherein each one the first plurality of gas passages provide fluid communication to the porous layer from one or more sides adjacent the first major face. In some embodiments, the interior flow system includes a first plurality of gas passages having a depth greater than their width and having a length along a Y-direction, and a second plurality of gas passages that extend to a depth more distal from the first major face than the depth of the first plurality of gas passages, and wherein each of the second gas passages is in fluid communication with a plurality of the first plurality of gas passages, in order to form a flow-through substrate. Some embodiments further include a furnace having a temperature control and heating unit operable to maintain an effective temperature for nanotube synthesis; a substrate-holding mechanism; a gas-flow system operable to deliver one or more reactant gasses to a side or face of the substrate other than the first major face and to exhaust spent gasses from a vicinity of the first major face; and an access port through which nanotube product can be removed without interrupting a substantially continuous operation of the furnace at substantially its effective temperature for nanotube synthesis. In some such embodiments, the substrate is configured to have plurality of successive nanotube forests grown and harvested.

Some embodiments provide a method that includes holding a first end of a nanotube film, pulling a length of nanotube film attached to the first end from a nanotube forest, holding a second end of the nanotube film, and separating the second end of the film from the nanotube forest. In some embodiments, the holding includes adhesively holding. In some embodiments, the holding includes vacuum holding. In some embodiments, holding includes clamping the film between two surfaces. Some embodiments further include holding the film between the second end and the nanotube forest before separating.

Some embodiments of the invention include splicing a nanotube film to a nanotube forest and pulling additional length of nanotube film from the nanotube forest. In some embodiments, the splicing includes pressing a nanotube film against the nanotube forest. In other embodiments, the splicing includes pressing a portion of one nanotube film against a portion of another nanotube film. In some embodiments, splicing includes wetting overlapped portions of two or more nanotube films and then drying the wetted films to draw the fibers closer to one another.

Another aspect of the invention, in some embodiments, includes a splicing bar having a rounded nose configured to press a nanotube film onto another nanotube film and/or to a nanotube forest. In some embodiments, the slicing bar further includes a cutting edge configured to cut a film end off the spliced joint.

Another aspect of the invention, in some embodiments, includes a film-holder opener 185 configured to open a split resilient nanotube-film holder, to insert the nanotube film therein and then to release the nanotube-film holder with the nanotube film held therein. In some embodiments, the nanotube-film holder is made of split rubber tubing.

Another aspect of the invention, in some embodiments, includes a method for preventing or repairing gaps in a nanotube film being pulled from a nanotube forest. In some embodiments, the method includes rotating a distal nanotube film holder and a substrate holding the nanotube forest both in the same angular direction as shown in FIG. 3B. In other embodiments, the method includes pressing a face of the nanotube forest with an implement that reduces a gap in the forest as shown in FIG. 6C.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising an interior-flow substrate having a first major face, a second major face opposite the first major face, one or more sides of the substrate, a first nanoporous surface layer on the substrate such that an exterior face of the first nanoporous layer is the first major face of the substrate, an interior flow system that includes a first plurality of elongated passageways in the substrate between the first major face and the second major face and that is operable to deliver gasses to the first nanoporous layer from the second major face or from the one or more sides of the substrate, and a nanotube-synthesis catalyst on the first nanoporous layer.

2. The apparatus of claim 1, wherein the first plurality of elongated passageways each have a length measured as a distance that extends substantially parallel to the first major face, and each have a first depth measured from one side of one of the first plurality of elongated passageways to an opposite side in a direction generally perpendicular to the first major face that is greater than their width measured from one side to an opposite side in a direction generally parallel to the first major face, and wherein their length is longer than their depth.

3. The apparatus of claim 2, wherein the substrate is a side-flow substrate wherein each one the first plurality of elongated passageways deliver gasses to the first nanoporous layer from the one or more sides of the substrate.

4. The apparatus of claim 1, further comprising:
an enclosure;
a furnace having a temperature control and heating unit operable to maintain an effective temperature for nanotube synthesis, wherein the enclosure includes the furnace and wherein at least a portion of the enclosure is outside the furnace;
a substrate-holding mechanism that is configured to hold the interior flow substrate;
a gas-flow system operable to deliver one or more reactant gasses to the interior flow system through the second major face or the one or more sides of the substrate and to exhaust spent gasses from a vicinity of the first major face; and
an access port extending from inside the furnace to outside the furnace through which nanotube product can be removed from the substrate while the substrate is inside the enclosure without interrupting a substantially continuous operation of the furnace at substantially its effective temperature for nanotube synthesis.

5. The apparatus of claim 4, wherein the substrate is configured to have plurality of successive nanotube forests grown and harvested.

6. The apparatus of claim 4, wherein the furnace is entirely inside the enclosure.

7. The apparatus of claim 1, further comprising:
a furnace having a reaction chamber, wherein the interior-flow substrate is held in the reaction chamber of the furnace;
a temperature controller operatively coupled to the reaction chamber, and configured to maintain a temperature effective for forming carbon nanotubes;
a gas-delivery system configured to deliver one or more carbon-bearing precursor gasses into the interior flow system and through the first nanoporous layer to the first major face to form carbon nanotubes thereon; and
an access port configured to permit removal of the formed carbon nanotubes from the interior-flow substrate while the substrate is within the furnace.

8. The apparatus of claim 1, further comprising:
means for delivering one or more nanotube-precursor gasses into the interior flow system so that the gasses pass through the first nanoporous layer to the first major face.

9. The apparatus of claim 8, the apparatus further comprising:
a furnace having a reaction chamber;
means for holding the interior-flow substrate in the reaction chamber of the furnace;
means for heating the reaction chamber to a temperature effective for forming carbon nanotubes,
wherein the means for delivering the one or more nanotube-precursor gasses includes means for delivering carbon-bearing precursor gas into the interior flow system and through the first nanoporous layer to the first major face to form carbon nanotubes thereon, wherein the substrate is a side-flow substrate, wherein the delivering of the nanotube-precursor gas is done from the one ore more sides of the substrate, and wherein the forming of the first plurality of interior gas passages includes forming the first plurality of interior gas passages having a length along a direction that lies in a plane that is parallel to the first major face;
means for controlling a temperature of the reaction chamber to maintain an effective temperature for nanotube synthesis;
means for exhausting spent gasses from a vicinity of the first major face; and
means for removing nanotube product without interrupting a substantially continuous operation of the furnace at substantially its effective temperature for nanotube synthesis.

10. The apparatus of claim 9, wherein the one or more nanotube-precursor gasses include a carbon-bearing precursor gas.

11. The apparatus of claim 1, wherein the interior flow substrate includes a first plurality of gas passages having a first depth, measured as a distance from the first major surface to a distal side of one of the first plurality of gas passages in a direction extending away from the first major face and having a length along a direction that that is generally parallel to the first major face, and a second plurality of gas passages that extend to a second depth, measured as a distance from the first major surface to a distal side of one of the second plurality of gas passages in a direction extending away from the first major face, more distal from the first major face than the first depth of the first plurality of gas passages, and wherein each of the second gas passages is in fluid communication with a plurality of the first plurality of gas passages, in order to form a flow-through substrate.

12. The apparatus of claim 1, wherein the first nanoporous surface layer and the interior flow system are configured to conduct nanotube-precursor gasses from the interior flow system through the first nanoporous surface layer to the first major face in order react there to form nanotubes using the catalyst.

13. The apparatus of claim 1, wherein the first plurality of elongated passageways are each generally parallel to the first major face of the substrate.

14. The apparatus of claim 1, wherein the first plurality of elongated passageways extend from the second major face opposite the first major face in a branching manner to deliver the gasses to an interior portion of the first nanoporous layer such that the gasses flow through the first nanoporous layer to the first major face from the interior portion.

15. The apparatus of claim 1, wherein the first plurality of elongated passageways in the substrate are exit passageways that each connect to the first nanoporous layer, the apparatus further comprising at least one elongated supply passageway that connects to each one of the first plurality of elongated exit passageways each of which conducts the gasses to the first nanoporous layer from the at least one elongated supply passageway.

16. The apparatus of claim 15, wherein the at least one elongated supply passageway has a length that extends in a direction substantially perpendicular to lengths of each one of the first plurality of elongated exit passageways.

17. The apparatus of claim 15, wherein the first plurality of exit passageways are substantially parallel to the first nanoporous layer.

18. The apparatus of claim 15, wherein the first nanoporous layer is substantially planar and the first plurality of exit passageways include at least three passageways that are substantially in one plane that is parallel to the first nanoporous layer.

19. An apparatus comprising:
a substrate having a first major face, wherein the substrate includes a first porous surface layer on the substrate such that an exterior face of the first porous surface layer is the first major face of the substrate, and a nanotube-synthesis catalyst on the first porous surface layer; and
a plurality of elongated hollow means within the substrate for delivering one or more nanotube-precursor gasses through the first porous surface layer to the first major face.

20. The apparatus of claim 19, wherein the means within the substrate for delivering gasses includes a first plurality of gas passages having a first depth, measured as a distance from the first major surface to a distal side of one of the first plurality of gas passages in a direction generally perpendicular to the first major face, that is greater than their width measured as a distance from one side to an opposite side of one of the first plurality of gas passages in a direction generally parallel to the first major face.

21. The apparatus of claim 19, wherein means within the substrate for delivering gasses provide fluid communication to the first porous layer from at least a side of the substrate that is adjacent the first major face.

22. The apparatus of claim 19, wherein the means within the substrate for delivering gasses includes means for delivering gas from a major face opposite the first major face, in order to form a flow-through substrate.

23. The apparatus of claim 19, further comprising:
an enclosure;
a furnace having a temperature control and heating unit operable to maintain an effective temperature for nanotube synthesis, wherein the enclosure includes the furnace and wherein at least a portion of the enclosure is outside the furnace;
means for holding the substrate;
means for delivering one or more reactant gasses to the means for delivering gas and for exhausting spent gasses from a vicinity of the first major face; and
means for removing nanotube product from the substrate while the substrate is inside the enclosure without interrupting a substantially continuous operation of the furnace at substantially its effective temperature for nanotube synthesis.

24. The apparatus of claim 23, wherein the furnace is entirely inside the enclosure.

25. The apparatus of claim 23, further comprising:
means for growing and harvesting a plurality of successive nanotube forests from the substrate.

26. An apparatus comprising:
an interior-flow substrate having a first major face, a second major face opposite the first major face, one or more sides of the substrate, a first nanoporous surface layer on the substrate such that an exterior face of the first nanoporous layer is the first major face of the substrate, an interior flow system that includes a plurality of elongated passageways in the substrate between the first major face and the second major face and that is operable to deliver gasses to the first nanoporous layer from the second major face or from the one or more sides of the substrate, and a nanotube-synthesis catalyst on the first nanoporous layer; and
means for delivering one or more nanotube-precursor gasses into the interior flow system and through the first nanoporous layer to the first major face.

27. The apparatus of claim 26, further comprising:
a furnace having a reaction chamber, wherein the interior-flow substrate is placed in the reaction chamber;
means for heating the reaction chamber to a temperature effective for forming carbon nanotubes, wherein the means for delivering of the nanotube-precursor gasses includes means for delivering carbon-bearing precursor gas into the interior flow system and through the first nanoporous layer to the first major face to form carbon nanotubes thereon; and
means for removing the formed carbon nanotubes from the interior-flow substrate.

28. The apparatus of claim 27, wherein the substrate is a side-flow substrate, and wherein the means for delivering of the carbon-bearing precursor gas includes means for delivering of the carbon-bearing precursor gas from the one or more sides of the substrate.

29. The apparatus of claim 27, wherein the means for delivering of nanotube-precursor gasses includes means for delivering one or more reactant gasses to the second major face or the one or more sides of the substrate, the apparatus further comprising:
means for controlling a temperature of the reaction chamber to maintain an effective temperature for nanotube synthesis; a substrate-holding mechanism;
means for exhausting spent gasses from a vicinity of the first major face; and
means for removing nanotube product without interrupting a substantially continuous operation of the furnace at substantially its effective temperature for nanotube synthesis.

30. The apparatus of claim 27, wherein the substrate is a side-flow substrate, wherein the means for delivering of the carbon-bearing precursor gas delivers the carbon-bearing precursor gas from the one or more sides of the substrate, and wherein the interior-flow system comprises a first plurality of interior gas passages in the substrate having a length along a direction that lies in a plane that is generally parallel to the first major face, and having a first depth measured generally perpendicular to the first major face, the apparatus further comprising:

- means for holding the interior-flow substrate in the reaction chamber of the furnace;
- means for heating the reaction chamber to a temperature effective for forming carbon nanotubes, wherein the means for delivering the carbon-bearing precursor gas into the interior flow system includes means for delivering the carbon-bearing precursor gas from the one or more sides of the substrate or the second major face and through the first nanoporous layer to the first major face to form carbon nanotubes thereon;
- means for controlling a temperature of the reaction chamber to maintain an effective temperature for nanotube synthesis;
- means for exhausting spent gasses from a vicinity of the first major face; and
- means for removing nanotube product without interrupting a substantially continuous operation of the furnace at substantially its effective temperature for nanotube synthesis.

31. The apparatus of claim 30, wherein the interior-flow system further comprises a second plurality of gas passages that extend to a second depth more distal from the first major face than the first depth of the first plurality of gas passages, and wherein each of the second gas passages is configured to be in fluid communication with a plurality of the first plurality of gas passages, in order to form a flow-through substrate.

32. The apparatus of claim 26, wherein the interior-flow substrate includes, in the substrate, a first plurality of interior gas passages having a first depth, measured as a distance from the first major surface to a distal side of one of the first plurality of gas passages greater than their width measured from one side to an opposite side in a direction generally parallel to the first major face.

33. The apparatus of claim 26, wherein the interior-flow system comprises a first plurality of interior gas passages in the substrate having a length along a direction that is parallel to the first major face, and having a maximum first depth from the first major face measured in a direction generally perpendicular to the first major face, and a second plurality of gas passages that extend to a second depth from the first major face measured in the direction generally perpendicular to the first major face more distal from the first major face than the maximum first depth of the first plurality of gas passages, and wherein each of the second plurality of gas passages is configured to be in fluid communication with a plurality of the first plurality of gas passages, in order to form a flow-through substrate.

* * * * *